US007814076B2

(12) United States Patent
Sack et al.

(10) Patent No.: US 7,814,076 B2
(45) **Date of Patent: *Oct. 12, 2010**

(54) DATA VAULT

(75) Inventors: Patrick Sack, Ashburn, VA (US); Edward Austin, Ashburn, VA (US); Jack Brinson, Leesburg, VA (US); Scott Gaetjen, Plano, TX (US); Gail Wright, Falls Church, VA (US)

(73) Assignee: Oracle International Corporation, Redwood Shores, CA (US)

( * ) Notice: Subject to any disclaimer, the term of this patent is extended or adjusted under 35 U.S.C. 154(b) by 443 days.

This patent is subject to a terminal disclaimer.

(21) Appl. No.: 11/212,695

(22) Filed: Aug. 29, 2005

(65) Prior Publication Data

US 2006/0248085 A1 Nov. 2, 2006

Related U.S. Application Data

(60) Provisional application No. 60/676,315, filed on May 2, 2005, provisional application No. 60/640,052, filed on Dec. 30, 2004.

(51) Int. Cl.
*G06F 7/00* (2006.01)

(52) U.S. Cl. ....................................... 707/694; 707/803

(58) Field of Classification Search ...................... 707/9
See application file for complete search history.

(56) References Cited

U.S. PATENT DOCUMENTS

| | | | | |
|---|---|---|---|---|
| 5,572,673 | A * | 11/1996 | Shurts | 726/17 |
| 5,826,268 | A | 10/1998 | Schaefer | |
| 5,937,159 | A | 8/1999 | Meyers | |
| 6,236,971 | B1 | 5/2001 | Stefik et al. | |
| 6,308,273 | B1 | 10/2001 | Goertzel et al. | |
| 6,530,024 | B1 * | 3/2003 | Proctor | 726/23 |

(Continued)

FOREIGN PATENT DOCUMENTS

EP 0838933 A1 4/1998

OTHER PUBLICATIONS

Oracle® Database Security Guide 10g Release 1 (10.1) Part No. B10773-01, copyright Dec. 2003.*

(Continued)

*Primary Examiner*—Apu M Mofiz
*Assistant Examiner*—Cindy Nguyen
(74) *Attorney, Agent, or Firm*—Hanify & King, P.C.

(57) ABSTRACT

A secure database appliance leverages database security in a consistent framework providing consistent, flexible, and adaptable security using mandatory access controls in addition to user and role based security for access control and accountability. A database system comprises a plurality of database objects, each database object having a level of security, a plurality of factors, each factor representing a characteristic of a user of the database system, at least one database session of the user in the database, the database session having a level of security, the user connected to the database with a network domain, each network domain having a level of security, wherein the database system is operable to grant or deny access to the data to a user based on the factors associated with the user, based on the level of security of the data, based on the level of security of the database session, and based on the level of security of the network domain.

26 Claims, 39 Drawing Sheets

U.S. PATENT DOCUMENTS

| | | | | |
|---|---|---|---|---|
| 6,785,728 | B1 | 8/2004 | Schneider | |
| 6,976,023 | B2 | 12/2005 | Chen | |
| 7,020,655 | B2 | 3/2006 | Kagalwala | |
| 7,100,195 | B1 * | 8/2006 | Underwood | 726/2 |
| 7,171,411 | B1 | 1/2007 | Lewis | |
| 7,185,192 | B1 * | 2/2007 | Kahn | 713/155 |
| 2001/0019614 | A1 | 9/2001 | Madoukh | |
| 2002/0010679 | A1 | 1/2002 | Felsher | |
| 2002/0031230 | A1 * | 3/2002 | Sweet et al. | 380/278 |
| 2002/0188610 | A1 | 12/2002 | Spencer, Jr. | |
| 2003/0120610 | A1 * | 6/2003 | Hamber | 705/67 |
| 2003/0229623 | A1 * | 12/2003 | Chang et al. | 707/3 |
| 2004/0054933 | A1 | 3/2004 | Wong | |
| 2005/0015591 | A1 | 1/2005 | Thrash | |
| 2005/0076044 | A1 * | 4/2005 | Kagalwala et al. | 707/100 |
| 2005/0193269 | A1 | 9/2005 | Haswell | |
| 2005/0203881 | A1 * | 9/2005 | Sakamoto et al. | 707/3 |
| 2006/0059567 | A1 * | 3/2006 | Bird et al. | 726/27 |
| 2006/0122975 | A1 * | 6/2006 | Taylor et al. | 707/3 |
| 2006/0206485 | A1 | 9/2006 | Rubin | |
| 2007/0180490 | A1 * | 8/2007 | Renzi et al. | 726/1 |

OTHER PUBLICATIONS

Dwyer et al. "Query Processing in LDV: A Secure Database System", Copyright 1988 IEEE.
Non-Final Office Action dated Mar. 31, 2009 received in U.S. Appl. No. 11/212,840.
Non-Final Office Action dated May 7, 2009 received in U.S. Appl. No. 11/212,669.
Non-Final Office Action dated Jun. 16, 2008 received in U.S. Appl. No. 11/212,669.
Non-Final Office Action dated Oct. 12, 2007 received in U.S. Appl. No. 11/212,669.
Final Office Action dated Dec. 2, 2008, received in U.S. Appl. No. 11/212,669.
Non-Final Office Action dated Dec. 2, 2009 received in U.S. Appl. No. 11/212,854.
Non-Final Office Action dated May 11, 2009 received in U.S. Appl. No. 11/212,854.
Non-Final Office Action dated Jun. 17, 2008 received in U.S. Appl. No. 11/212,854.
Non-Final Office Action dated Oct. 12, 2007 received in U.S. Appl. No. 11/212,854.
Final Office Action dated Dec. 18, 2008 received in U.S. Appl. No. 11/212,854.
Non-Final Office Action dated Oct. 15, 2007 received in U.S. Appl. No. 11/212,663.
Final Office Action dated Jul. 17, 2008 received in U.S. Appl. No. 11/212,663.
Notice of Allowance dated Dec. 15, 2008 received in U.S. Appl. No. 11/212,663.
Final Office Action dated Dec. 23, 2009 received in U.S. Appl. No. 11/212,840.
Final Office Action dated Dec. 28, 2009 received in U.S. Appl. No. 11/212,669.
Notice of Allowance dated Jun. 14, 2010 received in U.S. Appl. No. 11/212,669.
Notice of Allowance dated Jun. 22, 2010 received in U.S. Appl. No. 11/212,854.

* cited by examiner

1000

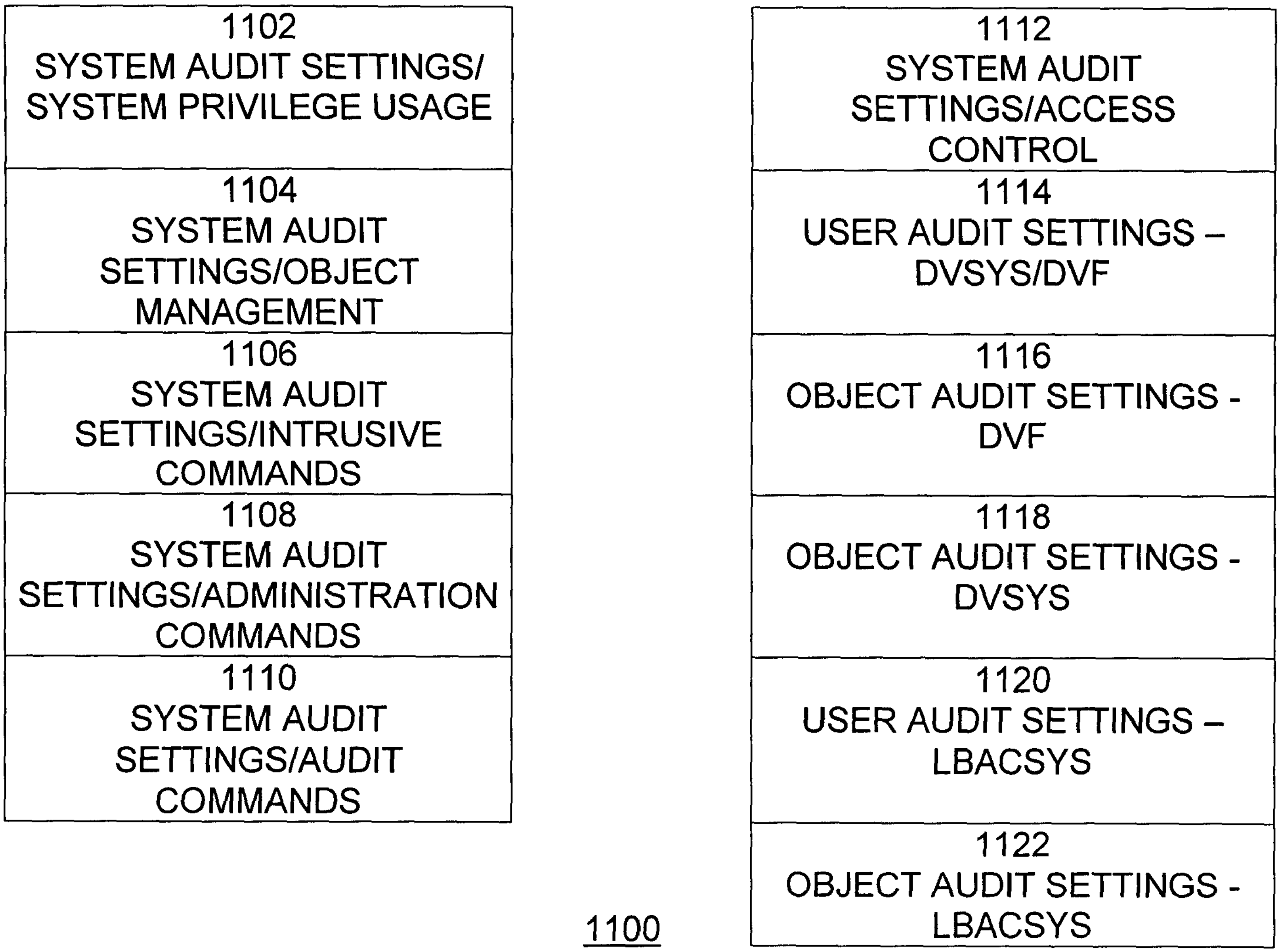

Fig. 11

| 1102 SYSTEM AUDIT SETTINGS/ SYSTEM PRIVILEGE USAGE |
|---|
| 1104 SYSTEM AUDIT SETTINGS/OBJECT MANAGEMENT |
| 1106 SYSTEM AUDIT SETTINGS/INTRUSIVE COMMANDS |
| 1108 SYSTEM AUDIT SETTINGS/ADMINISTRATION COMMANDS |
| 1110 SYSTEM AUDIT SETTINGS/AUDIT COMMANDS |

| 1112 SYSTEM AUDIT SETTINGS/ACCESS CONTROL |
|---|
| 1114 USER AUDIT SETTINGS – DVSYS/DVF |
| 1116 OBJECT AUDIT SETTINGS - DVF |
| 1118 OBJECT AUDIT SETTINGS - DVSYS |
| 1120 USER AUDIT SETTINGS – LBACSYS |
| 1122 OBJECT AUDIT SETTINGS - LBACSYS |

1100

| 1240 SESSIONID |
|---|
| 1242 STATEMENTID |
| 1244 RETURNCODE |
| 1246 CLIENT_ID |
| 1248 EXTENDED_TIMESTAMP |
| 1250 PROXY_SESSIONID |
| 1252 GLOBAL_UID |
| 1254 INSTANCE_NUMBER |
| 1256 OS_PROCESS |

| 1222 ACTION_OBJECT_NAME |
|---|
| 1224 SQL_TEXT |
| 1226 AUDIT_OPTION |
| 1228 RULE_SET_ID |
| 1230 RULE_SET_NAME |
| 1232 RULE_ID |
| 1234 RULE_NAME |
| 1236 FACTOR_CONTEXT |
| 1238 COMMENT_TEXT |

1200

| 1202 OS_USERNAME |
|---|
| 1204 USERNAME |
| 1206 USERHOST |
| 1208 TERMINAL |
| 1210 TIMESTAMP |
| 1212 OWNER |
| 1214 OBJ_NAME |
| 1216 ACTION |
| 1218 ACTION_NAME |
| 1220 ACTION_OBJECT_ID |

Data Vault Factor Menu Page

Factor Detail Page

Factor Type Detail Page

Maintain Factor Links Page

OLS Policy Associations Page (partial)

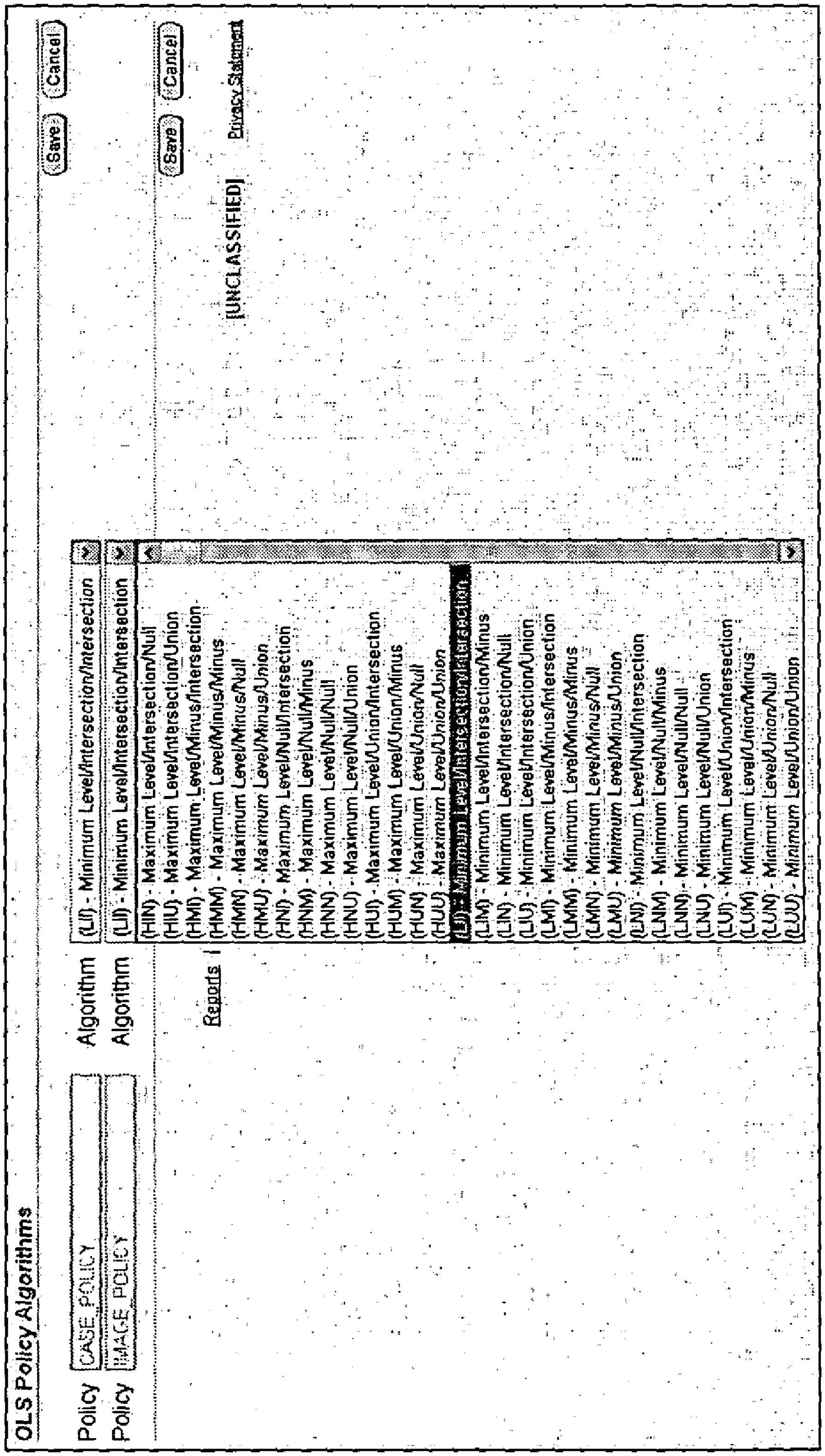

Fig. 18

Oracle Label Security Algorithms Page (partial)

OLS Policy Algorithms

Policy: CASE_POLICY
Policy: IMAGE_POLICY

Algorithm:
Algorithm:

Reports

- (LII) - Minimum Level/Intersection/Intersection
- (LIU) - Minimum Level/Intersection/Null
- (LIU) - Minimum Level/Intersection/Union
- (HIN) - Maximum Level/Intersection/Null
- (HIU) - Maximum Level/Intersection/Union
- (HMI) - Maximum Level/Minus/Intersection
- (HMM) - Maximum Level/Minus/Minus
- (HMN) - Maximum Level/Minus/Null
- (HMU) - Maximum Level/Minus/Union
- (HNI) - Maximum Level/Null/Intersection
- (HNM) - Maximum Level/Null/Minus
- (HNN) - Maximum Level/Null/Null
- (HNU) - Maximum Level/Null/Union
- (HUI) - Maximum Level/Union/Intersection
- (HUM) - Maximum Level/Union/Minus
- (HUN) - Maximum Level/Union/Null
- (HUU) - Maximum Level/Union/Union
- (LII) - Minimum Level/Intersection/Intersection
- (LIM) - Minimum Level/Intersection/Minus
- (LIN) - Minimum Level/Intersection/Null
- (LIU) - Minimum Level/Intersection/Union
- (LMI) - Minimum Level/Minus/Intersection
- (LMM) - Minimum Level/Minus/Minus
- (LMN) - Minimum Level/Minus/Null
- (LMU) - Minimum Level/Minus/Union
- (LNI) - Minimum Level/Null/Intersection
- (LNM) - Minimum Level/Null/Minus
- (LNN) - Minimum Level/Null/Null
- (LNU) - Minimum Level/Null/Union
- (LUI) - Minimum Level/Union/Intersection
- (LUM) - Minimum Level/Union/Minus
- (LUN) - Minimum Level/Union/Null
- (LUU) - Minimum Level/Union/Union

[UNCLASSIFIED]

Save   Cancel
Save   Cancel

Privacy Statement

Fig. 19

Deriving OLS Labels using the OLS Algorithm

| PARENT FACTOR-IDENTITY | CHILD FACTOR-IDENTITY | CHILD LABEL (LEVEL: COMPARTMENTS: GROUPS) | DERIVED PARENT LABEL (LII ALGORITHM) | DERIVED PARENT LABEL (HIU ALGORITHM) |
|---|---|---|---|---|
| DOMAIN – JWICS | DATABASE_HOSTNAME – CSDELL1 | TS:A,B,C:US,NATO | TS:A,B:US | TS:A,B:US,NATO,CA |
| | DATABASE_INSTANCE – 1 | TS:A,B:US,NATO | | |
| | AUTHENTICATION_TYPE - PROXY | TS:A,B,C,D:US,CA | | |
| DOMAIN – SIPRNET | DATABASE_HOSTNAME – CSDELL2 | SE:X,Y.Z:US, NATO | UC::US | SE::US,NATO,CA |
| | DATABASE_INSTANCE – 2 | SE:X,:US, CA | | |
| | AUTHENTICATION_TYPE - DATABASE | UC::US | | |

Data Vault Identities Menu Page

Identity Detail Page

Identity Map Page

Identity Map Main Page

Identity Label Detail for Label Identity

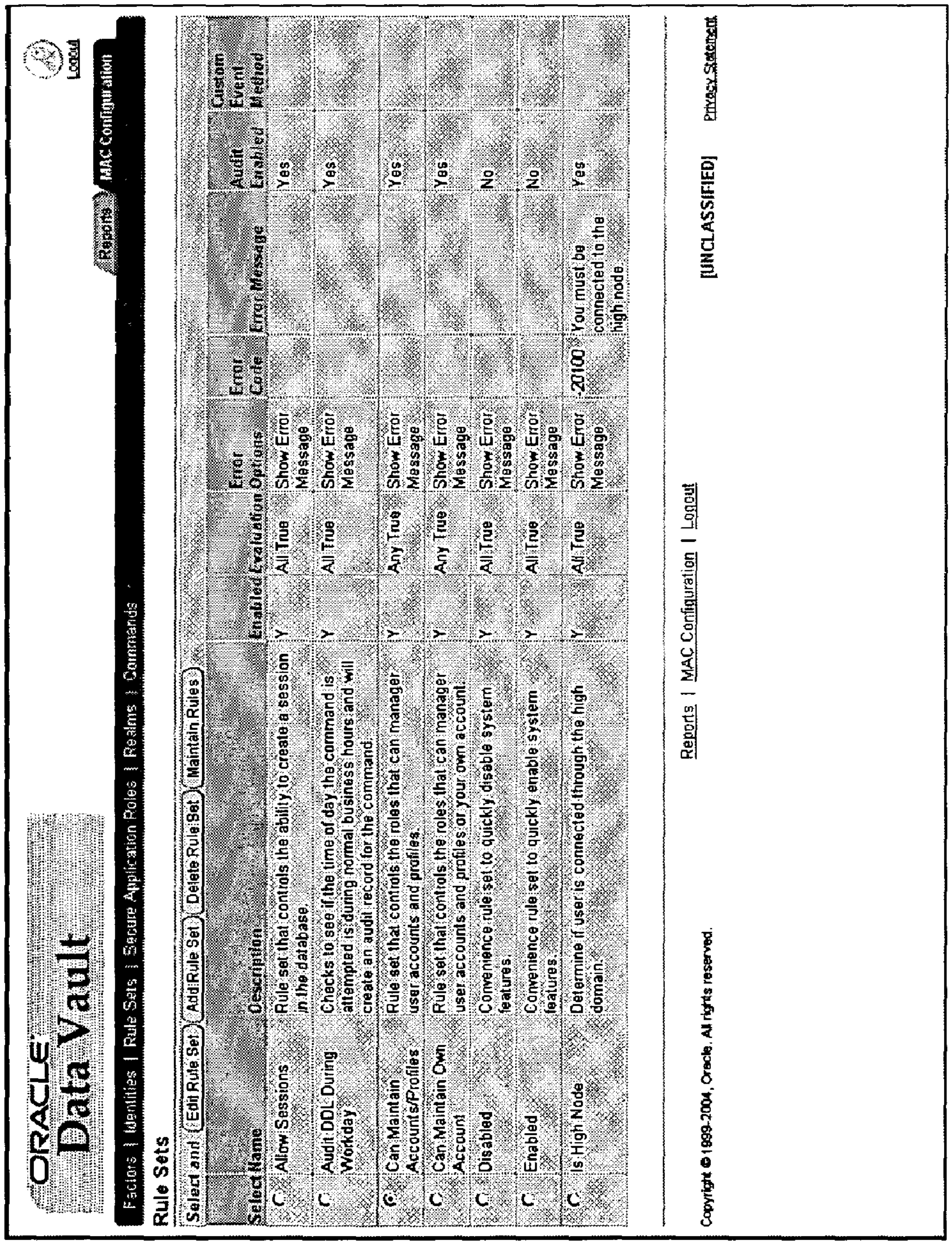

Fig. 25

Data Vault Rule Set Menu Page

| Select Name | Description | Enabled | Evaluation Options | Error Options | Error Code | Error Message | Audit Enabled | Custom Event Method |
|---|---|---|---|---|---|---|---|---|
| Allow Sessions | Rule set that controls the ability to create a session in the database. | Y | All True | Show Error Message | | | Yes | |
| Audit DDL During Workday | Checks to see if the time of day the command is attempted is during normal business hours and will create an audit record for the command. | Y | All True | Show Error Message | | | Yes | |
| Can Maintain Accounts/Profiles | Rule set that controls the roles that can manage user accounts and profiles. | Y | Any True | Show Error Message | | | Yes | |
| Can Maintain Own Account | Rule set that controls the roles that can manage user accounts and profiles or your own account. | Y | Any True | Show Error Message | | | Yes | |
| Disabled | Convenience rule set to quickly disable system features. | Y | All True | Show Error Message | | | No | |
| Enabled | Convenience rule set to quickly enable system features. | Y | All True | Show Error Message | | | No | |
| Is High Node | Determine if user is connected through the high domain. | Y | All True | Show Error Message | 20100 | You must be connected to the high node | Yes | |

Rule Set Detail Page

Maintain Rule Set Rules Page

Rule Page

Data Vault Realm Menu Page

Realm Detail Page

Realm Secured Objects Menu Page

Realm Secured Object Page

Realm Authorization Menu Page

Realm Authorization Page

Data Vault Command Authorizations Menu Page

Command Authorization Page

Data Vault Secure Application Role Menu Page

Secure Application Role Detail Page

Data Vault Available Reports Menu Page

DATA VAULT

CROSS-REFERENCE TO RELATED APPLICATIONS

This application claims the benefit of Provisional Application No. 60/640,052, filed Dec. 30, 2004 and Provisional Application No. 60/676,315, filed May 2, 2005.

BACKGROUND OF THE INVENTION

1. Field of the Invention

The present invention relates to a secure database appliance that leverages database security in a consistent framework that is adaptable to many compliance and governance requirements, and provides the flexibility for enforcing security policies, minimizing the need for custom application code that provides mandatory access control database security concepts.

2. Description of the Related Art

The traditional user and role based security model for access control and accountability to data is in widespread use. However, this security model has a number of shortcomings. Typically, the level of security provided by such systems, while adequate for some uses, is not adequate for many uses. Some traditional systems may provide high levels of security, but such systems may provide inconsistent security and may be difficult to administer, configure, and maintain. For example, an existing database may contain a large amount of security from user authentication to column level security, but the administrator of such a system must understand all the included security features in order to fully implement the desired security. In addition, implementers of such systems must define organizational security policies for information systems, and then develop custom database objects, application code, and scripts to support lockdown, administration, integration, and enforcement of the policy needs. Many organizations need to address data security for compliance and governance requirements in a way that is consistent, flexible, and adaptable. This is a primary concern for many national and international organizations looking at data consolidation, hosting, and information sharing.

Thus, a need arises for a system that provides secure access to data that provides improved ease of implementation, administration, and maintenance, as well as providing consistent, flexible, and adaptable security using mandatory access controls in addition to the user and role based security model for access control and accountability.

SUMMARY OF THE INVENTION

The present invention provides a secure database appliance that leverages database security in a consistent framework that is adaptable to many compliance and governance requirements, and provides the flexibility for enforcing security policies, minimizing the need for custom application code that handles database security concepts, improving ease of implementation, administration, and maintenance, as well as providing consistent, flexible, and adaptable security using mandatory access controls in addition to the user and role based security model for access control and accountability.

In one embodiment of the present invention, a database system comprises a plurality of database objects, each database object having a level of security, at least some of the database objects comprising data, a plurality of factors, each factor representing a characteristic of a user of the database system attempting to access data in the database system, at least one database session of the user in the database, the database session having a level of security, the user communicatively connected to the database with one of a plurality of network domains, each network domain having a level of security, wherein the database system is operable to grant or deny access to the data to a user based on the factors associated with the user, based on the level of security of the data, based on the level of security of the database session, and based on the level of security of the network domain.

In one aspect of the present invention, each unit of data may be created by one the plurality of network domains and the database system is further operable to provide access to the unit of data to a network domain independently of which network domain created the unit of data. The data may be divided into a plurality of data partitions, each data partition is created by one the plurality of network domains and the database system is further operable to provide access to a data partition to a network domain independently of which network domain created the data partition.

In one aspect of the present invention, the database system may further comprise an auditing system operable to monitor database operations that are attempted to be performed on the database objects, wherein the auditing system is operable to monitor the database operations based on a plurality of factors, a plurality of rules, each rule defining a limitation on operation of the database system by the user based on at least some of the plurality of factors and based on attributes of data to be operated on, including the level of security of the database object of the data to be operated on, and a plurality of realms, each realm defining a privilege of the user of the database system relative to a schema of the database system. Each factor may comprise a value of the factor and an indicator of a level of trust in the factor. A rule may be based on at least one of the value of the factor and the level of trust of the factor. A factor may have a type comprising a physical factor type indicating a physical, network, or database characteristic of the user, an implementation factor type indicating an implementation-based characteristic of the user, or an environmental factor type indicating a geographic or time-based characteristic of the user.

In one aspect of the present invention, the plurality of database objects may comprise at least one of an Authorized Security Value, a collection of database objects, a host name, an IP address, a router, a switch, a proxy server, a database instance, a database table, a database row, a database column, a database view, a database view row, a database view column, a database schema, a database partition, a database tablespace, and a database data file. The level of security of the database session may be determined based on at least one factor. The level of security of the database session may be determined by assigning a level of security of a user of the database system with which the database session is associated as an initial level of security, then determining a maximum session level of security based on additional factors.

BRIEF DESCRIPTION OF THE DRAWINGS

Further features and advantages of the invention can be ascertained from the following detailed description that is provided in connection with the drawings described below:

FIG. 11 is an exemplary block diagram of an architecture of Data Vault auditing policy and alerting functionality.

FIG. 18 is an illustration of an exemplary Label Security Algorithms page (partial).

FIG. 19 is an illustration of an exemplary derivation of OLS Labels using the OLS Algorithm

FIG. 25 is an illustration of an exemplary Data Vault Rule Set Menu page.

DETAILED DESCRIPTION OF THE PREFERRED EMBODIMENTS

Figure 1:
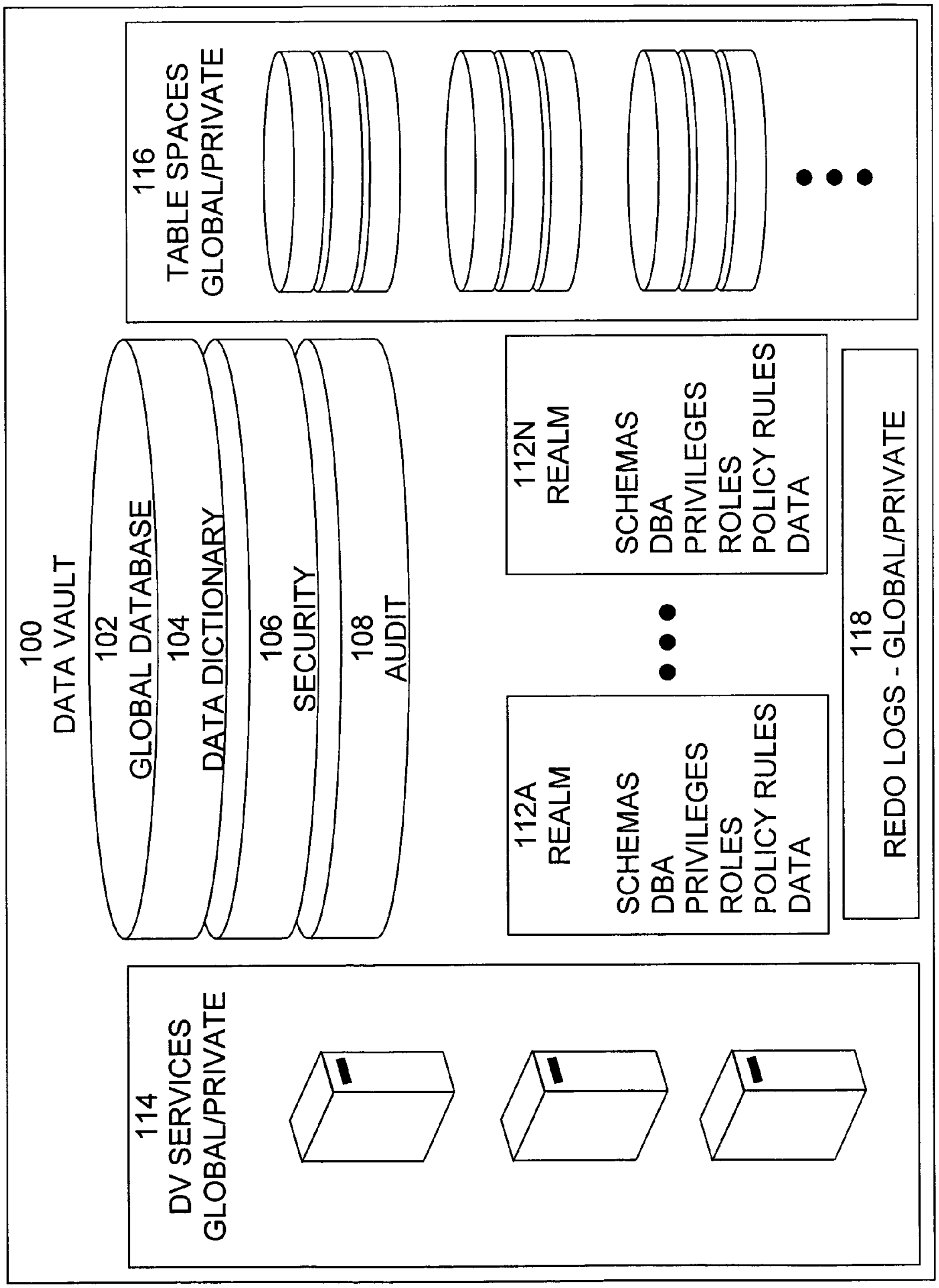
FIG. 1 is an exemplary block diagram of an architecture of a Data Vault system, in which the present invention may be implemented.

The present invention includes a system that provides secure access to data that provides improved ease of implementation, administration, and maintenance, as well as providing consistent, flexible, and adaptable security. For ease of reference, such a system may be termed a “Data Vault”. Data Vault provides the context within a database to establish the affinity between the information and it’s intended use. It is a secure database appliance that leverages database security in a consistent framework that is adaptable to many compliance and governance requirements, and provides the flexibility for enforcing security policies, minimizing the need for custom application code that handles database security concepts.

Preferably, Data Vault is implemented as a database appliance with a recommended secure configuration at the network, operation system and database layers. The secure configuration must also support an architecture that is highly scalable and available, thus leveraging architecture such as, for example, the Oracle GRID architecture.

Data Vault is locked down in terms of limiting potential exploits and limiting access to accounts and unnecessary services on the operating system, network, and database. It is a single consolidated and clustered database whereby access is controlled through separate locked-down database server. This capability requires the lockdown scripts and procedures to follow best practices for hardening a database server to restrict its functionality to only providing mandatory database services.

Data Vault will be scalable, highly available and maintain the level of assurance. A baseline of the secure configuration and separation in duties will be established to provide ongoing assurance at each tier. Auditing will be used to detect violations to the baseline, intrusions and insider threats. This approach provides a stronger level of security beyond a traditional security model, simply based on just user credentials and standard auditing.

Data Vault utilizes security best practices at all tiers (operating system, network, and database). The database servers are secured by the virtue of network channels, the operating system, and the database itself.

Data Vault is based on the following components:

Secure Baseline/Secure Configuration

High Availability & Scalable Architecture

Separation of Duties

Accountability, Monitoring and Violations Policies

Alerts & Notifications

Extended MAC Access Control Framework (MACSEC, MACOLS)

Centralize and Dynamic Auditing Framework

Secure Baseline/Secure Configuration

Data Vault will implement a concept of a secure baseline. The Data Vaults secure baseline is security configuration, which includes all security policies established via MACOLS and MACSecure, and hardening implementations. This configuration may be baseline and saved. Monitoring and reporting against the baseline is key to ongoing assurance.

Data Vault takes the underlying infrastructure components of existing technology and applies Rules and Rule Sets. Data Vault implements a security architecture that applies Mandatory Access Control (MAC) rules to the database. MAC rules can be applied to any database operation, role-based security, and label-based security. The MAC rules are based on multiple factors, such as physical architecture, configuration, and implementation. This multi-factored approach provides a higher level of assurance and trust to MAC security.

Secure Baseline—a baseline of the secure configuration and separation in duties will be established to provide ongoing assurance at each tier. Auditing will be used to detect violations to the baseline, intrusions and insider threats. This approach provides a stronger level of security beyond a traditional security model, because it provides a comparison model for threat detection and prevention.

Data Vault will implement a Secure Baseline by scrubbing the default database privileges. Data Vaults Secure Baseline will identify privileges that are security risks within the Standard Database installation. The Secure Baseline will either remove privileges or audit use of privileges based on the level of security risks.

Scripts and procedures are used to harden the database, operating system, and network. The Database Servers become "secured network appliances" whose sole function is to securely share and manipulate data.

Secure Baseline will evaluate and determine to keep or remove the following; User Accounts, Roles, Privilege (Public, Users, Roles)

Secure Baseline can defeat malicious behavior by verifying actuals against baseline during Database Startup, Session creation and Privilege enablement.

Database Accounts, Roles, Privileges and Database security Policies (FGA, FCAC) can be baselined and verified on a frequent basis.

Administrator shall be able to create a new baseline

Detect Violations during critical events and periodic scans.

Scheduled periodic routine to verify baseline

Turn auditing on to detect Immediate intrusions or violations

Alerts—Send notification of intrusion or violation to designated authority.

A secure baseline is a collection of database objects, procedures and data to support the notion of a baseline security configuration for MACSecure and MACOLS, auditing, network configuration, system configuration, database configuration. DataVault provides the framework to immediately and periodically verify the integrity of these baselines with alerting features.

High Availability & Scalable Architecture

In the Data Vault architecture, functionality such as that provided by, for example, the Oracle Real Application Clusters (RAC) is used to serve two purposes: 1) traditional high availability and scalability, and 2) Data bridge for information connectivity when networks are not physically connecting security domains and require a shared database. It is especially important to test that these two objectives are compatible. In the Data Vault environment, fail over has as much to do with availability and scalability as it does with security. Tests for fail over should include: RAC nodes, the RAC interconnect and switches between nodes, and the UDP firewall on the RAC interconnect.

Separation of Duties

Separation of duties is a concept that restricts system and database administrative privileges based on a well-defined roles and responsibilities to avoid the over-granting of privileges. The Data Vault will create a few specific roles such as: Security Policy Manager, Audit Manager, Audit Analyst, Directory/Account Manager, System Administrator, and DBA. Users/roles are granted privileges based on the Least Privilege model. No user is granted the DBA role.

In order to achieve checks and balances to prevent social engineering, Data Vault does not advocate having one super user, but rather creates roles to implement a separation of duties for the Data Vault Security Policy Manager, Audit Manager, Application DBA, Grid Administrator, Directory/Account Manager, Schema Owner, and End User.

Accountability, Monitoring and Violations Policies

Data Vault—access controls are associated with the roles, separation of duties, rules, realms, and factors and will have auditing policies associated with it.

Alerts & Notifications

Data Vault—access controls are associated with the roles, separation of duties, rules, realms, and factors and will have auditing policies associated with it. Policies can be established and used to alert and notify trusted administrators when there is a violation to a policy. The policy violation is based on the data and will alert on a certain pre-defined conditions. It provides the ability not to alert on certain data but alert on pre-defined conditions. Dynamic Auditing will provide the ability to collect audit records based on predefined condition and send alerts based on violation to the conditions set in the policy.

The capability will provide trusted administrators the ability take preventative actions against database intruders. For example, if a user attempts to penetrate a system and logs into an account with the wrong password or sends a request from a specific IP address that violates the policy. An alert will be sent when there is a violation to this policy.

Extended Access Control Framework (MACSEC, MACOLS)

Data Vault extends the access control framework. Access controls are associated with the roles, separation of duties, rules, realms, and factors and will have auditing policies associated with it. Data Vault provides a secure and consistent framework for supporting access controls and auditing. Its allows customers to extend the database security to entities outside the database. The framework allows security to be based on multiple factors from multiple sources to ensure higher level of trust and assurance.

Centralized and Dynamic Auditing Framework (Audit)

Data Vaults has infrastructure to detect tampering. Auditing will be used to detect violations to the baseline, intrusions and insider threats. Active auditing is used as both a deterrent and to quickly detect successful and unsuccessful attempts to perform unauthorized operations, including any changes to the Data Vault configuration and security policies. Auditing policies are established and can be used to alert and notify trusted administrators.

Dynamic Auditing detects violations to the audit/security baseline and monitor intrusions and insider threats. Dynamic Auditing is used as both a deterrent and to quickly detect successful and unsuccessful attempts to perform unauthorized operations, including any changes to the secure configuration and security policies.

Data Vault may use: Policy and Rules based Auditing, Extended Attributes, and Centralized Audit Repository.

Dynamic Auditing makes it easier to establish auditing requirements to meet compliance issues. It will provide the ability to establish a realm of objects that are associated with a particular compliance policy. This provides the ability to associate or assign an audit to a particular compliance or privacy policy. Dynamic Auditing provides the ability to define a policy and specify a period of time in which the policy is effective. The dynamic rules allows conditions to be placed on how the audit is conducted. This provides the ability to limit when an audit to a certain set of conditions that is based on factors or objects or operations.

Dynamic Auditing extends the existing capabilities of a database's standard auditing to produce a more dynamic and flexible auditing capability. The present capabilities of standard database auditing are based on a user account or an object. It is simply based on user credentials and user auditing. Today, database auditing is granular from the standpoint that it uses Fine Grained Access (FGA) control. FGA control is conditional based, row level auditing. Standard auditing capabilities are static and inflexible. The Dynamic Auditing approach provides a stronger level of security beyond the traditional security model.

Dynamic Auditing utilizes the Mandatory Access Control Base (MACSecure). Mandatory Access Control Base provides multi-factored security for establishing database system and object privileges. MACSecure consists of the following components: Factors, Rule Based Security, and Realms.

Dynamic Auditing is primarily tied to MACSecure because it leverages factors, rules, and realms for auditing. Dynamic Auditing provides the ability to audit based on factors, rules, and realms. For example, Dynamic Auditing provides the ability to audit a user based on an IP request/address, on an application, or a combination of factors.

Dynamic Auditing provides the mechanism for grouping objects or commands into a realm that is tied to MACSecure and makes auditing and audit management easier.

Dynamic Auditing detects violations to the audit/security baseline and monitor intrusions and insider threats. Dynamic Auditing is used as both a deterrent and to quickly detect successful and unsuccessful attempts to perform unauthorized operations, including any changes to the secure configuration and security policies.

Dynamic Auditing provides the ability to apply a set of factors to reduce, tweak, or refine the amount of audit data collected. In many instances, audit data captured by standard audit does not provide a rich data set to conduct in-depth analysis and reporting. Dynamic Auditing will provide the ability to focus the database audit on a more specific or refined set of data by using simple to complex conditions. It will provide the means to reduce the size of the audit data set returned and/or reduce the amount of audit data collect. This approach will provide a higher value and richer set of auditing data to analyze.

Dynamic Auditing makes it easier to establish auditing requirements to meet compliance issues. It will provide the ability to establish a realm of objects that are associated with a particular compliance policy. This provides the ability to associate or assign an audit to a particular compliance or privacy policy. Dynamic Auditing provides the ability to define a policy and specify a period of time in which the policy is effective. The dynamic rules allows conditions to be placed on "how" the audit is conducted. This provides the ability to limit when an audit to a certain set of conditions that is based on factors or objects or operations.

Dynamic Auditing will provide the ability to define a policy based on factors such as work shifts, work after hours, business hours that are trusted, etc. It provides the ability to test and monitor activity around what trusted and not trusted. For instance, a policy may be defined to give a DBA legitimate access to an object for a certain period of time. A policy violation will occur if the DBA attempts to access an object outside the defined time frame. For example, auditing separation of duties such as DBAs from APP DBAs.

Dynamic Auditing policies can be established and used to alert and notify trusted administrators when there is a violation to a policy. The policy violation is based on the data and will alert on a certain pre-defined conditions. It provides the ability not to alert on certain data but alert on pre-defined conditions. Dynamic Auditing will provide the ability to collect audit records based on pre-defined condition and send alerts based on violation to the conditions set in the policy. The capability will provide trusted administrators the ability take preventative actions against database intruders. For example, if a user attempts to penetrate a system and logs into an account with the wrong password or sends a request from a specific IP address that violates the policy. An alert will be sent when there is a violation to this policy.

An exemplary block diagram of an architecture of a Data Vault system 100, in which the present invention may be implemented, is shown in FIG. 1. Data Vault 100 may be considered as a database of databases. For example, databases that may be included in Data Vault 100 include Global Database 102, which may include other databases, such as data dictionary 104, security database 106, and audit database 108.

Data Vault introduces three new and very powerful security concepts, Factors, Realms and Rules to provide mandatory access controls (MAC), that ensure that database logins, database commands and role-enablement are allowed not just by the accounts that are privilege to do so, but under the conditions, called rule sets, set forth by a security administrator. Data Vault can be configured to leverage existing factors such as time of day, client location, or custom factors specific to the enterprise, to control the ability to login, execute database commands, and enable roles. Data Vault can be configured to limit the ability to use system privileges and maintain privileged database roles to special application database realms. Data Vault can be configured to use Real Application Clusters (RAC), Label Security, and Partitioning to restrict the ability to query and update highly sensitive data to specific network channels within the enterprise. The enforcement of these new access control features is audited and can be tightly integrated with auditing (Audit Vault) for reporting and alerting purposes in meeting compliance requirements.

The relational database management system (RDBMS) offered as part of the Data Vault is "hardening" and minimized using industry best-practices approaches to secure the overall RDBMS installation in the following categories password and profile management; initialization configuration; privilege management; operating system (OS) file and directory permissions; listener and OS port protections. Data Vault will introduce a handful of new and focused database roles that implement the concept of "separation of duties" so that the previously all-powerful SYS account and/or DBA role have fewer privileges than were previously available.

Business drivers—Compliance, Consolidate and Information Sharing

Today's enterprise data centric systems require comprehensive and integrated database security systems. Traditional information systems have not allowed data to be separated into different sensitivities within a single database. As a result, many organizations were forced to physically separate data on different machines on different networks, build complex application code, or rely on highly proprietary operating systems, which supported few commercial applications.

Data Vault is a secure end-to-end architecture that applies mandatory access control rules to the database. These mandatory access control rules can be applied to database operations, role based security and label-based security. The trust of the mandatory access control rules can be based on multiple factors such as physical architecture, configuration, and implementation.

Data Vault can support business information requirements that include:

Balance security with privacy

Capture information once at the source

Build trust into databases

Intended Product Usage

Data Vault will be used by an enterprise to secure business data with mandatory access controls (MAC) using multiple factors to define the overall security policy used to protect this data. The configuration that drives factors, rule database application realms, will be stored in database tables and maintained using the collection of PL/SQL APIs. The PL/SQL APIs can be used by an application developer in scripts that define a desired security configuration for portability among environments. A security administrator, who may also serve as the database administrator (DBA), will be able to use the provided user interface application to create and change aspects of a security configuration in any given environment. The user interface will also provide reporting capabilities on the security configuration of any given environment.

A DBA will be involved in the installation and maintenance of the Data Vault product. The DBA will also manage various aspects of a Data Vault environment, including implementing database-hardening tasks, managing the roles that are provided as part of the separation of duties concept and maintaining objects related to RAC and Partitioning when the product is used to protect data across multiple networks.

Several runtime aspects of the MAC environment will also be exposed to any given database session, e.g. get the identity of a factor or get the trust level of a factor, so that application developers can consider the Data Vault security policy during run time processing.

A Multi-factored Approach to Data Access Controls

Data Vault is highly configurable and uses a multi-factored, multi-layered approach to database security. Database factors such as time of day, the database client's location on a network can be used in addition to the normal database account and database role privileges to restrict data access and the ability to execute database commands. Data Vault provides the security administrator with the ability to define factors based on the database operating environment, such as the network a database server operates and is configurable such that the administrator can add factors specific to the enterprise, audit factor processing and control whether or not factors can be set dynamically. Once these factors are identified, they can be made accessible to database sessions and applications using standard SQL and PL/SQL. For example, suppose we have two factors that show the expose the application program and the IP address of the client accessing the database with this program, as shown below:

```
SQL> select DVF.F$PROGRAM from dual;
F$PROGRAM
------------------------------------------------
myapp@myhost.com
SQL> select DVF.F$CLIENT__IP from dual;
F$CLIENT__IP
------------------------------------------------
207.46.19.60
```

These two factors can be used in conjunction with Label Security and/or Virtual Private Database technology (VPD) to restrict sensitive data such that it is only exposed to a database session when these two factors are set as in the example above. Data Vault also provides unique components that are integrated with Real Application Clusters (RAC), Partitioning, and Label Security to offer a true multi-level security (MLS) database operating environment. With this integration, Data Vault can provide protections that will even downgrade a user's data access privileges depending on the network they access the database from.

Figure 2:
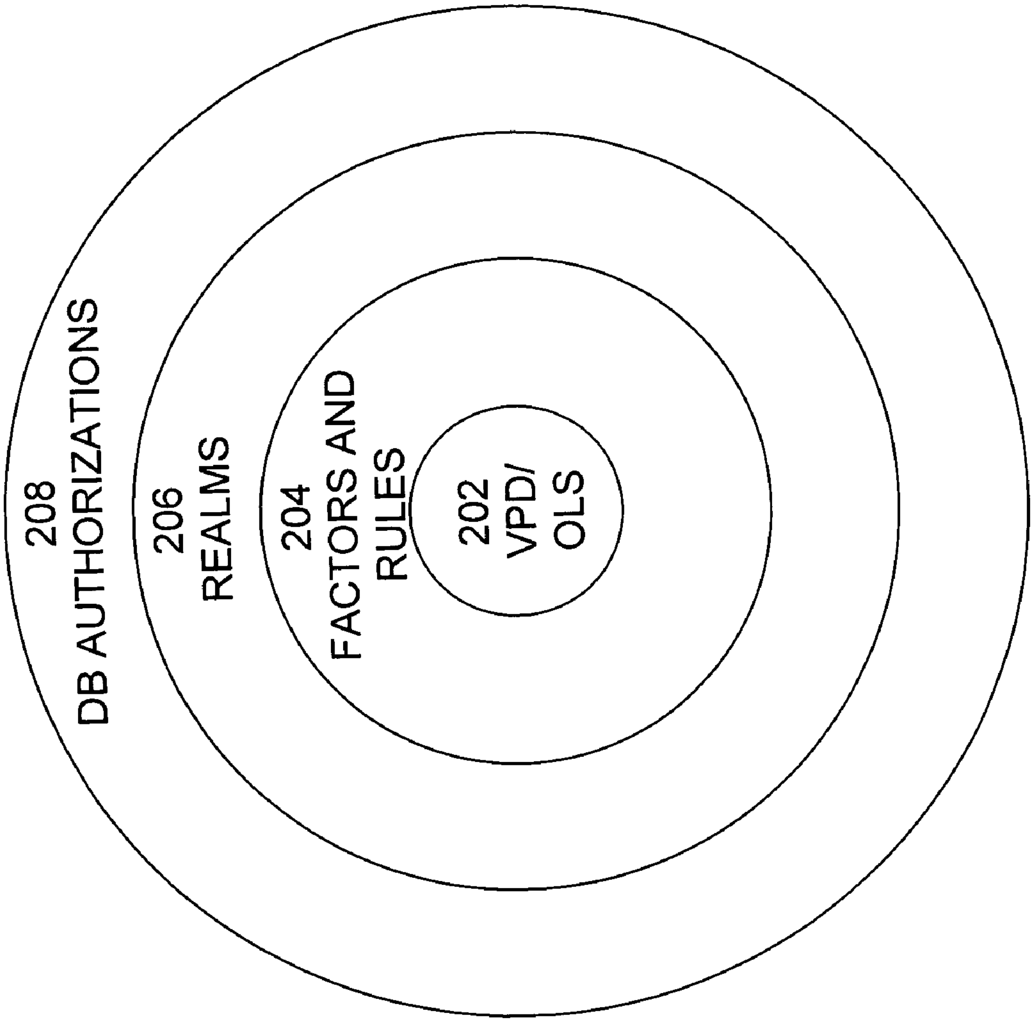
FIG. 2 illustrates an example of a layered security model as provided by the present invention.

An example of multi-level security as provided by the present invention is shown in FIG. 2. As shown, at the center, Virtual Private Database technology (VPD) and/or Label Security (LS) 202 are used in conjunction with two-factor verification to restrict access to sensitive data. This level of security verifies the presented factors and only exposes a database session when the two factors are properly verified. Once the factors are verified and the session exposed, the next level of security, factors and rules 204, is used to further restrict access to data. Typically, such factors and rules 204 relate to additional criteria to determine whether access to particular data should be granted. For example, factors and rules 204 may include restrictions based on time of day of the access, location of the user, IP address of the user, etc., or combinations thereof. Once the access has satisfied the rules related to the access, the user is not given access to the entirety of the data, but rather is only given access to the particular realm or realms specified for the rules the user has satisfied. This next level of security, realms 206, only exposes to the user a defined set of resources, as is explained in greater detail below. Finally, the database authorizations level 208 requires the proper satisfaction of all previous levels of security in order to provide actual access to the data itself. For example, the combination of properly verified factors, satisfaction of the required rules, and access using the correct realm may be required in order for a user to actually access any data. In addition, any violation of any condition at any level of security may trigger a security audit event.

Label Security functionality may be used to achieve the following:

- Associate a factor identifier with an existing policy and label combination. These labels will be used to construct the maximum session label for a database session.
- Associate a factor to an existing policy as well as the labeling algorithm used to determine how to construct the maximum session label for a database session
- Enforce the establishment of this maximum session label for a database session, ensuring that no database session calls the underlying OLS APIs to set a user label higher than is allowed by the Data Vault MAC configuration.

Data Vault Realms

A best security practice is to assign "least privileges" to users such that their privileges do not exceed the intended usage for a user's roles and responsibilities. In many cases, however, convenience and manageability often take precedence. It is not unusual to find many database accounts granted the DBA role or granted many system privileges when they are not required. Application administrators are often granted the DBA role even though the scope of their system privileges should be restricted to the application data that they manage. Even Database Administrators should be restricted from accessing and manipulating business application data. Data Vault "realms", such as realms 112A-N, solve this problem. A realm is defined as a set of database schemas, objects, and roles. A user attempting to use a system privilege that impacts a protected realm must be authorized within the realm in order for the usage to succeed.

Figure 3:
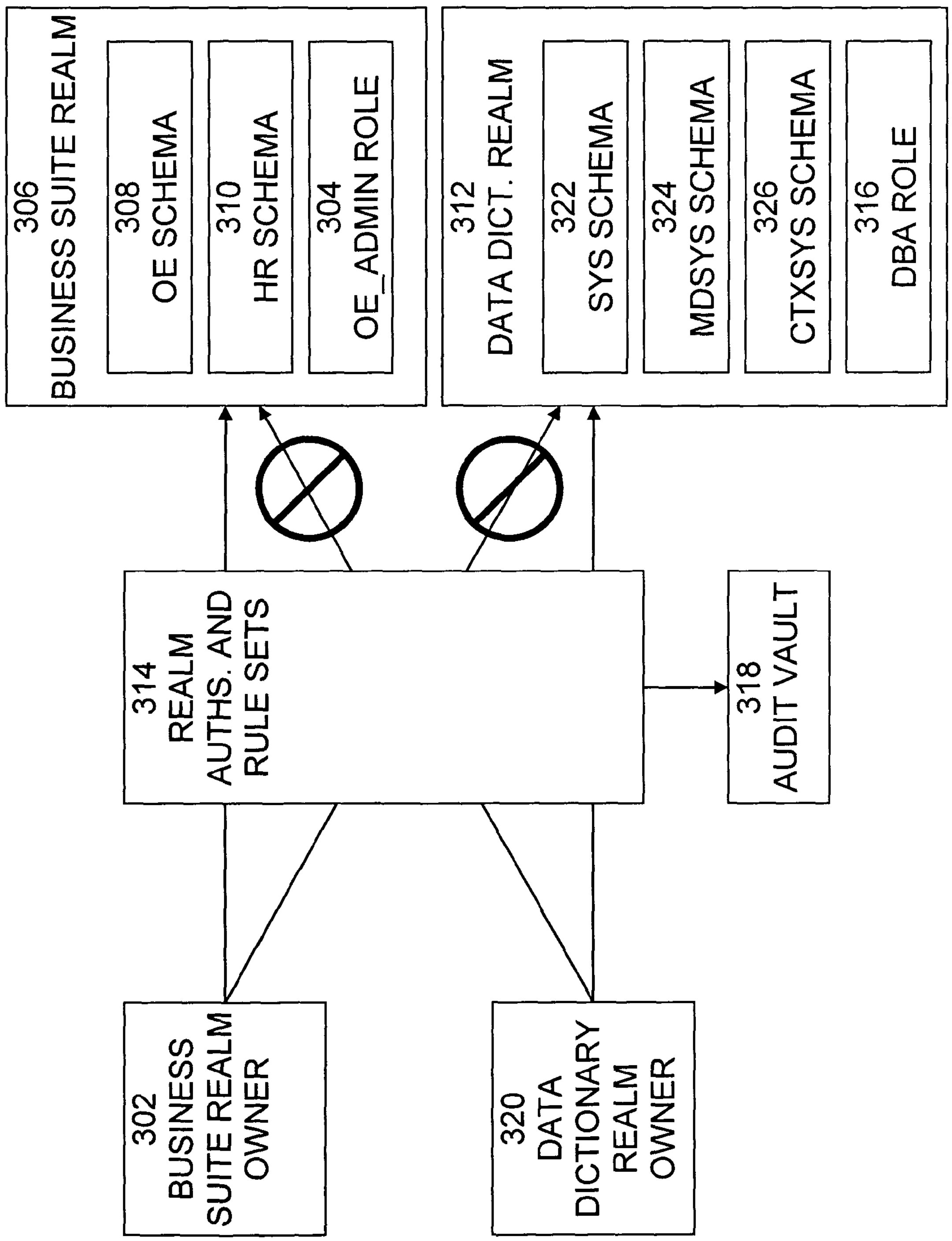
FIG. 3 illustrates an example of the operation of realms

An example of the operation of realms is shown in FIG. 3. In this example, two users have the same system privileges. One user is an E-Business application administrator/owner 302 who has system privileges through the OE_ADMIN role 304. This role is assigned to be a realm owner of Business Suite Realm 306, which includes schemas/objects that support the E-Business Suite of applications to include OE schema 308 and HR schema 310 and the OE_ADMIN role 304 itself. The E-Business application administrator/owner 302 can issue database statements, such as CREATE TABLE, DROP TABLE, and SELECT TABLE, against objects in the assigned realm, but is restricted from issuing these commands against unauthorized realms, such as the Data Dictionary Realm 312, by realm authorizations and rule sets processing block 314. Furthermore, only a realm owner can grant or revoke database roles that are protected by the realm, such as OE_ADMIN role 304, but cannot manage roles protected by other realms for which the user is not authorized, such as DBA role 316, which is included in Data Dictionary Realm 312. Any unauthorized attempt to use a system privilege to access realm-protected objects will create a realm violation. Realm violations will be audited and can be reported on and generate e-mail and pager alerts when integrated with Audit Vault 318.

Command Rules

Figure 4:
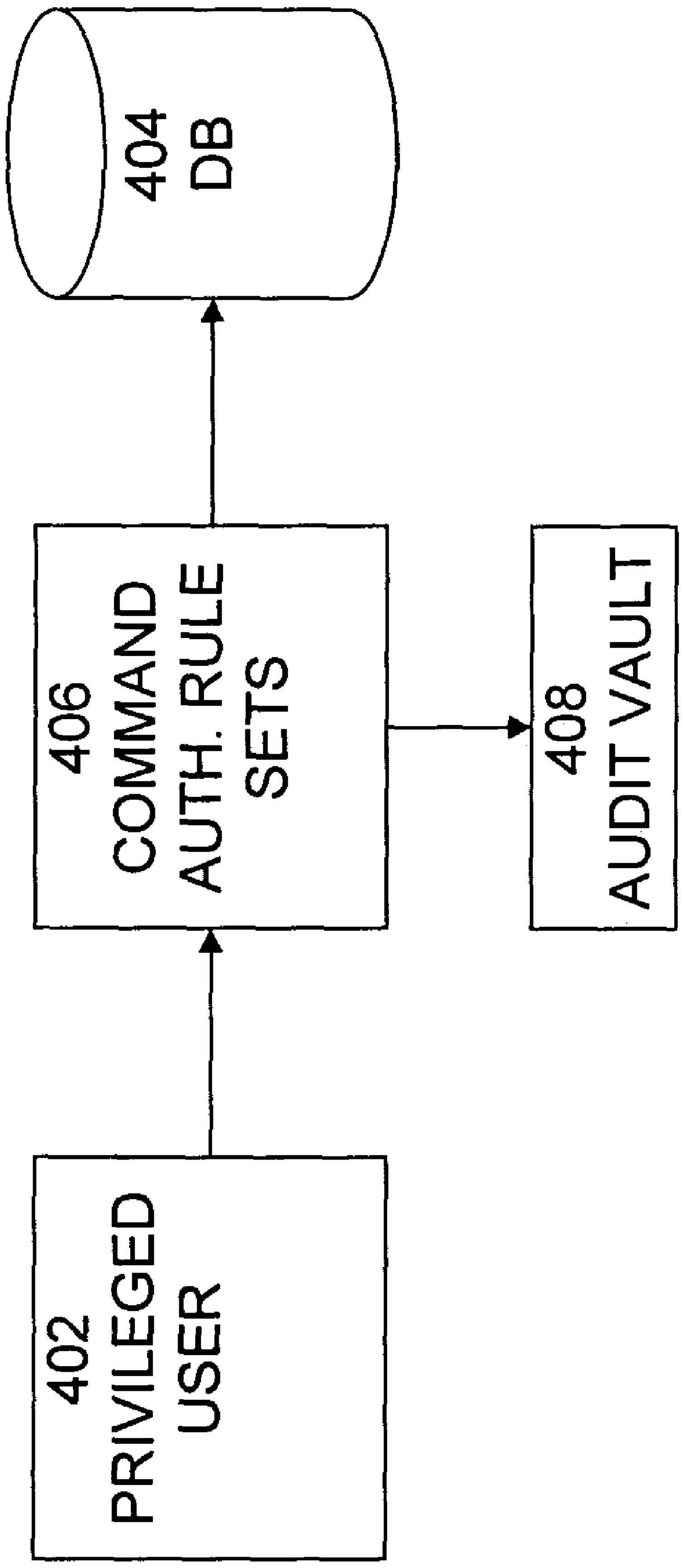
FIG. 4 illustrates an example of the operation of rule evaluation.

Data Vault provides a rules-based, access control enforcement engine on top of the existing discretionary access control mechanisms, which delivers a comprehensive, flexible multi-factored approach to access control in the database. Rule sets can be used to authorize accounts and roles in Data Vault Realms as described above, but can also be used to control the execution of database commands based on one or more factors. The success or failure of a rule set can be configured to create audit records and to perform customized database processing, such as triggering a workflow process, in response to security events. Data Vault can trap the execution of DDL commands and evaluate a rule set to determine whether or not to execute the command. Data Vault allows these rule sets to be used to control the ability to log into the database, the ability to enable a Secure Application role, the ability to execute commands that make structural changes during operational business hours (CREATE TABLE, ALTER TABLE, DROP TABLE) or to restrict database account management (CREATE USER, ALTER USER, DROP USER) to administrators that have a specific role. An example of this is shown in FIG. 4. A user 402 having certain privileges, such as to execute commands that make structural changes to database 404 or to perform database account management, requests execution of commands via command authorization processing block 406. Command authorization processing block 406 uses command authorization rules to determine, for each command, whether the user 402 is authorized to perform that command. Such rules may be based on factors such as the user's identity, location, access path, time of day, etc. Violations are reported and processed by Audit Vault 408.

Locked Down Database

Data Vault will deliver a locked down database, which is designed for storing and managing enterprise business application data with least-privilege principles. This locked down database includes a secure initialization configuration, a secure password and profile management policies, a secure system and object privilege management policy, a secure operating system (OS) file and directory permission policy, a secured database listener and port protections, and several out of the box Data Vault realms for protecting the system catalog, Label Security configuration as well as the Data Vault configuration. Further protections include an extensive audit policy on the database operations and changes to this trusted environment when integrated with the Audit Vault product.

Enterprise Access Control Policy Management and Reporting

Data Vault provides an EM-pluggable application to manage the access control policy of the database. The application is built on top of a set of the Data Vault PL/SQL APIs for access control policy configuration and a series of database views on this configuration data. This application allows security managers, who may not be proficient in PL/SQL, to configure the Data Vault access control policy with a user-friendly interface. The application provides an extensive collection of security-related reports that will assist the security manager or analyst to understand the baseline security configuration and report on deviations from this baseline.

Data Vault For Cross Domain Security

Data Vault may be implemented many ways for many uses; however, as implemented for cross domain security, it allows "air gapped" security domains/networks to share a single database via a number of technologies that enforce the following critical PL4 architecture requirements:

Network Isolation—Security domains/networks remain "air-gapped" (up to and including having dedicated database servers). Real Application Clusters (RAC) technology is used to allow these database servers to access the same database. Mandatory Access Controls (MAC) are used to label the network based on multiple security factors. Data labeled higher than a particular network is not allowed to exist on that network or its database server(s).

Physical Data Separation—Data is labeled using Label Security (LS) and is partitioned on disk by its data classification label using Partitioning. Partitioning allows a single database table to be partitioned based on a partition key (such as the classification label field). Each partition can be stored in a specified tablespace using specified files/disks. Using this approach, data of different classification levels are stored on different disks and even on different disk arrays.

Process/Memory Separation—A network and its database servers are only allowed to access data labeled appropriately for the network (at its security level or below). Data partitioning ensures that data blocks, pulled into memory, do not cross partition boundaries.

Figure 5:
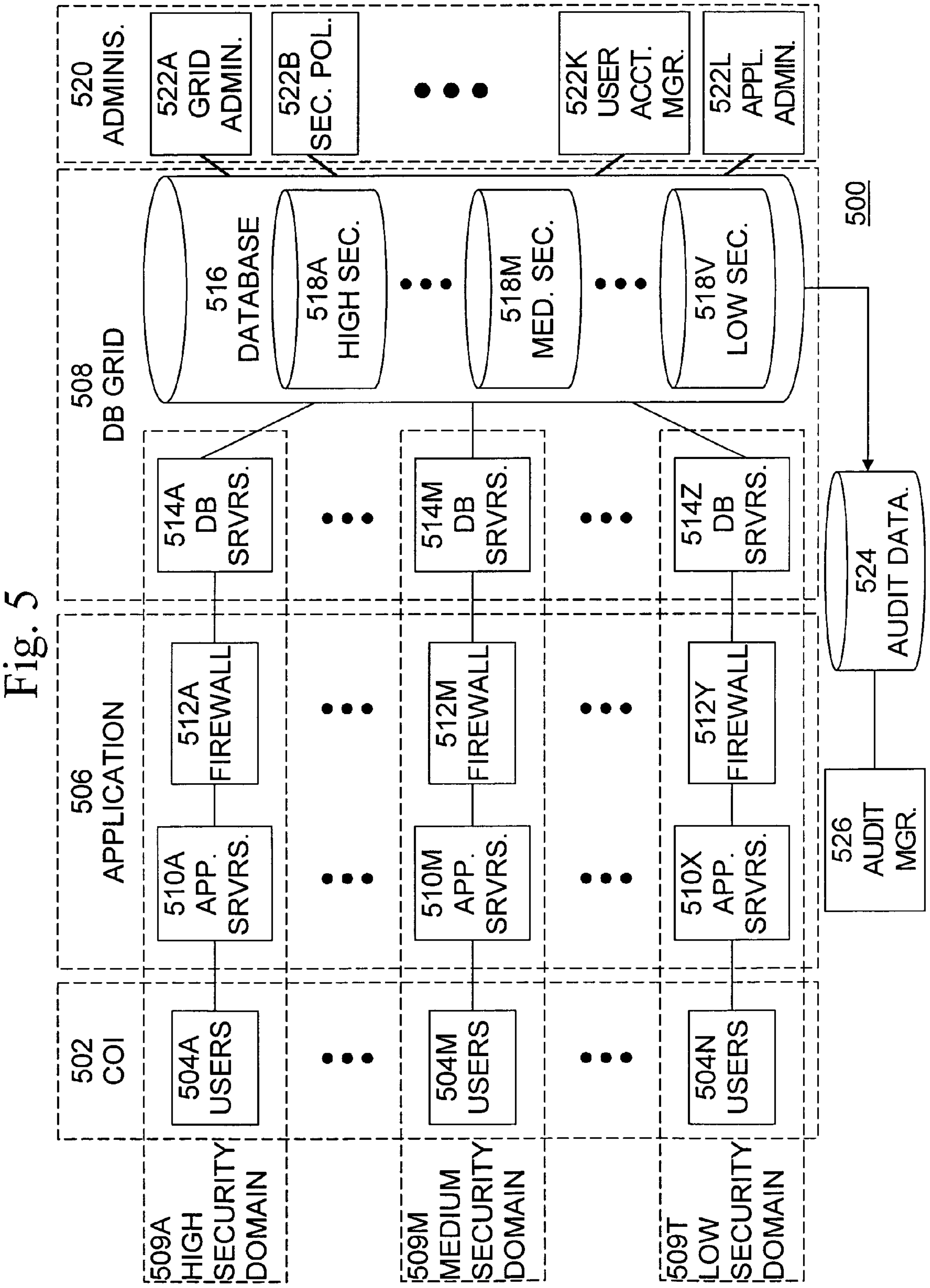
FIG. 5 is an exemplary block diagram of a Data Vault Notional MLS Architecture.

An example of a Data Vault Notional Architecture 500 is shown in FIG. 5. A community of interest (COI) 502, including one or more users 504A-N, uses application services 506 to access database grid 508. COI 502 includes users at a number of security levels. Each user accesses database grid 508 using a network domain of the proper security level. Thus, high security users 504A use high security domain 509A, medium security users 504M user medium security domain 509M, and low security users use low security domain 509T. Domains 509A-T are isolated from one another, that is, no data flows between domains, except possible at specifically defined and secured gateways. Application services 506 are provided by one or more application servers 510A-X, and provide access to DB grid 508 via firewalls 512A-Y. DB grid 508 includes one or more database servers 514A-Z, which provide services to access database 516. Application servers 510A-X, firewalls 512A-Y, and database servers 514A-Z, like users 504A-N, are isolated by domain. However, database 516 is not isolated by domain. Rather, database 516 itself is accessible from any and all domains. Security is provided by partitioning of data within database 516. Database 516 includes a plurality of data partitions of different security levels, such as highest security data partition 518A through lowest security data partition 518M. In addition, database administrators 520, including one or more administrators 522A-L, can issue commands that change the structure of portions of database 516 and commands that affect users 504A-N. Examples of such administrators include a database grid administrator 522A, a security policy manager 522B, a user account manager 522K, and an application administrator 522L. System 500 also includes audit data 524 that is generated based on the operations requested, performed, denied, etc. by system 500, as well as based on the evaluation of rules and factors and their interaction with users, domains, etc. Audit data 526 is configured and maintained by audit manager 526, which also provides the capability to process audit data 524 and generate alerts based on the audit data, as well as reports based on the audit data.

Using architecture 500, COI 502 can meet both its data security and data sharing requirements for even the most sensitive data. The data is written once and shared across networks/domains as allowed. Users on the highest domain can access data across all classifications, as permitted, without having to log into multiple networks or replicate data. All domains access just one database as their single point of truth. Domains may access the same tables and the same applications can be run on all domains.

Using the configuration illustrated in FIG. 5, data is partitioned by its security or classification label, data partitions 518A-M. Without configuring additional restrictions, this would allow medium security data created on a high security network to be immediately available to authorized users on medium security domain.

Figure 6:
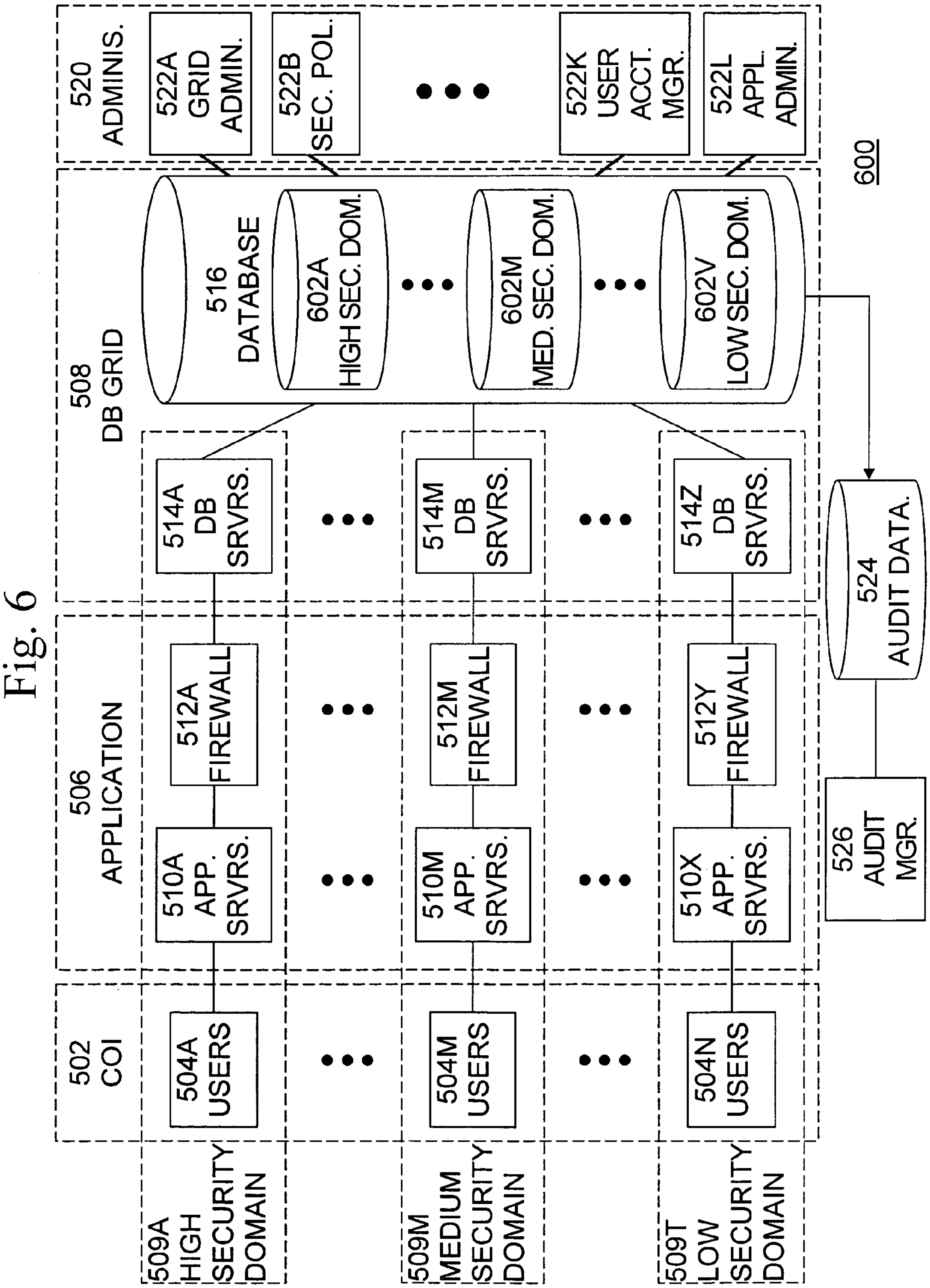
FIG. 6 is an exemplary block diagram of a Data Vault Notional Architecture.

Alternatively, data can be partitioned by its domain security label as shown in FIG. 6. In this configuration, data in a partition having a particular domain security label can only be accessed by the domain having the same security label. Using this configuration, medium security data created on high security domain 509A would be stored in the high security domain partition 602A and would not be available to users on the medium security domain 509M, even though their security level is otherwise sufficient, unless the domain security label on the data was changed.

Cross-Domain Security for Data Vault provides the ability to bridge networks and maintain virtual separations, virtual channels, virtual domains, as if it were on its own enclave and totally transparent to the application.

It is an implementation involving secure communication of multiple Data Vaults across two or more domains. To meet cross-domain security requirements, the implementation must have physical separation of data, network separation, domain identification, and controls for information flow within and outside of the domains. The reference architecture and definition identify the domains and what activities are allowable within those domains. It is a definition in terms of what are the data flows and the rules that are established. It can be defined as:

- A reference architecture; configuration based on MACSecure and MACOLS. MACOLS—To bridge multi-level networks. Builds on Label Security (LS). To establish multi-factored session labels based on least privilege model. MACSecure—To provide multi-factored security for establishing database system and object privileges for a given session. (Label Security OLS not required)
- Establishes a definition of what a domain looks like. Establishes what a domain is and how you trust it.
- Data—should be identified as shared across those domains (Label Security). Each domain has a label associated with it for identification.

The foundation of Data Vault is based on a GRID architecture. The physical architecture leverages Real Application Clusters (RAC), Label Security (LS), Data Vault (factors & rules), and Partitioning. The physical architecture leverages the following components:

- Real Applications Clusters (RAC) The architecture utilizes Real Application Clusters (RAC) and two separate switches (network isolation, physical separation, and data separation).
- Label Security (LS)
- Data Vault (Factors & Rules)
- Partitioning
- Assign labels
- MAC Secure labels
- Access
- Data Blocks
- Labels for partitioning of data.

Data Vault leverages the database GRID architecture for its inherent scalability and availability; plus it creates a new use for Real Application Clusters by creatively implementing them as the central architectural component for bridging security domains. Database Servers on each domain are clustered to share a single 10 g database. The database implements table partitioning by label and keeps data stored in separately labeled storage arrays (possibly encrypted). Various technologies including a UDP firewall prevent higher-level data from being accessed by lower-level security domains/networks.

Availability and Scalability with Real Applications Clusters (RAC)

- Network Isolation
  - Enforce Mandatory Access Control based on network
  - Node(s) associate specific network with corresponding label
  - Connections only accepted from specific IP address
  - Connections only accepted from authenticated processes/application servers
- Physical Data Separation
  - Data labeling controls physical data location
  - Enforce data location via Database Partitioning
  - Ensure single label within a block
  - Minimize effects of media failure by isolating data
- Process and Memory Separation
  - Dedicated node(s) for each network
  - Processes are associated with label of the Network
  - Single database accessible from all nodes
  - Utilize Real Application Cluster to allow instance per node
  - Secure Application Roles enforce connectivity and access on per node basis
  - Partition elimination guarantees disk access by security realm of node
  - Enforce User Need-to-know within the MAC of the network
- Overall System Hardening
  - Configure OS
  - Lock down OS
  - Limited OS Accounts to Root
  - Limited Server Administration Access to Console
  - Remove all extraneous processes including FTP, NFS, SMTP, HTTP
  - Strong Authentication for all OS accounts
  - Auditing
- Lockdown Database
  - Services
  - Privileges
  - Secure Schema
  - Auditing
- Lockdown Network layer
  - Install Firewalls and
  - Intrusion Detection Systems
  - Auditing
- Database, Operating & Network Lockdown Furthermore, scripts and procedures are used to harden the database, operating system, and network. The Database Servers become "secured network appliances" whose sole function is to securely share and manipulate data.

Database Session—the database session must be restricted to the least privilege model for system and object accesses. Rules must evaluate for enabling privileges and a max session label must also be established based on the lowest level and intersection of compartments and groups for the key mandatory factors required.

Security Realms, Privileges, and Max Session Label will be set during Logon of every database session. OLS Triggers must be replaced; session labels cannot be altered once established.

The OLS Session Label can be altered on behalf of the end user, but only within the realm of the max session label. OLS routines for altering session labels must be wrapped and controlled. (Set_label, Set_Access_Profile)

Secure Application Roles will be used to enable object privileges and session label. Privileges and Session label will be based on rules strengthened by multiple factors, not just the user.

The Rules and Labels can be based off of some of the following Factors:

LOGON Schema Name

Database Instance Name, when RAC is a key factor

Server Instance Host Name

Server Instance Host IP

Client Host Name

Client IP

Authentication Method

Application End User Name

Labels and Privileges can be granted to each of these.

Write Session Label to Audit Trail

Identifying Network Domains

Figure 7:
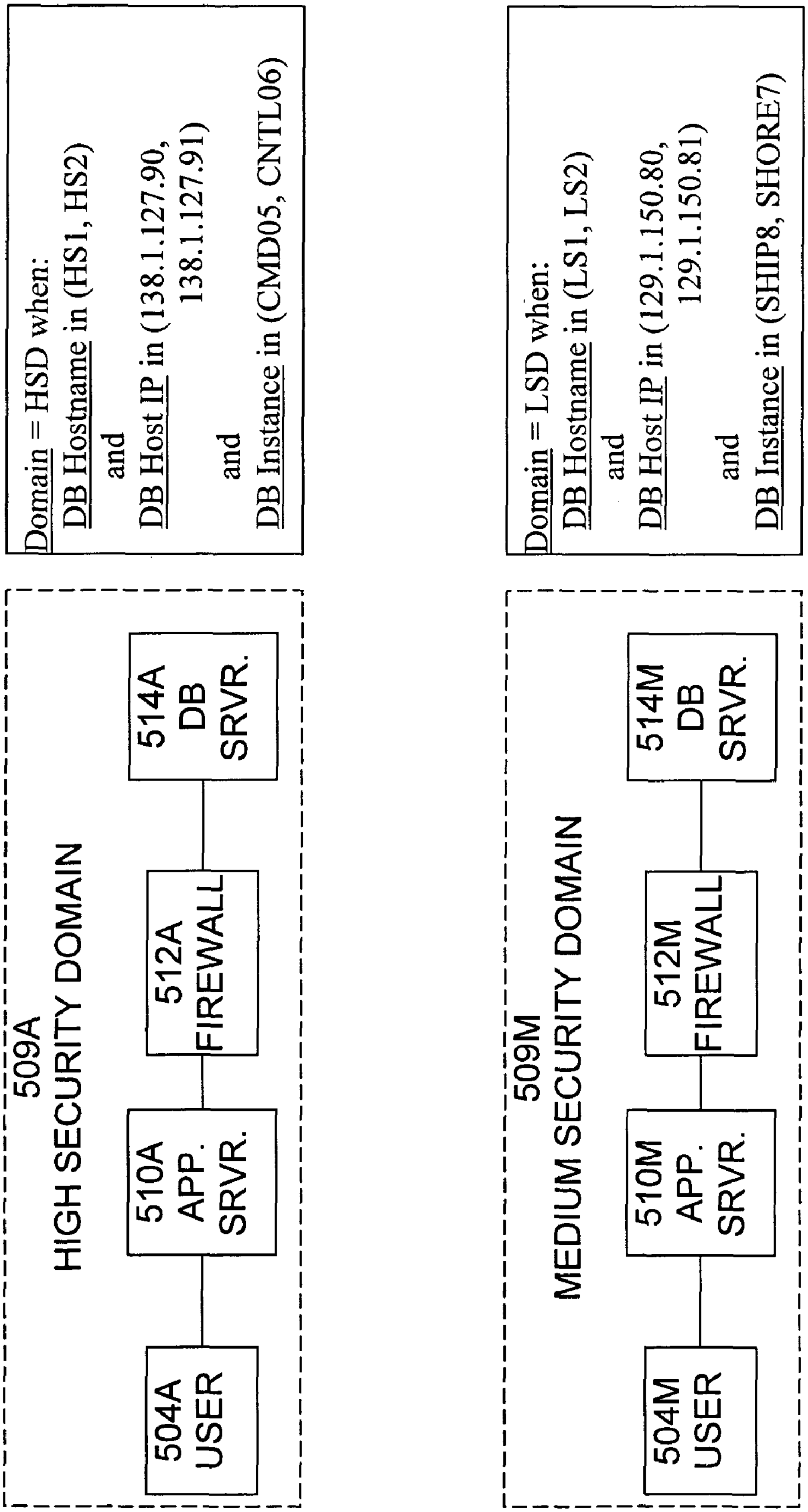
FIG. 7 illustrates a multi-factored approach to identifying multiple network domains

For greater assurance, Data Vault uses a multi-factored approach to identifying network domains, for example, as shown in FIG. 7. The Data Vault (DV) administrator determines what factors are used for domain identification. For example, database hostnames, database host IP addresses, database instance names, application server hostnames, router/switch identifiers, etc. may be used. The DV administrator then configures the factors, how they are evaluated, and their proper identities using the DV MAC Configuration web-based tool. These factors are evaluated at runtime for each database session logon. Only when all factors are evaluated to have the proper identification, is network identification successful. Data Vault can be configured to terminate database connections during logon when the network is not properly identified, such that if a hacker successfully spoofs of a subset of domain factors, attempts to gain access to the database will still be thwarted.

Providing Mandatory Access Controls For Labeling

A domain itself is a factor. The domain can be identified by a set of factors and labeled by another set of factors or labeled directly. If labeled by other factors, the label of the domain is derived at runtime by applying a specified MAC policy algorithm against the sub-factor labels. In the example shown in Table 1, the High Security domain is labeled by its db hostname, db host IP, db instance name, and the user's authentication method. The label is displayed as <Clearance Level>:<Compartments>:<Groups>.

TABLE 1

Data Vault Factors used to Label the High Security domain

| Factor Domain | Sub-Factor | Identity High Security | LS Policy Label |
|---|---|---|---|
| | DB Hostname | TS1 | TS:A,B,C:1,2,3 |
| | DB Host IP | 138.1.127.90 | TS:A,B,C:1,2,3 |
| | DB Instance Name | CMD05 | TS:A,B:1,2 |
| | Authentication Method | PKI/SSL | TS:A,B:1,2,3 |
| | Authentication Method | Database | TS:A,:1,3 |

Assume that the MAC policy algorithm is set to LII (for Least/Minimum Level, Intersection of Compartments, Intersection of Groups). If a user connected to the CMD05 database on the High Security network using PKI/SSL authentication, then the High Security label is calculated to be: TS:A, B:1,2. However, if the user authenticated using database username/password authentication, then the High Security label is calculated to be: TS: A,1. Thus, Data Vault can be configured to restrict access based on access/authentication channels. The network label contributes to establishing a user's Max Session Label and Effective OLS Label, which limits the data a user can access in any given session.

Data Vault extends OLS with a component called MACOLS that provides the mandatory access controls essential for cross-domain security. Data Vault combines the domain label with the user's OLS Effective Label to derive a Maximum Session Label (using an algorithm such as LII). The OLS Effective Label is then reset to be equivalent to the Max Session Label.

TABLE 2

Data Vault MACOLS Settings

| Database User | Domain/ Domain Label | User's OLS Effective Label | Max Session Label | Recalculated OLS Effective Label |
|---|---|---|---|---|
| SCOTT | High Security TS:A,B:1,2 | TS:A:1,2,3 | TS:A:1,2 | TS:A:1,2 |
| SCOTT | SIPRNET S:A,C,D:1,2 | TS:A:1,2,3 | S:A:1,2 | S:A:1,2 |
| MARY | High Security TS:A,B:1,2 | TS:A | TS:A | TS:A |

As shown in Table 2, Data Vault can simultaneously prevent users and networks from accessing/transporting data for which they are not cleared. Notice that while Scott has the same clearances, his access changes based on his network domain connection.

Mandatory Access Control Label Security (MACOLS) extends the notion of Label Security (LS). MACOLS wraps and supersedes the functionality of LS. MACOLS provides security labels to factors (beyond labeling just data and users). MACOLS uses a multi-factored approach to establish the maximum-security label for a security domain/network and labeling the user's session at runtime.

MACOLS extends the security labeling capabilities to Factors, Domains, and more. A security label assigned to an Authorized Security Value or a collection of database object. Labels can be assigned to any component or underlying database including host name, IP address, router, switch, proxy servers, database instance, database table (and rows), database view (and rows), database schema, database partition, database tablespace, database data file. The database instances will be marked with a maximum-security label that must include level (S, TC, etc.) and compartments (A, B, C, etc.).

Max Session Label—the Security Label for a session must be controlled based on factors other than the User. MACOLS allows each OLS policy to define which factors to use and the method for calculating the MaxSessionLabel. The calculation is based on the OLS Merge Label Format Clause. The preferred method for calculating the MaxSessionLabel is LII, Lowest Level, Intersection of Compartments, and Intersection of Groups. Every database session will have a MaxSessionLabel, which is established during session creation, thereby limiting the OLS session label.

Factors—the Factors that establish the MAX_SESSION_LABEL per are defined per the security Policy. The security label of the Database User is used as the initial_session_label, then the Max session labels are established using the OLS Merge_label Function. Preferably, a Merge Label Format is applied to each Factor as it is established for the Max_session_label. For example:

There may be a factor that wants to Raise or Lower Level
There may be a factor that wants to add Compartment
There may be a factor that wants to add Groups
Default to Policy Rule when Factor Rule does not have a rule
An example of an OLS Merge Label Formats is:
Parameter is a 3 character fixed format
1: Level H or L
2: Compartments U, I, M, N
3: Groups U, I, M, N wherein H is the Highest Level, L is the Lowest Level, U is the Union of Components, I is the Intersection of Components, M is the difference of Components L1 (components) minus L2 (Components), and N indicates Leave Null, do not merge into new Label.

For example, for Establish MAX_SESSION_LABEL

| Policy Factors | Identity | LABEL |
|---|---|---|
| NETWORK | LOW | SE: |
| AUTH TYPE | PKI | TS:A |

Given the merge algorithm of LII, the MAX_SESSION_LABEL is "SE:"

| Policy Factors | | |
|---|---|---|
| | NET | "LII" |
| | USER | "LII" |
| | AUTH | "LUU" |
| Factor | Label | Max_session_label |
| NET | TS:A,B,C | TS:A,B,C |
| USER | TS:A | TS:A |
| AUTH | SE: | SE: |

Dirty Word Check—a set of Key Words that can be searched as text is established at each level, to support Downgrading of Record/Document/data. For example, TOP SECRET cannot exist as term in a Secret and Below Record. A keyword List may be defined:

KEYWORD List
  List_Name Max_label, Min_Label
  Index whole record with Text
Then,
Use Labeling Rule/Data-->New Record->Check_List->return Highest Level of Term within List, Label Record.
Use For Downgrading-->Record, New Label, Check_list->Return TRUE/FALSE if can be downgraded to New Label then Label Record
WorkFlow-->Downgrade must be approved by Security Admin at Certain Levels,
  Downgrade Request:
    Requester
    New Label
    Justification
Document to be downgraded (Assemble Document from Data Tables)
  Assemble Data from tables into a document
  Mark each section
  Check_List
  Downgrade Document or Segments
  Approve
  Update Database records.

Data Labels and Storage Separation—Data Label Numeric Tags must be controlled and verified based on the Partition Range Clauses.

A Data Label is made up of a Numeric tag which is attached to a records in on table
The table is partitioned by the data label tag to control physical storage of the data records within an Database block structure contained within a data file. This will ensure that data records of different sensitivities are not commingled. This also supports the partition elimination during a database access, significantly lowering the risk of block being requested and read into and Instance of Shared Memory on a node.
The Label tags must be controlled when data labels are created. The tag must fall with a security range to ensure physical data separation
Database Tables:
Should be partitioned by a label ranges
Table Partitions should be assigned to tablespace designated for storage of each security range/Domain.
The tablespace must be associated with a physical storage/file paths
Dedicated storage must be established for each Security range/Domain.

Figure 8:
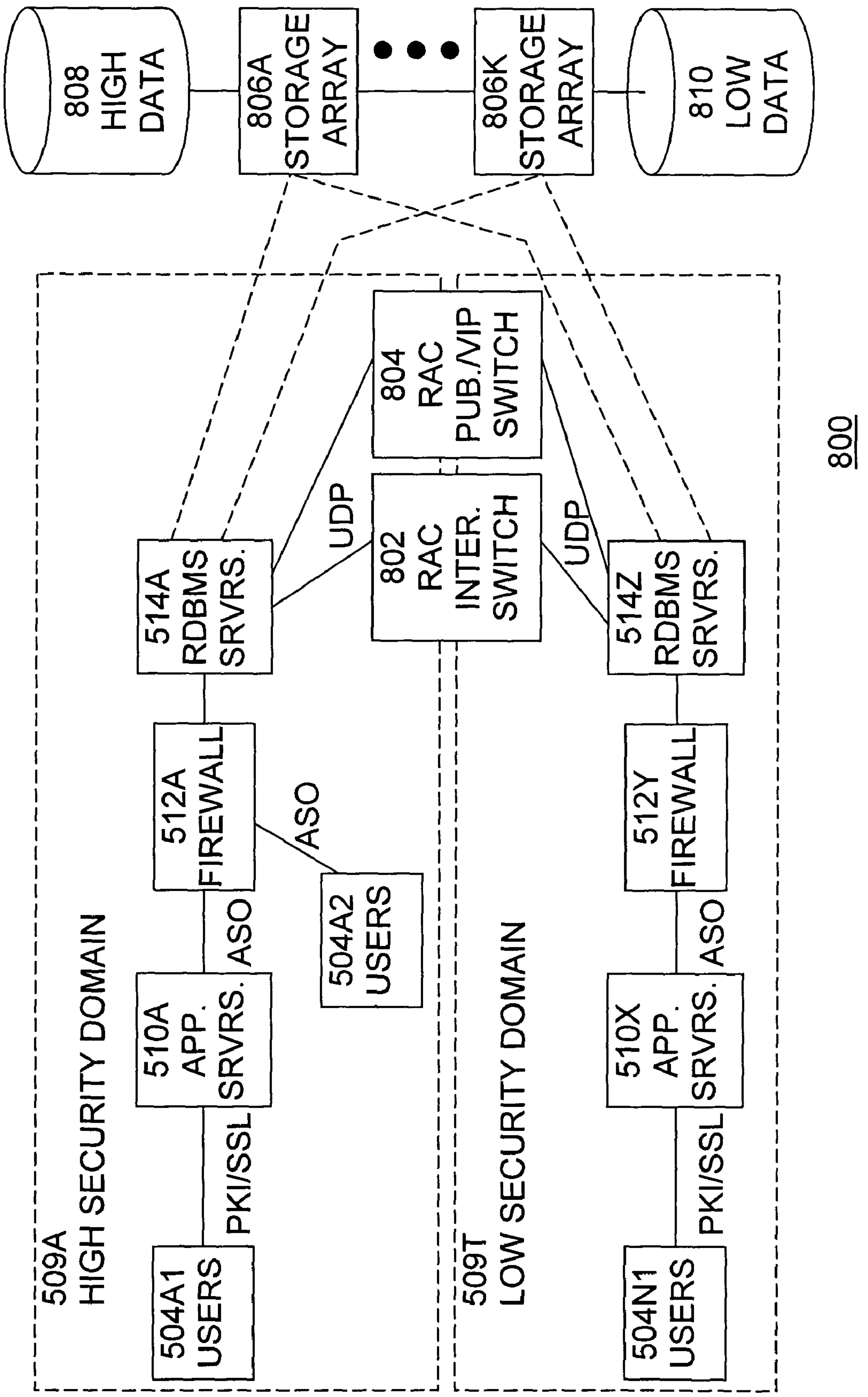
FIG. 8 is an exemplary block diagram of hardware architecture in which the present invention may be implemented.

An example of a hardware architecture in which the present invention may be implemented is shown in FIG. 8. In this example, users in a domain, such as user 504A1 and user 504N1, communicate with application servers 510A, 510X over a secure connection, such as a Public Key Infrastructure (PKI)/Secure Sockets Layer (SSL) connection. Application servers 510A, 510X, as well as additional users, such as users 504A2, communicate via firewall 512A, 512Y with database servers 514A, 514Z, which are typically providing Relational Database Management System (RDBMS) functionality. The database servers in different domains 514A, 514X communicate using RAC interconnect switches 802 (system or card) and/or RAC public/VIP switches 804 (system or card) using a protocol such as User Datagram Protocol (UDP). In addition, the database servers in different domains 514A, 514X communicate with storage array 806A-K, which stores data including high security data 808 and low security data 810.

This communication may use a protocol such as Fiber Channel over IP (FCIP), Small Computer System Interface (SCSI), etc.

With the architecture shown in FIG. 8, end-users may access an Application Server (AS) 510A, 510X, but end-users may access the RDBMS 514A, 514Z directly. The end-users in highly secure environments compute on different networks (domains augment the concept of a network tying it to a particular clearance level) that are typically "air-gapped". Data Vault supports the concept of end-users, HTTP servers, application servers operating on different networks, with the same applications. However, Data Vault is not implemented as a separate database for each domain or network, but leverages RAC technology to provide two or more dedicated RAC nodes to each domain or network. The intent is to allow database information to be shared among different domains, where appropriate, in a secure manner so that data classified at higher levels is only processed by RAC nodes marked at a level equal to the data or higher. Data Vault and additional technologies such as Partitioning, Label Security (LS), and Virtual Private Database (VPD) are used to ensure that data is shared securely and with a high level of assurance by providing the link between the secure computing environment and its domains using a concept called factors.

For example, each RAC node may have one network card 802 to support the private network switch RAC requires and one network card 804 that will also be "private" but will support the typically public network interface and virtual IP that is required for all RAC instances. This second private network ensures that installation and maintenance of RAC does not occur over the separate domain networks. The result is that Data Vault introduces the concept of an administrative network to the typical RAC architecture. With these two "private" networks, administrators can ensure that only the RAC nodes can reach all of the other RAC nodes. Database clients may access the appropriate nodes from a third network interface installed on each RAC node. This third network interface can be plumbed and made available on the domain specific network after the RAC and Data Vault installation, configuration and testing process is complete in any given environment.

RAC requires some form of shared storage and can leverage Fiber Channel (FC), Network Attached Storage (NAS), and Direct Attached Storage (DAS) storage subsystems in the same manner. Data Vault can leverage technologies such Partitioning and Automatic Storage Management (ASM) to ensure that data classified at different levels is stored on different physical disks. Encryption technology in the database as well as third-party products can be used with RAC and Data Vault to encrypt the data at rest on the storage subsystem and provide controls over the processes that can access these encrypted files.

The RAC nodes may be configured as database appliances. Network services such as FTP and Telnet are disabled. File permissions are set to be highly restrictive. O/S auditing is enabled. The network listener is specially hardened, and the like. O/S specific hardening is applied.

In secure environments, the end-users have certificates installed on their browsers to interact with the HTTP and application servers in this type of architecture. In highly secure environments, the clients to HTTP and application servers should also be required to authenticate to the server with a client certificate. In the Data Vault architecture end-users should still be required to authenticate to servers. Additionally, application servers and any database client are required to authenticate to the database server using a client certificate and use Secure Sockets Layer (SSL) encryption. Data Vault uses of Advanced Security to provide the protection of data in transit. Additionally, switching equipment with firewall capabilities should be placed in front of all RAC nodes as part of a high-availability implementation of Data Vault. With this architecture and approach Data Vault can enforce the critical PL4 architecture requirements described above.

Figure 9:
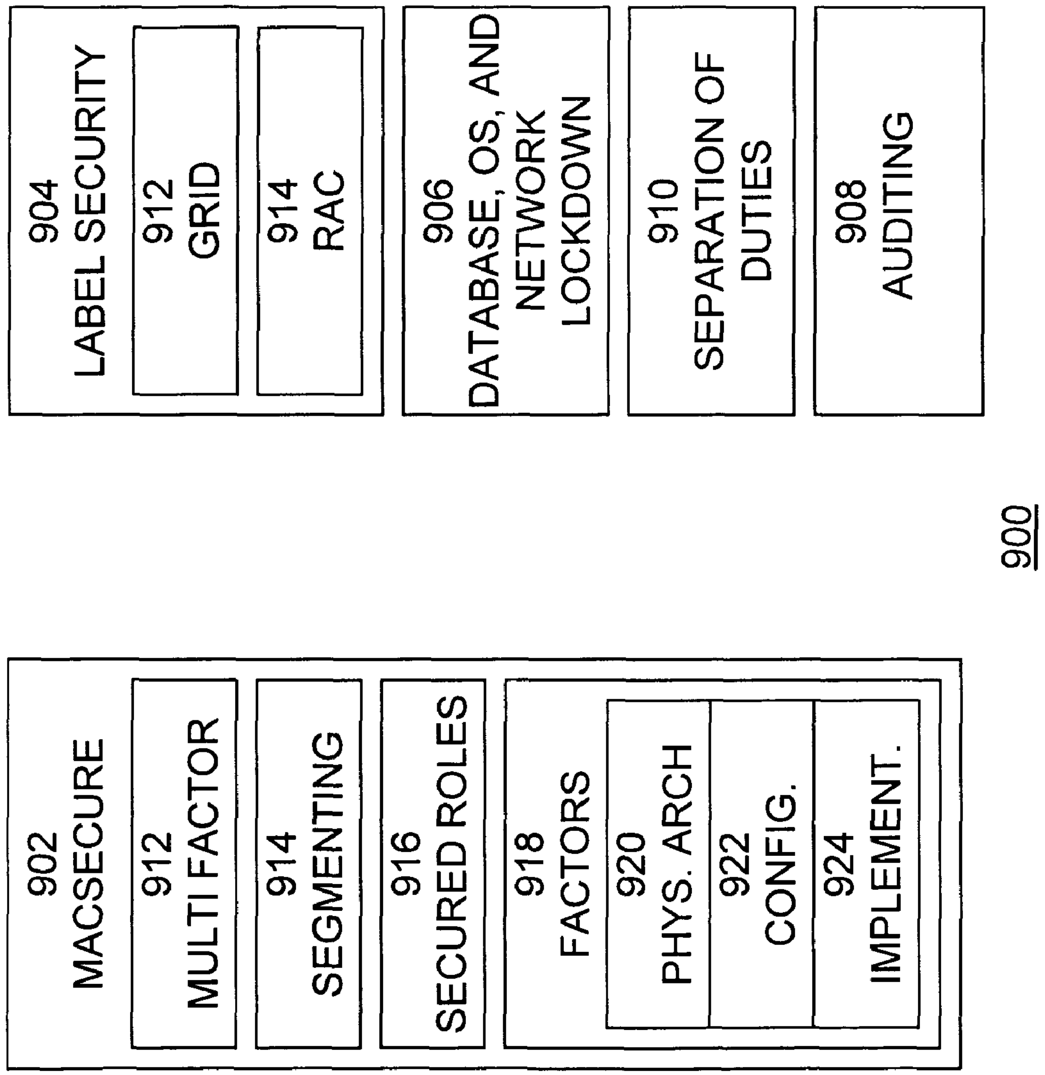
FIG. 9 is an exemplary block diagram of new features included in Data Vault.

An exemplary architecture 900 of features included in Data Vault is shown in FIG. 9. Data Vault architecture 900 includes a variety of features, such as Mandatory Access Control (MAC) Security (MACSECURE) 902, label security (LS) 904, Database, OS, and Network Lockdown 906, Auditing 908, and Separation of Duties 910. Data Vault architecture 900 implements a security policy that applies mandatory access control rules to protect the runtime environment from compromising the level of assurance when it comes to database maintenance and data retrieval. The Mandatory Access Control (MAC) security includes:

A multi-factored approach 912 to establish the maximum-security label for a security domain/network and for labeling the user's session at runtime. Data Vault extends the notion of OLS to provide security labels to factors (beyond labeling just data and users). This concept is called MACOLS.

Segmenting the database 914 into mini-virtual private databases by implementing a new concept called a "realm" which restricts system privileges to work only within a realm (e.g. set of database schemas used by an application). Thus Data Vault can support the role of an Application DBA whose DBA privileges are restricted to as set of schemas. Data Vault will also implement rule-based logic to determine whether or not to execute or audit SQL commands issued within a realm.

Secured application roles 916 where the ability to enable a database role is delegated to a customizable rules-engine, and more.

Stronger security is based on multiple factors. The Data Vault is based on a Multi-Factored Mandatory Access Control Approach. The trust of the mandatory access control rules can be based on multiple factors 918. Such factors may include the physical architecture, the configuration, and the implementation. Physical Architecture 920 includes labeling of key devices in the architecture, such as Database Server(s), Switches/Firewalls/Routers, etc. Configuration 922 includes labeling of key configuration items in the architecture, such as Secure Database Servers, Grid Service Domains, Intrusion Detection, and Auditing. Implementation 924 includes labeling of key activities in the architecture, mutual based Server Authentication via SSL, separation in Duties for Administrative Activities, and transparent Application Data Access Label Security 904 also include GRID and RAC Technology. Data Vault leverages the GRID for its inherent scalability and availability architecture; plus it creates a new use for Real Application Clusters by creatively implementing them as the central architectural component for bridging security domains. Database Servers on each domain are clustered to share a single database. The database implements table partitioning by label and keeps data stored in separately labeled storage arrays (possibly encrypted). Various technologies including a UDP firewall prevent higher-level data from being accessed by lower-level security domains/networks.

Database, OS, and Network Lockdown 906 includes using scripts and procedures to harden the database, operating system, and network. The Database Servers become "secured network appliances" whose sole function is to securely share and manipulate data. Lockdown scripts may be utilized for the databases, operating systems, and networks.

Auditing 908 includes using active auditing as both a deterrent and to quickly detect successful and unsuccessful attempts to perform unauthorized operations, including any changes to the Cross-Domain Secure—Data Vault configuration and security policies. Auditing policies are established and can be used to alert and notify trusted administrators.

Separation of Duties 910 is used in order to achieve checks and balances to prevent social engineering, Data Vault does not advocate having one super user, but rather creates roles to implement a separation of duties for the Data Vault Security Policy Manager, Audit Manager, Application DBA, Grid Administrator, Directory/Account Manager, Schema Owner, and End User.

Figure 10:
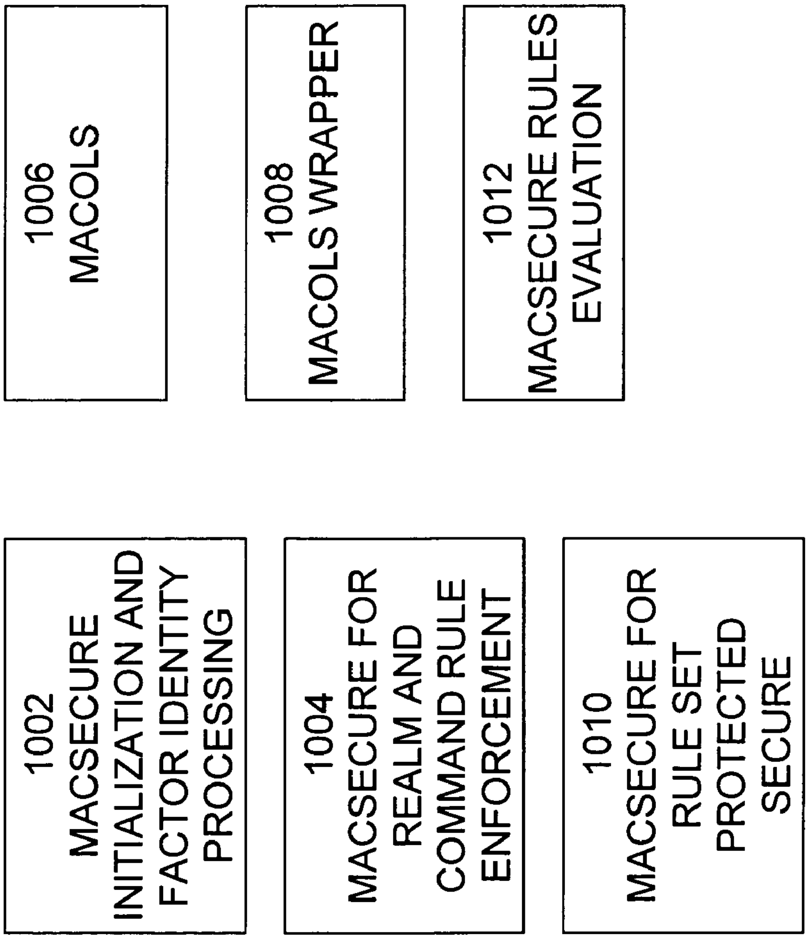
FIG. 10 is an exemplary block diagram of an architecture of MAC Runtime Policy Enforcement.

An exemplary architecture 1000 of MAC Runtime Policy Enforcement, which is used to provide multi-factored access control (MAC) security at runtime of the Data Vault system, is shown in FIG. 10. The MAC runtime policy enforcement processing characteristics are illustrated in FIG. 10.

The Mandatory Access Control Base (MACSecure) provides multi-factored security for establishing database system and object privileges. It is a secure and consistent framework for supporting access controls and auditing. MACSecure allows customer to extend the database security to entities outside the database. The framework allows security to be based on multiple sources to ensure higher level of trust and assurance. MACSecure provides the foundation for the Data Vault concept and Cross Domain Secure Data Vault.

MACSecure includes the following new components: Factors, Rule Based Security, and Realms. The components extend the existing database security framework.

Factors—factors are the basis of the database Mandatory Access Controls (MAC). They are the critical components for establishing the affinity between the information and it's intended use. Factors establish the strength of a mechanism and reliability of the source, which should instill a notion of trust. Factors are classified or grouped into a common factor type, along with the method and rules for retrieval and settings.

- Factors provide a consistent framework for managing and enforcing security at the database
- Factors allow customer to extend the database security to entities outside the database
- Factors are based on multiple sources to ensure higher level of trust and assurance.
- Factors support five types of Factors models
  - Constants Values that can only be set by Administrator
  - Internal Values that can be set though Data Vault only and bound by a rule
  - Factor Values that derived by other factors, thought an Identity Map
  - External Values that are external trusted method from other sources
  - Multi-Source An ordering of source and conditions for getting the value.

Factors are SQL functions that can be embedded in any SQL statement inside or outside the database. The SQL function can be referenced as dvf.F$<factor_name>. The factor will be treated as bind variables within the SQL and be resolved from it source at execution time.

Factors have identities to instill a notion of level of trust within the database. Factors may have identities created to establish, which factor value are trustworthy or not. Each identity of a factor can be assigned a label and a trust level. The label can be used to control the maximum level of data that is allowed to be accessed by on factors, such as servers, network, authentication method, and so on. The trust level is a relative number that should indicate that a one occurrence of a factor is trusted the same, more or less than another. The trust level could also be negative to indicate the lack of trust. Access and rules can simply be based on the trustworthiness of a factor rather than the factor value itself.

Factors are session and access based. Session based factors are established during the session creation time and cannot be changed. Access based factors are evaluated each time they are referenced. Access based factors typically must be synchronized with other sources and therefore must be evaluated each time.

Extended Attributes in Audit Trail—A value of a factor is used in combination with other factors to provide a Multi-Factored approach to a MAC-based domain identity and its associated labeling policy. The core attributes of a factor are its factor type and its related method for acquiring its value. For example, if host IP address is a factor type, then a factors of that type might be database server IP address or application server IP address.

Factor Type—A categorization of the indicators (factors) that support the notion of architecture and system components being the fundamental drivers for a MAC-based security policy. Physical factor types will include host name, host IP address and database instance identifier at a minimum (installed). Other physical factors such as networks, routers, and switches could also be factor types. User-defined or implementation factor types (application, certificate information, etc.) can be also be created. Factor types can also be environmental (time, geography, etc.).

Factor Identifier—The actual value of factors that are used to define the identity of a security domain. The identifier might also be used to define security label for the domain's security label. Identifiers can be associated with security labels.

Multi-factored Approach—the approach of using not just one factor, but many factors in combination to provided added Levels of Assurance that the security of the data cannot be compromised. By tampering with one factor, the security policies of the system remain intact. All factors for a given policy must be compromised to compromise the system.

Rule Based Security—Rules-Based Security is based on a rule, a named condition, or based on security factors organized into Rule Sets that can be applied to Roles, Statements, Factors and Auditing. Mandatory Access Control (MAC) rules can be applied to any database operation, role-based security, and label-based security. The MAC rules are based on multiple factors, such as physical architecture, configuration, and implementation. The multi-factored approach provides an increased level of trust to MAC security.

Rules-Based Security provides an additional level of defense within the database. Rules are not a privileges, they conditions that limit when privileged operation can be executed. Rules provide the capability to enforce a security policy based on security factors and data attributes in order to meet key security, governance, and compliance requirements. Rule-Based security provides a higher level of assurance that can be applied to key database operations extending the access controls and auditing access model today.

Rules are based on factors and condition(s). Rules can be established to define when certain database operations can be performed, when privileges are enabled, and when labels are in effect or when a transaction can occur. Initially, Rules will drive the MAC decisions that govern Realm authorizations, secure application role, or command authorization.

Rules can be used to establish the identity or to establish constraints or they can be a condition of a Factor used to evaluate access.

For example:

DB_SERVER_NAME="xhost1"

DB_SERVER_NAME in ("xhost1","xhost2","xhost3")

DB_SERVER_NAME in the Select name from domain1
APP_SERVER_NAME="rhost999"
APP_IP< >"123.123.12.1"

A rule is a single condition used to evaluate access within a realm authorization, to set a secure application role or the authorization to perform a specific SQL command. The rules will support the equals, not equals, greater than, greater than or equal, less than, less than or equal, in list, not in list and between. The value can be static or dynamically determined through a procedure. Audit Events can be triggered to record an audit event when the rule fails or succeeds. Alerts can be triggered to send notifications when the rule fails or succeeds. MAC Security Rules can be configured to fail silently (log, audit or alert) or verbosely (propagated to the database session). Commands Events can be triggered to initiate a procedure call when the rule fails or succeeds. Rules can be associated with a failure and/or success message. For example, if the database instance name is "NODE1" and the time is between 12 a.m. and 3 a.m., return false after auditing the event.

Rule Sets are a logical grouping of conditions (Rules) to be used in the MAC authorization processing. Rule Sets define the evaluation logic of each contained rule and provide for event handling case of rule failure and/or success. A logical grouping of conditions (Rules) to be used in the MAC authorization The rules notion is based on the configuration of security definitions, not coding. This approach eliminates the need for users to code rules.

Realms—the Realm expands the notion of an Object Owner beyond a single schema. Data Vault/MACSecure extends the notion of an object OWNER to span multiple Schemas, and limit use of system level privilege within the defined realm. The Primary Owner of the Realm should have the same rights in any realm schema that he would have in a dedicated schema.

Example of Owners and Realms:

| | | |
|---|---|---|
| SYS | DATA DICTIONARY | (SYS, CTXSYS, MDSYS, OLAPSYS) |
| IASYS | DATA VAULT | (IASYS, DVF) |
| LBACSYS | LS | (LBACSYS) |
| AUDSYS | AUDIT | (AUDSYS, SYSTEM.AUD$, SYS.FGA__LOG$) |

Segment the database into mini-virtual databases by implementing a new concept called a "Realm" which instills separation of controls and restricts system privileges to work only within a realm (e.g. set of database schemas used by an application). Thus, Data Vault can support the role of an Application DBA whose DBA privileges are restricted to as set of schemas. Rule-based logic can also be used in conjunction with Realm to determine whether or not to execute or audit any SQL commands issued within the scope and controls of a realm.

A logical grouping of database schemas used to limit the scope of applicability of an system privileges (e.g. CREATE ANY TABLE) to a named user or database role. Realms will include the associations to schemas, or subsets thereof, as well as the user accounts and database roles that are authorized within the realm. For example, Data Vault may implement a realm as a grouping of Database Schemas. An implementation of Realm Security would restrict the scope of a user's system privilege to operate only within the user's assigned realm (e.g. "CREATE ANY TABLE" is restricted to tables in the users associated schemas, rather than being available for the entire database). R Realms define limited scope of system privileges, and object access primarily for administration access. Other objects privileges can be granted to roles for access to shared objects outside a realm; however an administrator doesn't have the authority to administrate the objects. Realms must be controlled and aligned with compliance requirements because system level privileges can be vulnerabilities if available at all times.

- Realms can be the entire system or a set of schemas, a subset of one schema, or a set of objects across multiple schemas.
- Realms will be implemented to counter and limit the use of excess privileges within the database.
- Realms can limit the use of privileges within the context of a database, a user, a role, or an application.
- Realms provide the capability to move to a least privileged model without changing the application.
- Realms is a concept of the overall solution that defines the area of responsibility.
- Realms define a limited scope of system privileges, and object access primarily for administration access.
- Realm Object is a database schema and/or database objects associated to a realm. A database schema and possibly a specific database object contained therein that is said to be included in a given realm.
- Realms Authorization is the authority of a named user to access realm objects in a given realm.

MACSECURE Initialization and Factor Identity Processing 1002—This enforcement module provides the session initialization functionality for MAC Security during Login processing. The API also provides methods to get and set factors and get trust level information. During session the initialization process the following occurs:

- Evaluate the Factors and caches their values (identities) in the context. Run time rule set behavior such as auditing, failure processing, and event handling occur during this process.
- Determines what Realms the users is authorized to access and caches them in context
- Checks if OLS is installed; if so, calls the MACOLS init_ session method
- Evaluates the Command Rule Set for the CONNECT command, if it fails, the user is not allowed to login. Run time rule set behavior such as auditing, failure processing, and event handling occur during this process.

MACSECURE For Realm and Command Rule Enforcement 1004—This enforcement module provides the following database event authorization capabilities:

- Capture DDL commands before they are executed to determine whether or not the command is in violation of any realm protections or command authorizations the security manager has created.
- Logic to determine if a user is authorized to perform a command given any command rules defined in the MAC policy.
- Logic to determine if a user is authorized to perform SELECT or DML on realm-protected objects. Run time rule set behavior such as auditing, failure processing, and event handling occur during the processing of events governed by rule sets.
- Protections using Data Vault command rules and/or realm authorizations for the EXECUTE and EXECUTE ANY privileges on packages, procedures and functions.
- The protections for realm secure objects access controls must be enhanced to control and properly authorize the ability to create an object that depends on a realm secured object (sub-object DDL commands).

MACOLS 1006—This enforcement module provides services to initialize MACOLS and to set the MACOLS session label as required on a per OLS policy basis. This module is called during the database login processing, after the MAC Security processing in its init_session has completed. The enforcement module will provide a pluggable framework for inserting any type of algorithm for controlling the establishment of a maximum session label. The algorithm provided with the Data Vault consulting version will be the default and is depicted in the following pseudo-code:

for each OLS policy+merge algorithm
  determine the user's OLS label for the session;
  for each labeled factor loop compute the label of the factor based on the policy algorithm;
  end loop;
  merge the factor labels together using the policy algorithm to compute the maximum possible label for the user's session (MACOLS label);
  if the user's OLS label dominates the MAXOLS label then merge the labels using the algorithm to compute the user's new session label;
  end if;
  cache the factor labels, MACOLS label, and session labels in the user's context
  set the user's session label for the policy;
end loop;

MACOLS Wrapper for LBACSYS.SA_SESSION 1008—This enforcement module is an overloaded version of the LBACSYS.SA_SESSION package, with all of the same methods and signatures. When it is installed with Data Vault, the public synonym for SA_SESSION is updated to point to this package. It calls the default SA_SESSION package procedures for most methods, except for the following:

restore_default_labels(policy_name VARCHAR2)—re-evaluates the session label to adjust as required after restoring the defaults set_access_profile(policy_name VARCHAR2,user_name VARCHAR2)—if the session label of the user exceeds the maximum session label before allowing the access profile to be set.

set_label(policy_name VARCHAR2,label VARCHAR2)—checks to see if the label exceeds the maximum session label before allowing the label to be set.

MACSECURE For Rule Set Protected Secure Application Roles 1010—This enforcement module provides a method to check whether the user invoking the method is authorized to use the specified Data Vault Secure Application Role. The authorization is determined by checking the Rule Set associated with the role. The API also provides a method to issues the SET ROLE command for a Data Vault Secure Application Role. Before the SET ROLE is issued, the can_set_role method is called to check the Rule Set associated with the role. Run time rule set behavior such as auditing, failure processing, and event handling occur during this process.

MACSECURE Rules Evaluation 1012—This module encapsulates the Data Vault rules engine. The module provides a function to evaluate a rule set by name and return true or false.

An exemplary architecture 1100 of Data Vault auditing policy and alerting functionality is shown in FIG. 11. The Data Vault auditing policy and alerting function may be provided as an implementation of an Audit Vault product or it may be provided as newly implemented functionality. The policy may include the auditing components as shown in FIG. 11 and Table 3

TABLE 3

| Audit Setting Type | Audited Commands - Summarized. By access and on success or failure unless otherwise noted. |
|---|---|
| System Audit Settings/ System Privilege Usage 1102 | ALTER ANY, CREATE ANY, DELETE ANY, DROP ANY, EXECUTE ANY [on failure only], FORCE ANY, GRANT ANY, INSERT ANY, UPDATE ANY |
| System Audit Settings/Object Management 1104 | ALTER DATABASE, PROFILE, ROLLBACK SEGMENT, SESSION, SYSTEM, TABLE, TABLESPACE, USER, CREATE CLUSTER, DATABASE LINK, INDEXTYPE, LIBRARY, OPERATOR, PUBLIC SYNONYM, PROCEDURE, PROFILE, ROLE, ROLLBACK SEGMENT, SEQUENCE, SESSION, SNAPSHOT, SYNONYM, TABLE, TABLESPACE, TRIGGER, TYPE, USER, VIEW, TRUNCATE |
| System Audit Settings/Intrusive Commands 1106 | ALTER SESSION, BECOME USER, CREATE SESSION, DEBUG CONNECT SESSION, RESTRICTED SESSION |
| System Audit Settings/Administration Commands 1108 | ADMINISTER DATABASE TRIGGER, BACKUP ANY TABLE, EXEMPT ACCESS POLICY, MANAGE TABLESPACE |
| System Audit Settings/Audit Commands 1110 | AUDIT ANY, AUDIT SYSTEM |
| System Audit Settings/Access Control 1112 | GRANT ANY PRIVILEGE/ANY OBJECT PRIVILEGE/ROLE, GRANT DIRECTORY, GRANT SEQUENCE, GRANT TABLE, GRANT TYPE |
| User Audit Settings - DVSYS/DVF 1114 | ADMINISTER DATABASE TRIGGER, ALTER [object], AUDIT SYSTEM, BECOME USER, CLUSTER, COMMENT, CONTEXT, CREATE [object], DATABASE LINK, DEBUG, DIRECTORY, DROP [object], EXECUTE LIBRARY [on failure only], EXECUTE PROCEDURE [on failure only], EXEMPT ACCESS POLICY, EXEMPT IDENTITY POLICY, EXPORT FULL DATABASE, GRANT [object], IMPORT FULL DATABASE, INDEX, MANAGE SCHEDULER, MANAGE TABLESPACE, |

TABLE 3-continued

| Audit Setting Type | Audited Commands - Summarized. By access and on success or failure unless otherwise noted. |
|---|---|
| | MATERIALIZED VIEW, SELECT SEQUENCE [on failure only], SELECT TABLE [on failure only] |
| Object Audit Settings - DVF 1116 | AUDIT PACKAGE/PROCEDURE/FUNCTION/SEQUENCE/TABLE, COMMENT TABLE/VIEW, DELETE TABLE/VIEW, EXECUTE PACKAGE/PROCEDURE/FUNCTION [on failure only], GRANT PACKAGE/PROCEDURE/FUNCTION/SEQUENCE/TABLE, INSERT TABLE/VIEW, RENAME PACKAGE/PROCEDURE/FUNCTION/SEQUENCE/VIEW/TABLE, SELECT SEQUENCE/TABLE/VIEW [on failure only], UPDATE TABLE/VIEW |
| Object Audit Settings - DVSYS 1118 | AUDIT PACKAGE/PROCEDURE/FUNCTION/SEQUENCE/TABLE, COMMENT TABLE/VIEW, DELETE TABLE/VIEW, EXECUTE PACKAGE/PROCEDURE/FUNCTION [on failure only], GRANT PACKAGE/PROCEDURE/FUNCTION/SEQUENCE/TABLE, INSERT TABLE/VIEW, RENAME PACKAGE/PROCEDURE/FUNCTION/SEQUENCE/VIEW/TABLE, SELECT SEQUENCE/TABLE/VIEW [on failure only], UPDATE TABLE/VIEW |
| User Audit Settings - LBACSYS 1120 | ADMINISTER DATABASE TRIGGER, ALTER [object], AUDIT SYSTEM, BECOME USER, CLUSTER, COMMENT, CONTEXT, CREATE [object], DATABASE LINK, DEBUG, DIRECTORY, DROP [object], EXECUTE LIBRARY [on failure only], EXECUTE PROCEDURE [on failure only], EXEMPT ACCESS POLICY, EXEMPT IDENTITY POLICY, EXPORT FULL DATABASE, GRANT [object], IMPORT FULL DATABASE, INDEX, MANAGE SCHEDULER, MANAGE TABLESPACE, MATERIALIZED VIEW, SELECT SEQUENCE [on failure only], SELECT TABLE [on failure only] |
| Object Audit Settings - LBACSYS 1122 | AUDIT PACKAGE/PROCEDURE/FUNCTION/SEQUENCE/TABLE, COMMENT TABLE/VIEW, DELETE TABLE/VIEW, EXECUTE PACKAGE/PROCEDURE/FUNCTION [on failure only], GRANT PACKAGE/PROCEDURE/FUNCTION/SEQUENCE/TABLE, INSERT TABLE/VIEW, RENAME PACKAGE/PROCEDURE/FUNCTION/SEQUENCE/VIEW/TABLE, SELECT SEQUENCE/TABLE/VIEW [on failure only], UPDATE TABLE/VIEW |

There are several Data Vault events that may not be inherently supported by simply defining an database audit policy on system commands, user audit or object audit settings and the like. For example, if the runtime MAC processing of retrieving the identifier of factor should fail, the audit options for the factor may dictate that this event be audited. Several of these "runtime" audit events may be supported and include:

- Command Authorization Audit—a security manager can protect SQL commands according to a rule set, if the command is attempted and the rule processing fails this protection mechanism can be set to audit
- Factor Assignment Audit—some factors allow for identifiers to be set according to the result of a rule set evaluation. The assignment capability may be set to audit if an attempt is made to set the factor identifier and it fails or if a user attempted to set a factor with no rule set controlling this action defined.
- Factor Evaluation Audit—the runtime MAC processing of retrieving the identifier of factor could fail, the audit options for the factor may dictate that this event be audited
- MAC OLS Attempt to Upgrade Session Label Failed—audits the condition where the MAC OLS component prevented a session from setting a label that dominates the maximum session label
- MAC OLS Session Initialization Failed—audits the condition where the MAC OLS session initialization failed outside of the normal audit configuration
- MAC Secure Session Initialization Failed—audits the condition where the MAC Secure session initialization failed outside of the normal audit configuration
- Realm Authorization Audit—the authorization of a role or user to a realm can be protected at runtime by a rule set, the security manager may require that the rule set protecting the authorization be audited
- Realm Violation Audit—if an object is contained within a realm and a database session attempts to access the object in the realm and runtime, there may be a condition where the user or active role related to the database does not even exist within the scope of the realm authorizations. The security manager can configure Data Vault such that this condition is audited.
- Secure Role Audit—Data Vault extends the notion of an secure application role to allow it to be enabled based on a Data Vault rule set. The rule set protecting this type of role can be configured to audit when the rule set is evaluated.

Figure 12:
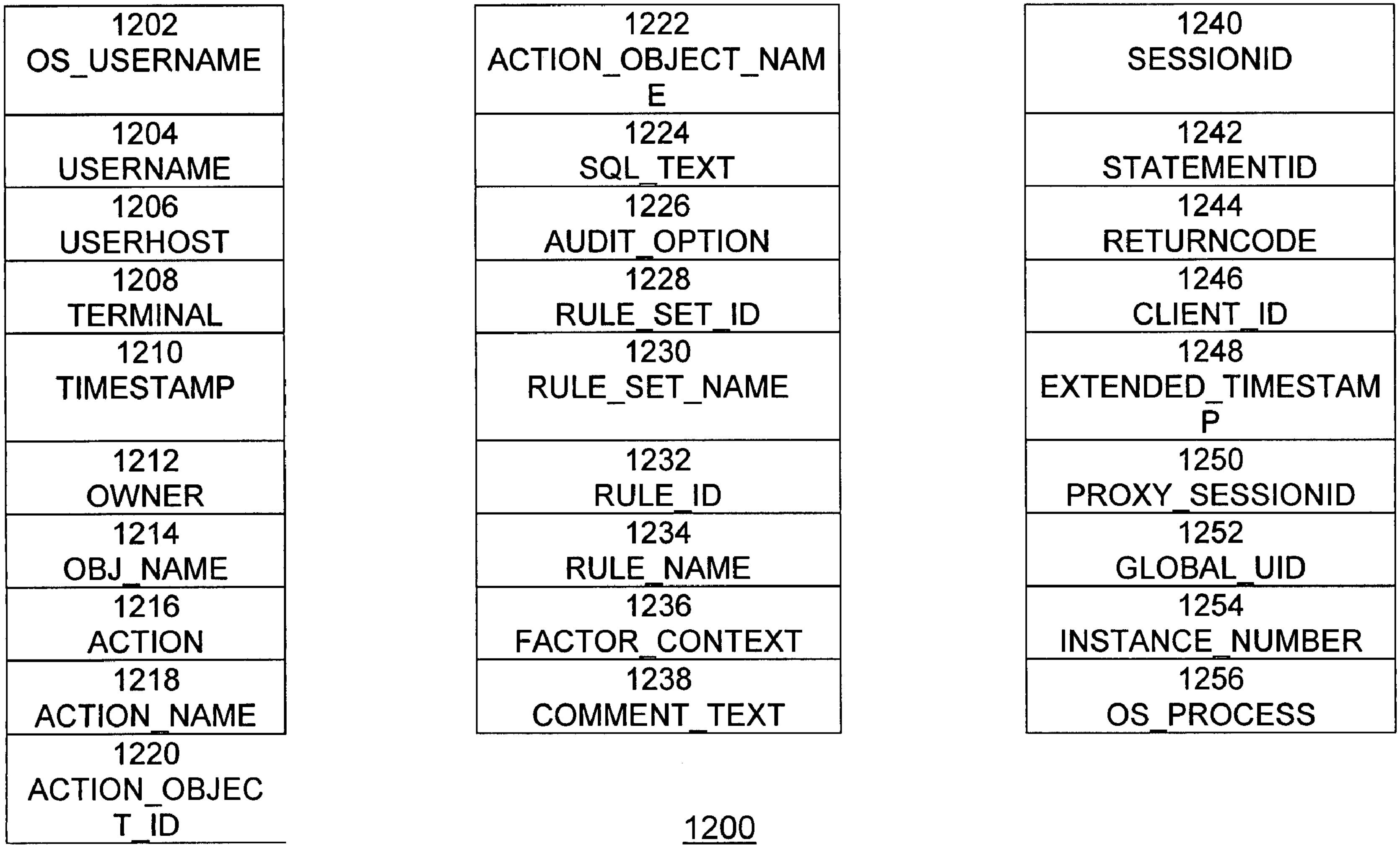
FIG. 12 is an exemplary format of an audit trail.

The Data Vault custom audit event records will be stored in a table located in the Data Vault environment (the DVSYS schema) until they are synchronized with an Audit Vault. The administrator should be able to define an archiving policy around this audit trail. An example of a format 1200 of such an audit trail is shown in FIG. 12. The parameters shown in FIG. 12 are described in Table 4.

TABLE 4

| Parameter | Description |
|---|---|
| OS_USERNAME | Operating system login username of the user whose actions were audited |
| USERNAME | Name (not ID number) of the user whose actions were audited |
| USERHOST | Client host machine name |
| TERMINAL | Identifier of the user's terminal |
| TIMESTAMP | Date and time of the creation of the audit trail entry in the local database session time zone |
| OWNER | Creator of the object affected by the action, Always DVSYS |
| OBJ_NAME | Name of the object affected by the action. Expected values are ROLE$ REALM$ CODE$ FACTOR$ |
| ACTION | Numeric action type code. The corresponding name of the action type is in the ACTION_NAME column. |
| ACTION_NAME | Name of the action type corresponding to the numeric code in the ACTION column. |
| ACTION_OBJECT_ID | The unique identifier (ID#) of the record in the table specified in OBJ_NAME |
| ACTION_OBJECT_NAME | The unique name or natural key of the record in the table specified in OBJ_NAME |
| SQL_TEXT | The SQL text of the command, procedure that was executed that resulted in the audit event being triggered |
| AUDIT_OPTION | The labels for all audit options specified in the record that resulted in the audit event being triggered, for example a factor set operation that is supposed to audit on get failure and get null would indicate these 2 options. |
| RULE_SET_ID | The unique identifier of the rule set that was executing and caused the audit event to trigger. |
| RULE_SET_NAME | The unique name of the rule set that was executing and caused the audit event to trigger. |
| RULE_ID | The unique identifier of the rule that was executing and caused the audit event to trigger. |
| RULE_NAME | The unique name of the rule that was executing and caused the audit event to trigger. |
| FACTOR_CONTEXT | An XML document that contains all of the factor identifiers for the current session at the point when the audit event was triggered. |
| COMMENT_TEXT | Text comment on the audit trail entry, providing more information about the statement audited |
| SESSIONID | Numeric ID for each session |
| STATEMENTID | Numeric ID for a statement invoked that caused the audit event to be generated. Will be empty for most Data Vault events. |
| RETURNCODE | Error code generated by the action. The error code for a statement or procedure invoked that caused the audit event to be generated. Will be empty for most Data Vault events. |
| CLIENT_ID | Client identifier for the session that triggered the audit event |
| EXTENDED_TIMESTAMP | Timestamp of the creation of the audit trail entry (timestamp of user login for entries) in UTC (Coordinated Universal Time) time zone |
| PROXY_SESSION ID | Proxy session serial number, if an enterprise user has logged in through the proxy mechanism |
| GLOBAL_UID | Global user identifier for the user, if the user has logged in as an enterprise user |
| INSTANCE_NUMBER | Instance number as specified by the INSTANCE_NUMBER initialization parameter |
| OS_PROCESS | Operating System process identifier of the process |

Additional considerations may include:

A capability to provide an alternate audit trail recording medium should be provided for both Data Vault custom audit event records and the default audit trails in the event of a media failure or other service interruption (e.g. full tablespace) so that no audit data is ever lost.

The audit trails for both Data Vault custom audit event records and the default audit trails should be insert-once and non-updateable.

A capability to synchronize Data Vault custom audit event records and the default audit trails with an Audit Vault environment will be provided as a capability with the Audit Vault product.

The alerting function provided with the Audit Vault product should be architected such that e-mail or pager addresses can be designated as recipients for Data Vault custom audit event records on a per event basis.

The alerting function provided with the Audit Vault product should be architected such that e-mail or pager alert message subject and alert message body can be customized to include any field from the Data Vault custom audit event record in a macro-like fashion.

The alerting engine provided with the Audit Vault product should be architecture such that real-time (near instant) alerting on Data Vault custom audit event records is provided. This might be achieved by placing the alerting engine in a co-located fashion with Data Vault.

The reporting analysis functionality on Data Vault custom audit event records will be provided as a capability with the Audit Vault product.

A significant aspect of the Data Vault system is configuration of the system and reporting of the operation of the system. An example of a facility for configuring the Data Vault system, and for reporting on the operation of the system is a browser or Web based application. For example, such an application may be accessed by entering an appropriate URL in a web browser, such as: http://<hostname>:<port>/dva. In order to support both configuration and reporting, it is preferred to support two types of database accounts:

1) Security Administrators, having the DB_SECADMIN role, who can manipulate the Data Vault configurations.
2) Security Analysts, having the DB_SECRPT role, who can run the Data Vault reports.

A Data Vault factor is a configuration item that provides a value that can be a contributor to mandatory access controls and overall database application security. Factors are the critical components for establishing the affinity between the information and it's intended use. Factors can contribute to the process of authorizing a database account to connect to the database or as contributors to the filtering logic that restricts the visibility and manageability of data in database tables. Factors have values (identities) and are further categorized by their factor types. For example, a factor could be defined for the IP address of the database server where a database session was established as follows:

Factor Type: IP_Address
Factor: Database_IP
Identity: 172.16.0.3

A factor type is the category name for factors used for classifying factors. When installed, physical factor types include: authentication method, host name, host IP address, instance identifiers, and database account information. Furthermore, user-defined factor types, such as application name, certificate information, etc., could be created in addition to the installed factor types, such as time and geography. Factor types have a name and description, but currently have no interesting behavior other than to help classify factors.

A factor is a basic configuration item that used to contribute to an overall MAC policy. The attributes of a factor include its factor type and its related method for acquiring its value (identity). The method used for the factor can be any PL/SQL expression that returns a VARCHAR2 data value. A factor may be identified by or labeled by other factors. The process for determining the identity of a factor from one or more other factors is called factor linking. The processing to resolve the factor identity can also be audited. The ability to set a factor identity can be controlled through the use of Data Vault rule sets.

An identity is the actual value of a factor. A factor can have several identities depending on the factor's retrieval method or its factor linking logic. The factor's identity can be configured such that it is assigned at the time a database session is established or for each request to get a factor's identity. With MACOLS, identities may also be labeled with an Label Security label. Identities may also be assigned "trust levels" which are numbers that indicate the magnitude of trust relative to other identities for the same factor. In general, the higher the trust level number is set, the greater the trust. Negative trust levels are not trusted.

Within a database session, a factor's assigned identity is made available to Data Vault and any application with publicly accessible PL/SQL function that exists in the DVF schema as follows:

dvf.f$<factor name>

This allows the identifier for a factor to be accessed in a ubiquitous manner from within the database (e.g. from PL/SQL, from SQL, from VPD, from triggers, etc.). For example:

```
SQL> connect macadmin/password
SQL> select dvf.f$database_ip from dual;
F$DATABASE_IP
--------------------------------------------------------------
172.16.0.3
```

The identity of a factor can also be determined using the DVSYS.GET_FACTOR function that is made available for public access in the following manner:

```
SQL> select get_factor('Database_IP') from dual;
GET_FACTOR('DATABASE_IP')
------------------------------------------------------------------
172.16.0.3
```

Figure 13:
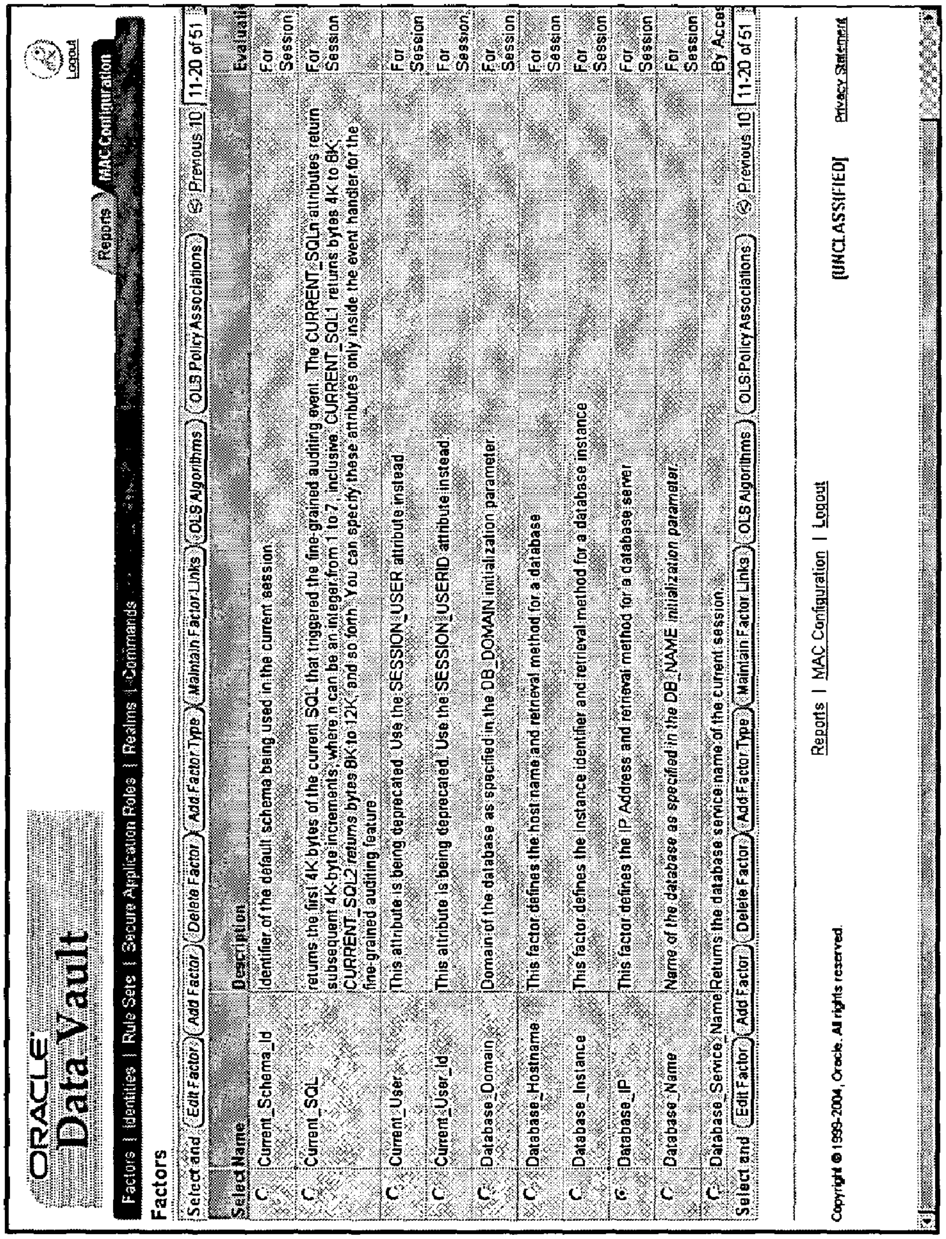
FIG. 13 is an illustration of an exemplary Data Vault Factor Menu page.

To maintain factors, an administrator logs into the Data Vault Administration application, clicks on the MAC Configuration module tab and clicks on the Factors tab. A list of all existing factors listed in alphabetical order is displayed, as shown in the exemplary Data Vault Factor Menu Page shown in FIG. 13. Options for managing factors include:

Edit Factor—Change a factor's attributes.
Add Factor—Create a new factor.
Delete Factor—Delete an existing factor (as long as it is not linked to another factor, has defined identities or is a contributing factor to an OLS policy).
Add Factor Type—Create a new factor type.
Maintain Factor Links—For factors that are identified by or labeled by other factors, associate the factor with its child factors.
LS Algorithms—For each OLS policy, select the algorithm used to merge OLS labels, when required. (MACOLS only.)
LS Policy Associations—Associate one or more OLS policies that the label of the factor's identities are used to determine to maximum session label for the policy. (MACOLS only.)

Figure 14:
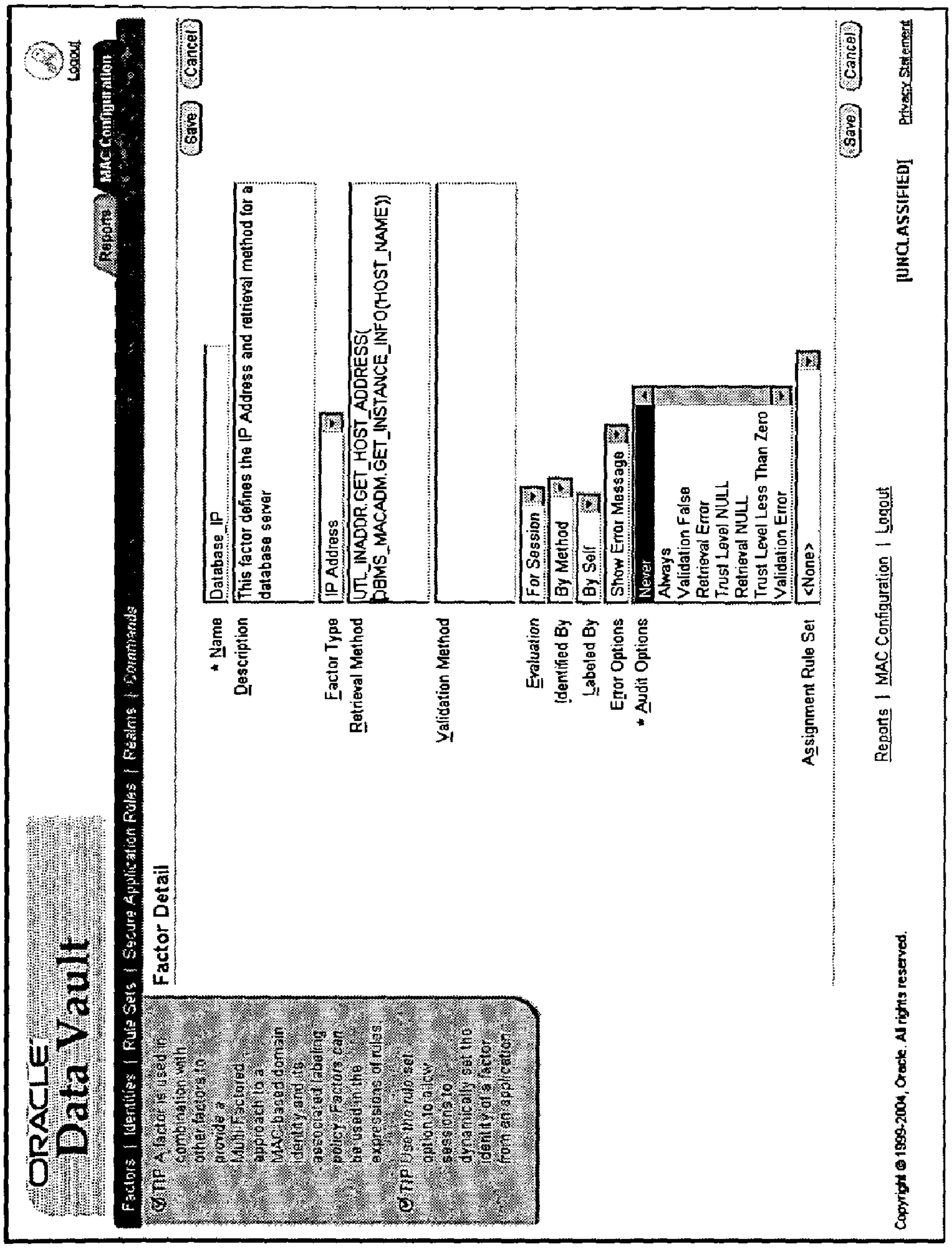
FIG. 14 is an illustration of an exemplary Factor Detail page.

Preferably, Data Vault comes pre-installed with a set of factors. To edit a factor, first select it by clicking in the radio button next to the factor's name and then click Edit Factor. The Factor Detail page, shown in FIG. 14, is displayed with the attributes of a factor. Edit these values and then click on the Save button. To create a factor, click on the Add Factor button, enter the attribute values, and click on the Save button. Examples of a factor's attributes may include:

Name—Factor name.
Description—Factor description.
Factor Type—Category of factor. To add a new factor type, click on the Add Factor Type button on the Factor table page.
Retrieval Method—A PL/SQL expression that retrieves the identity of a factor or a constant.
Validation Method—A PL/SQL expression that returns a Boolean value (TRUE or FALSE), that is used to validate a factor's assignment immediately after a factor is evaluated. This feature provides an additional level of assurance to verify the factor is properly set.

Evaluation—An option to determine when a factor is evaluated and assigned an identity. Two options may be provided: 1) For Session (default)—evaluates the factor when a database session is created, and 2) By Access—evaluates the factor each time it is accessed (e.g. referenced by an application) as well as when the database session is first created.

Identified By—An option to determine how to resolve a factor's identity. Options may include:

By Method (default)—The factor identity is resolved by executing the PL/SQL expression specified in the Retrieval Method field.

By Constant—The factor identity is resolved by retrieving the constant value found in the Retrieval Method field.

By Factors—The factor identity is determined by the association of child factors found in the Maintain Factor Links page and then mapping the identities of the child factors to its parent in the Identities/Map Identity page.

By Rule Sets

Labeled By—An option to determine how a factor identity gets an OLS label (applicable when using MACOLS only). Two options may be provided: 1) By Self (default)—a factor's possible identities are directly labeled from the labels associated to an OLS policy, and 2) By Factors—a factor identity's label is derived by labels of child factor identities. When there are multiple child factor identities with labels, labels are merged using the OLS Algorithm page associated with the applicable OLS Policy. For each applicable OLS Policy, a factor identity can have an assigned label.

Error Options—An option to control the processing that occurs when the resolution of a factor identity fails. Two options may be provided: 1) Show Error Message (default)—displays an error message to the database session and, 2) Fail Silently—does not display the error message. Note: The "Fail Silently" option may be useful when tracking the activities of a hacker or insider threat to determine what his/her intentions are.

Audit Options—An option to control the generation of a custom Data Vault audit record. These audit records can be displayed using the Audit user interface or the Data Vault Auditing Factor Violation report. Multiple options may be selected. Each option is converted to a "bitmask" and added to determine aggregate behavior. Options may include:

Never (0)—Do not audit. Note: If other options are selected along with this option, the other options will take precedence.

Always (1)—Always create an audit record when a factor is evaluated. Note: If other options are selected along with this option, this option will take precedence.

Retrieval Error (2)—Create an audit record when a factor's identity cannot be resolved and assigned, due to an error such as "No data found." or "Too many rows."

Retrieval NULL (4)—Create an audit record when a factor's identity is resolved to NULL.

Validation Error (8)—Create an audit record when the Validation Method (if provided) returns an error.

Validation False (16)—Create an audit record when the Validation Method (if provided) returns false.

Trust Level NULL (32)—Create an audit record when the factor's resolved identity has an assigned trust level of NULL.

Trust Level Less Than Zero (64)—Create an audit record when the factor's resolved identity has an assigned trust level less than zero.

Assignment Rule Set—Database applications, such as a web application using a JDBC connection pool, may want to dynamically set a factor identity for the current database session. For example, a web application may want to assign the geographic location of an database account logging into the web application. This option allows a rule set to control when and how a factor identity can be set, such as when the database session originates from a known application server or a known program (another factor).

Figure 15:
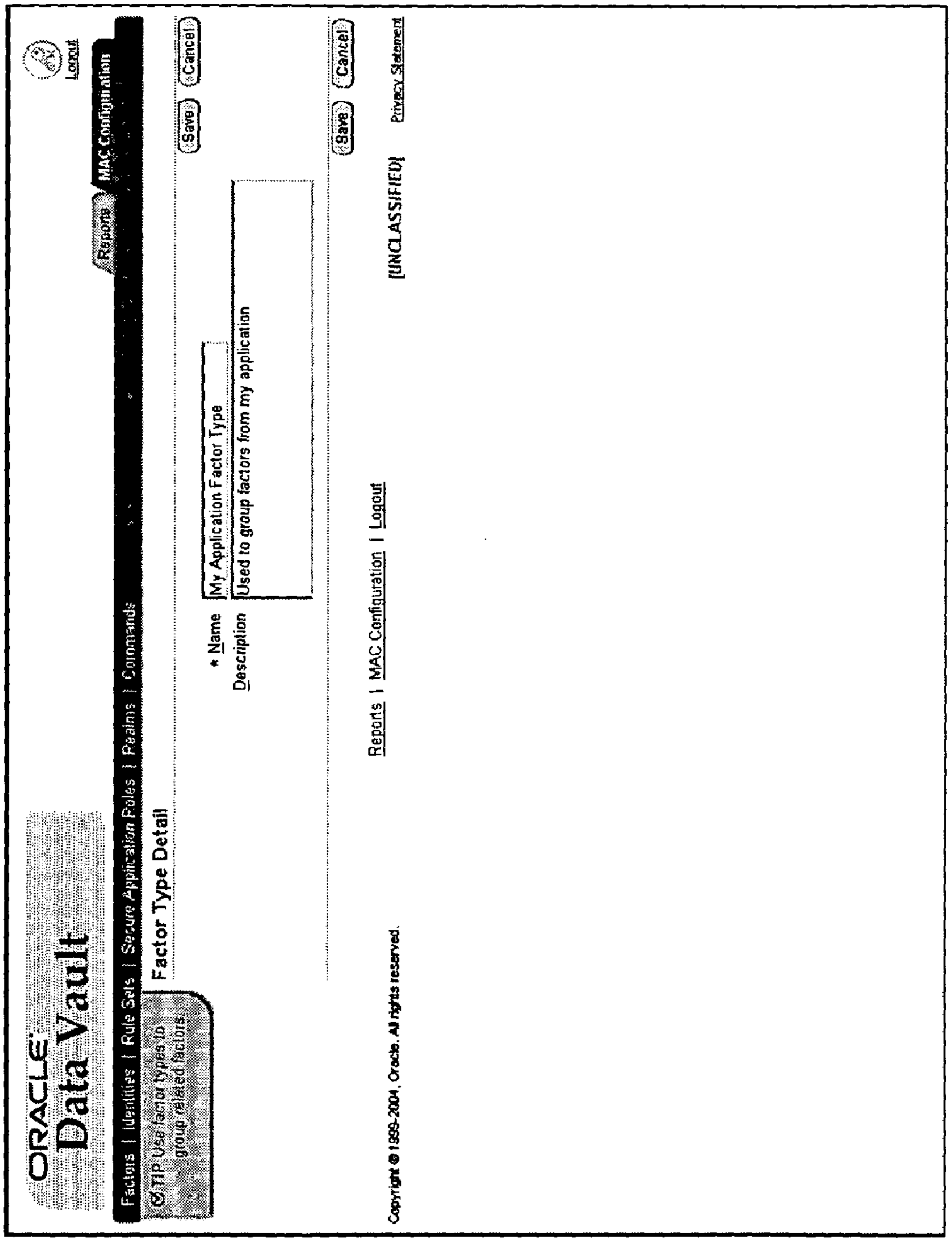
FIG. 15 is an illustration of an exemplary Factor Type Detail page.

Factor types may be added using a page such as that shown in FIG. 15. To add a factor type, click on the Add Factor Type button and provide a name and optionally a description and click on the Save button.

Figure 16:
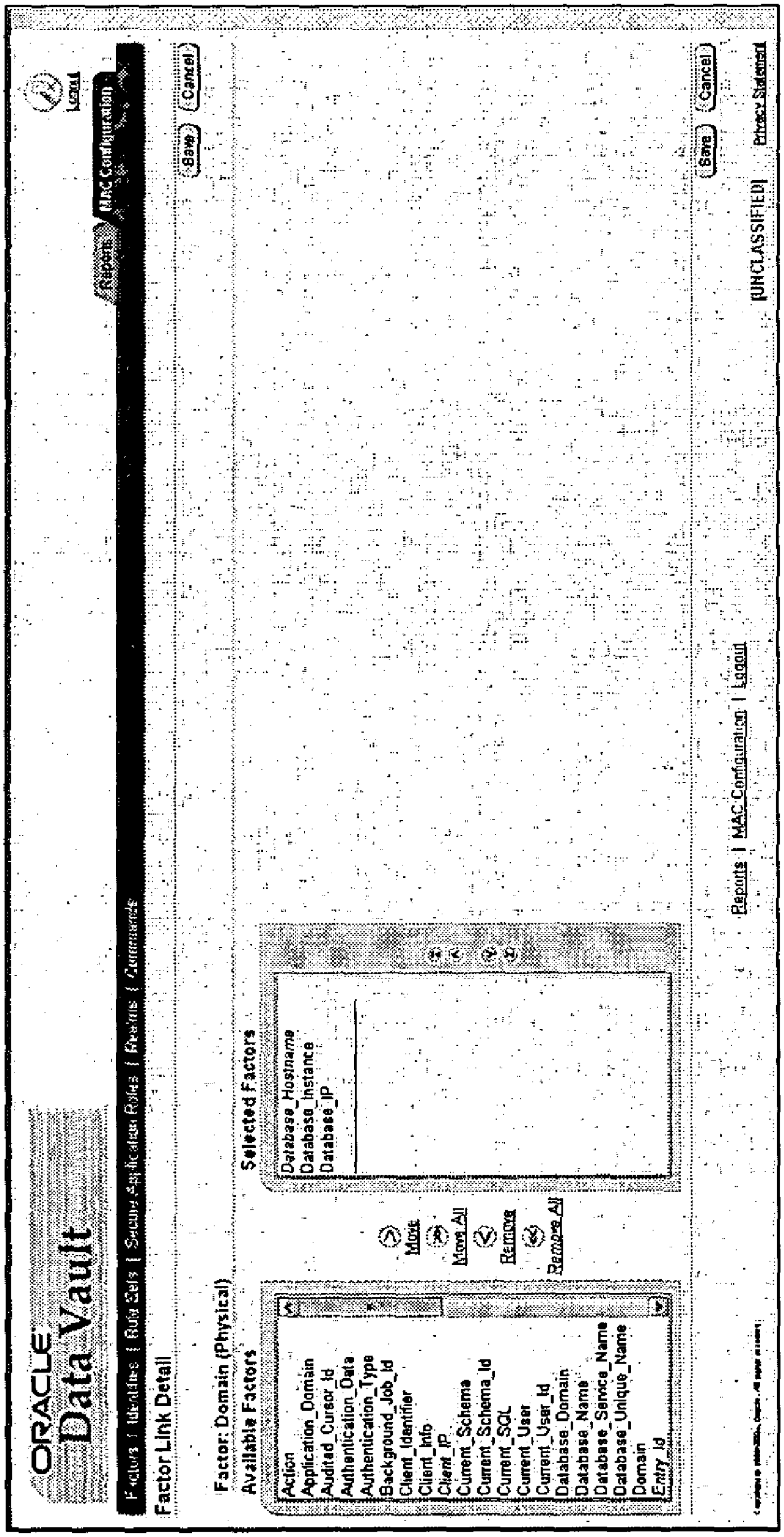
FIG. 16 is an illustration of an exemplary Maintain Factor Links page.

An example of a page that allows maintenance of factor links is shown in FIG. 16. A factor may be Identified By and/or Labeled By other factors. When this is the case, factor links must be established for the parent factor. First select the parent factor from the factor main page, and then click Maintain Factor Links button. From the list of Available Factors, select (highlight) the child factors and click on the Move (>) button to move them into the Selected Factors list. When completed, click on the Save button. To deselect items, highlight the factors in the Selected Factors list and click on the Remove (<) button to return the factors to the Available Factors list.

By allowing a factor to be identified by other factors, we can implement a multi-factored approach to security. In the example above, the Domain factor (which identifies what domain network is used when connecting to the database) is identified by three child factors: Database_Hostname, Database_Instance, and Database_IP.

Figure 17:
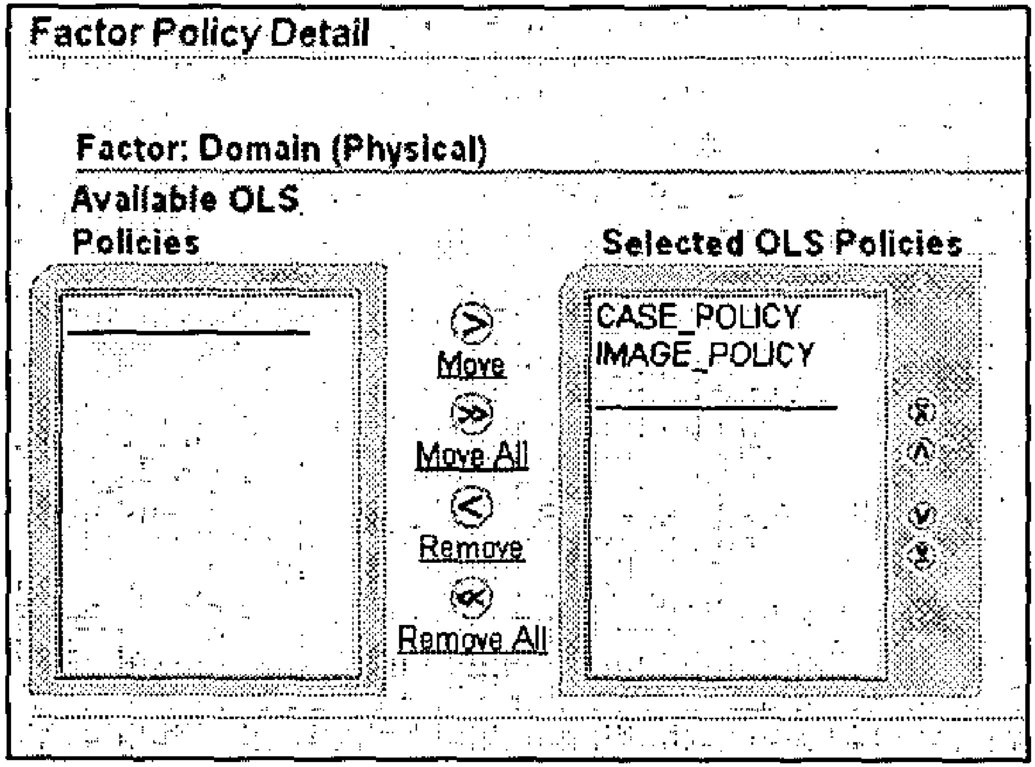
FIG. 17 is an illustration of an exemplary OLS Policy Associations page (partial).

LS Policies are created using Label Security (LS) using a page such as that shown in FIG. 17. With MACOLS, the labels that are available for each OLS policy can be associated to the identity of a factor. The first step to labeling a factor is to associate factor to one or more OLS policies by selecting the factor and then click on the OLS Policy Associations button. From the list of Available OLS Policies, select (highlight) the desired policies and click on the Move (>) button to move them into the Selected OLS Policies list. When completed, click on the Save button. The labels of the OLS Policy may then be used to label a factor's possible identities in the Identities tab-Label Identity page. At runtime, the maximum session label for each OLS policy will determined based on the factors that are associated to the policy and the merged labels of each of factors associated to the policy.

When a factor is Labeled By other factors, sometimes the other factor's identity labels must be merged to create one label for the factor for each OLS Policy. Therefore, a merging algorithm should be selected for each OLS Policy used, which may be accomplished with a page such as that shown in FIG. 18. By default, the merging algorithm will be (LII)—Minimum Level/Intersection of Compartments/Intersection of Groups. To change an OLS Policy's algorithm, click on the OLS Algorithms button. You will see a list of all OLS Policies (grayed out). Next to the policy, select the desired OLS algorithm from the drop down listbox. When completed, click on the Save button.

An example of how this works is shown in FIG. 19. Where LII is the Minimum Level/Intersection of Compartments/

Intersection of Groups and HIU is the Maximum Level/Intersection of Compartments/Union of Groups.

Once factors have been configured, the next step is to configure the factor's identities. A factor's identity for a given database session is assigned at runtime using the Identified By and Retrieval Method fields. Further configuration is optional and is used to serve the following purposes:

1. To define the known identities for a factor
2. To add a trust level a factor's identity
3. To add an OLS label to a factor's identity
4. To resolve a factor's identity via its child factors (Factor Links and Identity Map).

Figure 20:
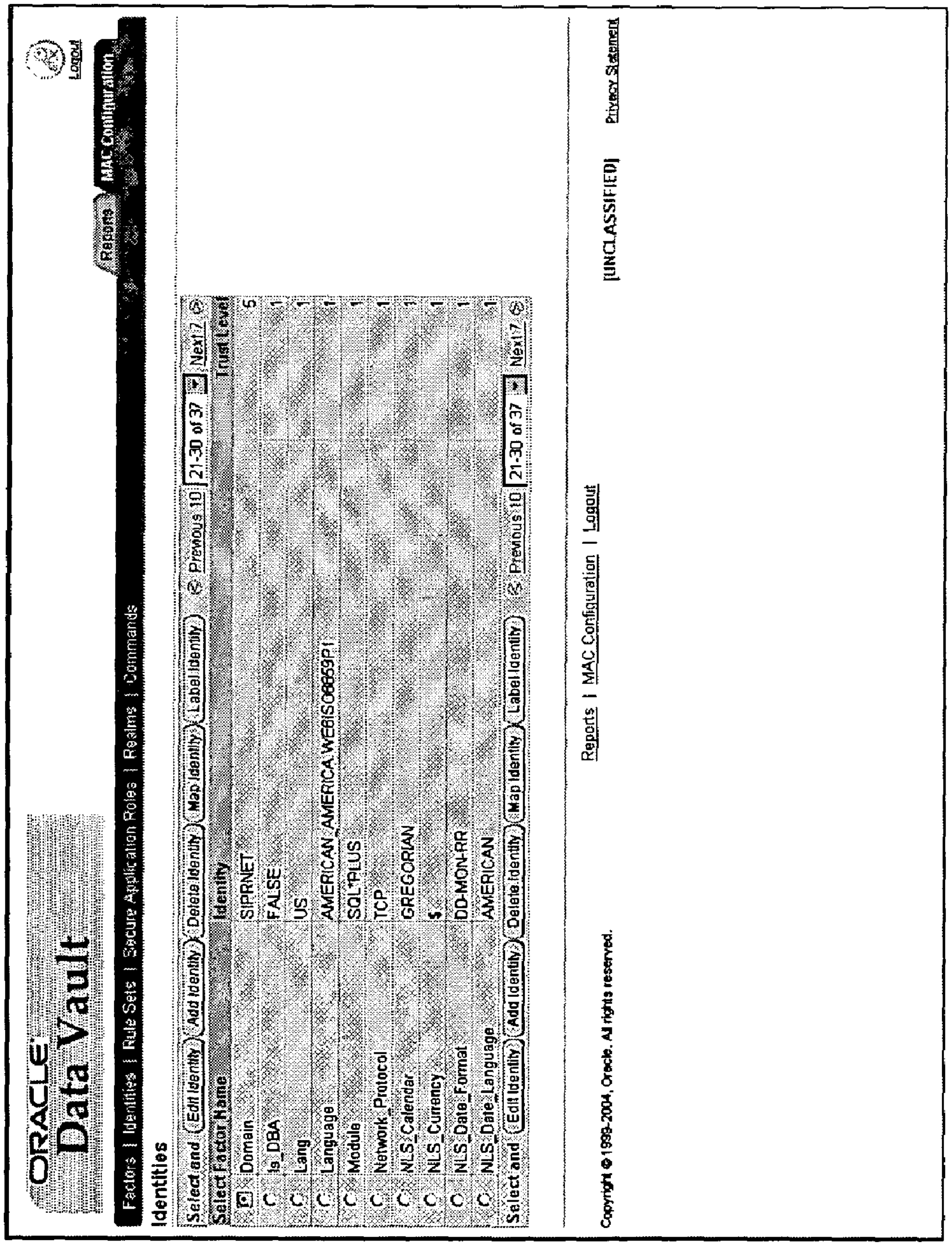
FIG. 20 is an illustration of an exemplary Data Vault Identities Menu page.

An example of a page that may be used to maintain identities is shown in FIG. 20. Options for managing factor identities may include:

Edit Identity—Change a factor identity's attributes.

Add Identity—Create a new factor identity.

Delete Identity—Delete an existing factor identity.

Map Identity—Derive a parent factor's identity by mapping the identities of it child factors, optionally through the factor links associated to the parent factor identity.

Label Identity—Assign OLS labels to factor identities (MACOLS only).

Figure 21:
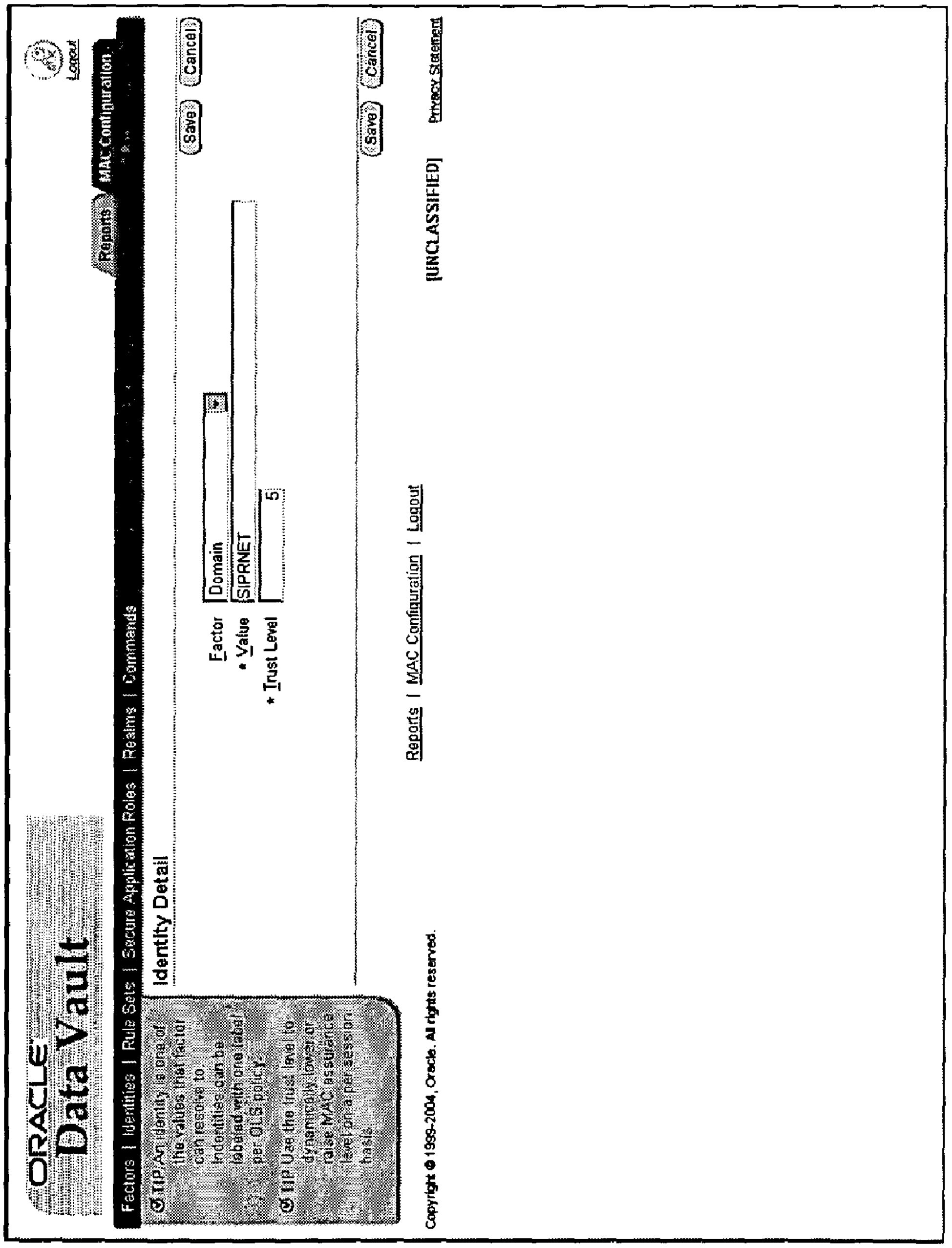
FIG. 21 is an illustration of an exemplary Identity Detail page.

An example of a page that allows editing of an identity is shown in FIG. 21. A factor identity's attributes may include:

Factor—Factor name from list of existing factors.

Value—Factor's potential value (also called the factor's identity). Note: In this page, you are not assigning a value to a factor, but rather merely designating a trust level to a specific Factor-Value pair. A factor's identity is determined at runtime. However, factors that are "Identified By" other factors are a special case which do require factor assignment in this page. (See Mapping Identities.)

Trust Level—The trust level assigned to the Factor-Value pair. This is a number which the Data Vault administrator derives some meaning. In general, the value of 1 should be default. A higher value indicates a higher level of trust. A negative value indicates distrust. When the factor identity returned from a factor retrieval method is not defined in the identity table, the identity is automatically assigned a negative trust level.

In the example above, the Domain factor identity for a medium security domain is trusted (value equals 5) and the identity for the for a high security domain is 10, which implies a greater trust.

Figure 22:
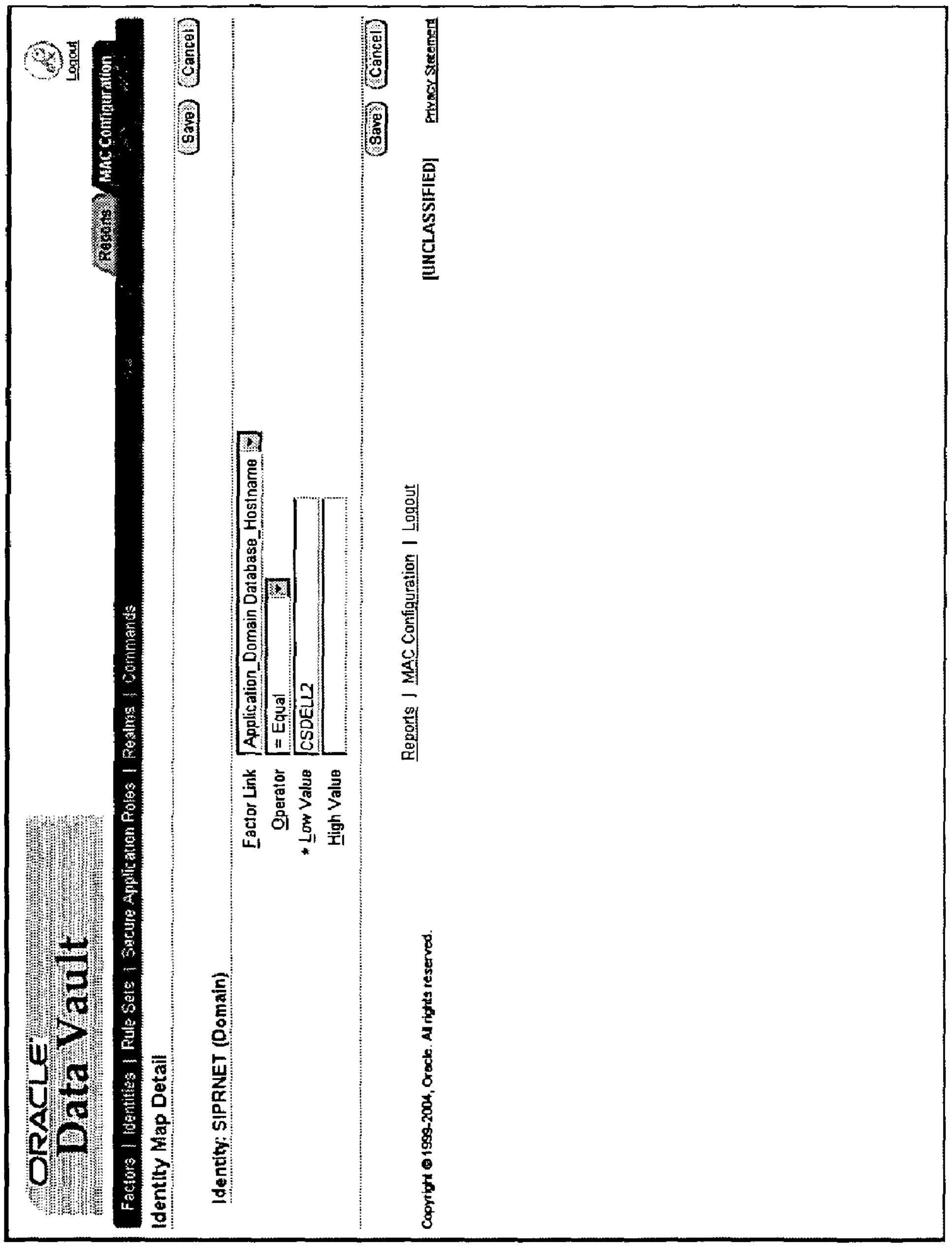
FIG. 22 is an illustration of an exemplary Identity Map page.

Identity Mapping is the final step in the process of identifying a factor by other factors. An example of such a process using a page such as that shown in FIG. 22 is as follows:

1. Create a parent factor using the Factors/Add Factor page and set the field Identified By to equal By Factors
2. Create child factors using the Factors/Add Factor page and set the field Identified By to equal By Method or By Constant
3. For the parent factor, create the parent-child factor relationship via Factors/Maintain Factor Links page and select the child factors from the available factors.
4. For the parent factor, create a factor identity using the Identities/Add Identity page.
5. Map the Factor-Identity pair of the parent to the Factor-Identity pairs of its children using the Identities tab/Map Identity page.
   a. First select the parent factor identity and then click on the Map Identity button. This will
   b. Click on the Add Identity Map button and select one of the child factors from the Factor Link drop down listbox. If you do not select a factor link, the operator and operand logic can be used to map a factor identity that has a continuous versus discrete domain, such as a temperature factor. Add the valid value(s) (potentially including a range of values from low to high) for a child in order for the parent to derive its Factor-Identity value and Save. Repeat for each child factor. Note: Each child's factor identity must equate to one of its valid values to derive the parent factor identity.

Figure 23:
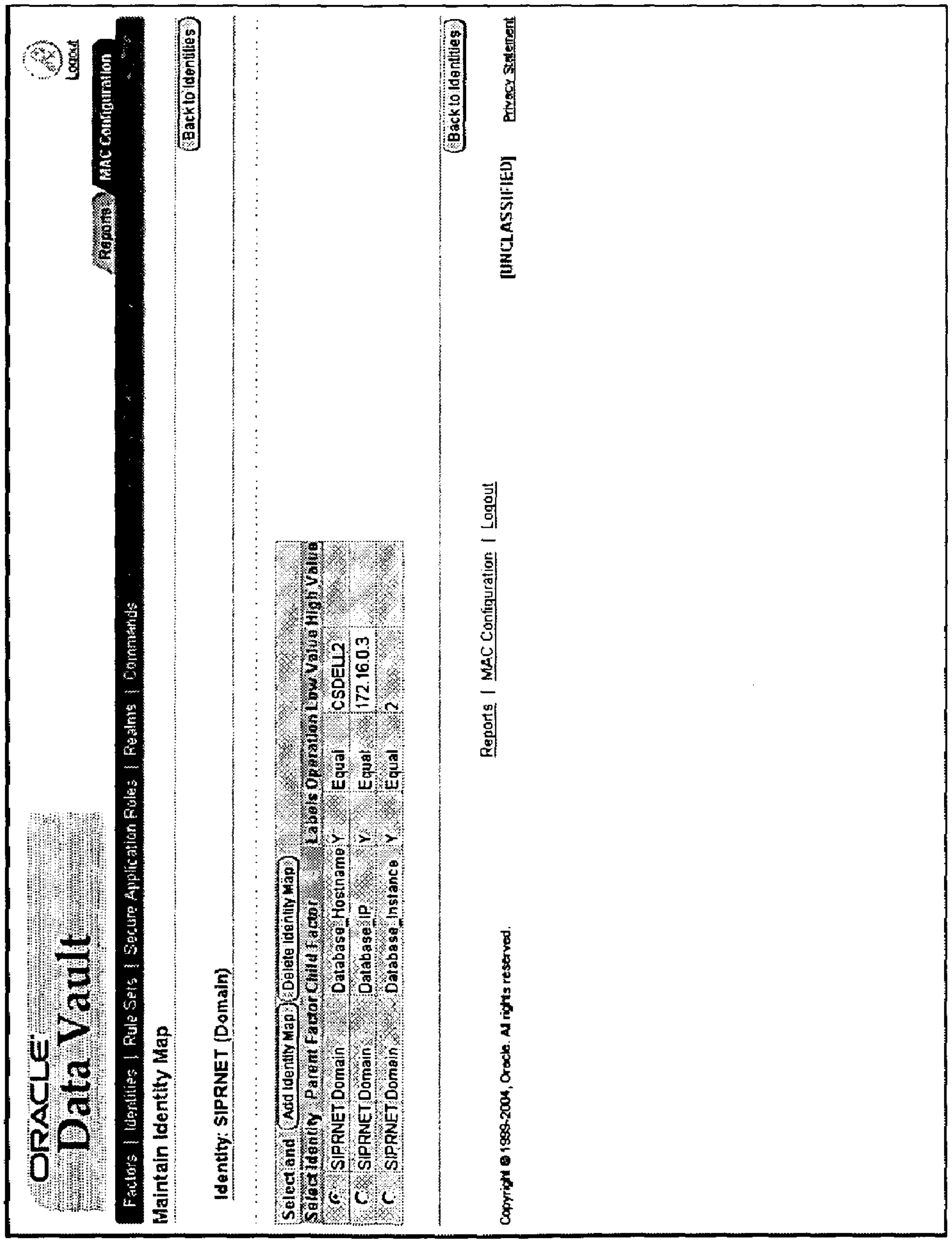
FIG. 23 is an illustration of an exemplary Identity Map Main page.

When completed, the complete Identity Map is displayed as shown in the example of FIG. 23. The illustrated Identity Map may be interpreted as follows:

"The Domain factor is resolved to be the SIPRNET Domain when each of the following child factors are resolved as follows: 1) The Database_Hostname factor is resolved to equal CSDELL2 and 2) the Database_IP is resolved to equal 172.16.0.3, and 3) the Database_Instance is resolved to equal 2."

If all three factors are not resolved as shown, then the value of the Domain cannot be resolved, and its identity is set to NULL. Hence, this process establishes a multi-factored approach to identifying key factors. If one factor is compromised, then factor identity is not assigned. If the parent factor's Audit Option is set to Retrieval Null or Always, an audit record is created to record this event. More than one identity for the same factor link, e.g. Domain and Database Hostname, can be defined in an identity map. This would be required in the case of more than one database server per domain in a RAC environment, the runtime logic will use OR logic for the same factor links so that the map is evaluated correctly no matter which server the session originates from.

Figure 24:
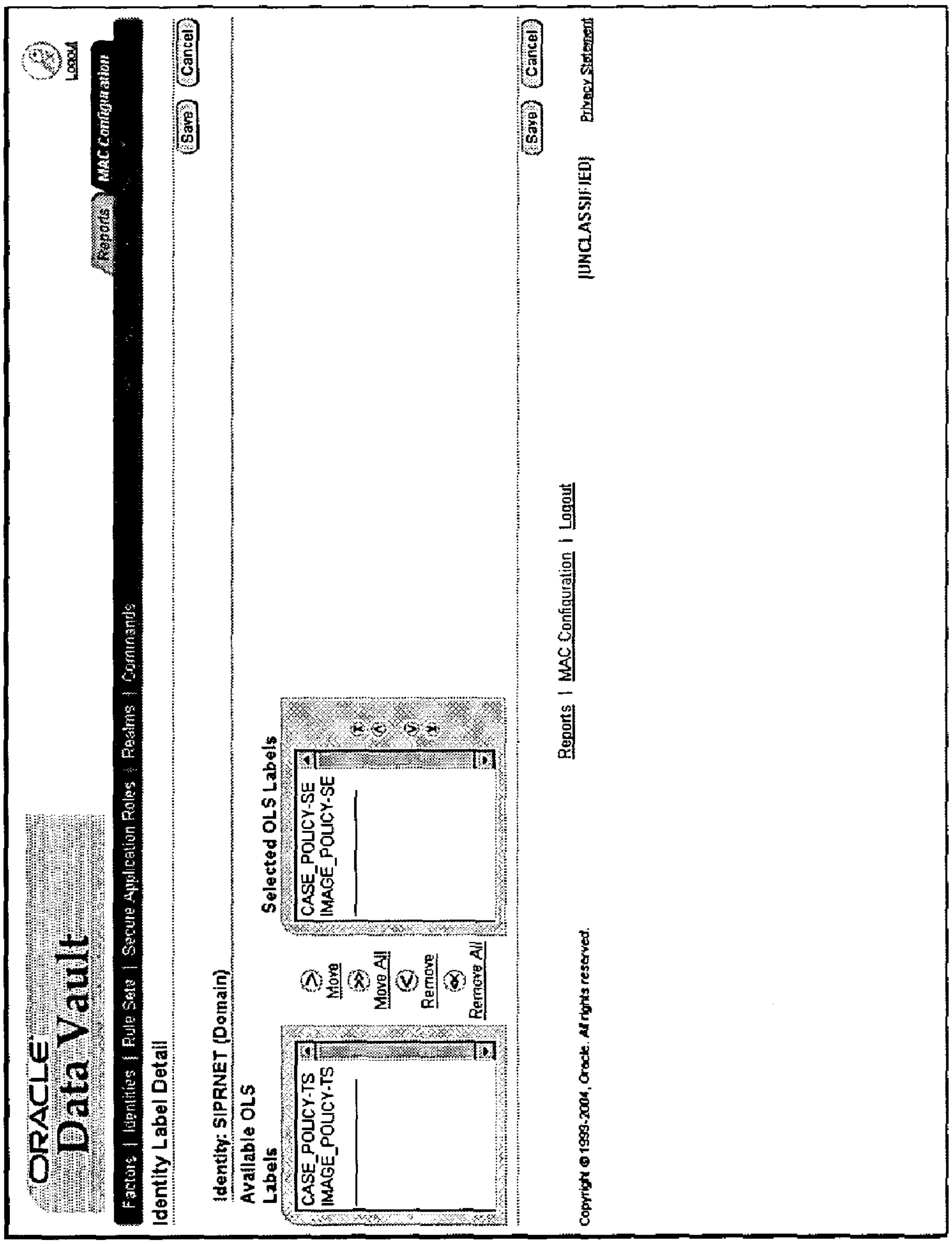
FIG. 24 is an illustration of an exemplary Identity Label Detail for Label Identity page.

A factor identity may be assigned an OLS label, such as using a page shown in FIG. 24. One of a factor's attributes is called Labeled By. The Labeled By attribute may be set to 'By Self' or 'By Factors'. When Labeled By is set to By Self, a Factor-Identity pair may be directly labeled. When a factor is Labeled By other factors (i.e. set to By Factors), the parent factor-identity label should not be set, but rather is derived from the labeling of child factor-identity pairs. When there are multiple child factor identities with labels, labels are Data Vault provides a rule engine for mandatory access control security. Using the Data Vault Administration application, rule sets can be defined and exposed for use by factors, realms, command authorizations, and secure application roles.

A rule set is a collection of one or more rules that evaluates to true or false based on the evaluation of each rule it contains and the evaluation type (i.e. All True or Any True). A rule is a PL/SQL expression that evaluates to true or false.

A rule set can be used as follows:

As a further restriction to a realm authorization, defining the conditions by which a realm authorization is active.

To define when command authorization is allowed

To enable a secure application role

To define when the identity of a factor can be assigned

To maintain rule sets, a page such as that shown in FIG. 25 may be used. Options for managing rule sets may include:

Edit Rule Set—Change a rule set's attributes.

Add Rule Set—Create a new rule set.

Delete Rule Set—Delete a rule set that is not referenced by other Data Vault objects such as realms, command authorizations, secure application roles, and factors.

Maintain Rules—Add, edit, and associate rules to a rule set.

Figure 26:
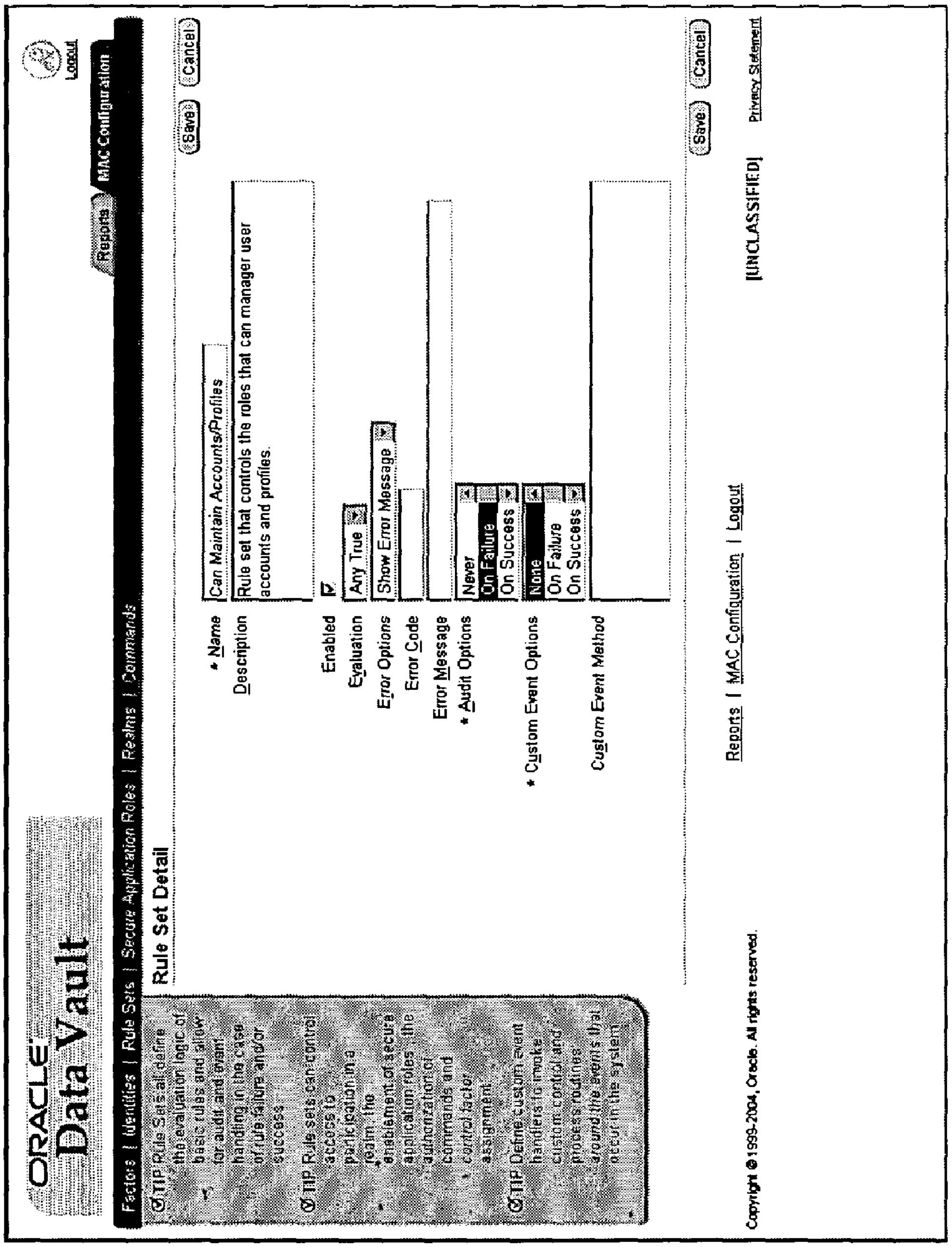
FIG. 26 is an illustration of an exemplary Rule Set Detail page.

A rule set may be edited using a page such as that shown in FIG. 26. To edit a rule set, first select it by clicking in the radio button next to the rule set's name and then click on the Edit Rule Set button. A rule set's attributes may include:

Name—Rule Set name.

Description—Description of rule set functionality.

Enabled—Determines if the rule set is enabled or disabled during runtime. Rule sets are enabled (checked) by default.

Evaluation—Determines evaluation when multiple rules are assigned to the rule set. When Evaluation is set to All True (default), then all rules must evaluate to true for the rule set to also evaluate to true. When Evaluation is set to Any True, then only one rule must evaluate to true for the rule set to also evaluate to true.

Error Options—An option that controls the messaging to the database session when the rule set evaluates to false or one of the associated rules contains an invalid PL/SQL expression. Two options are provided: 1) Show Error Message (default)—displays an error message to the database session and, 2) Fail Silently—does not display the error message.

Error Code—The error code displayed with an Error Message when the rule set evaluates to false or one of the associated rules contains an invalid PL/SQL expression.

Error Message—The Error Message displayed when the rule set evaluates to false or one of the associated rules contains an invalid PL/SQL expression. Up to 80 characters in mixed case. If no error message is defined with the rule set, Data Vault will display a generic error message.

Audit Options—An option that controls when Data Vault audit record is created. Audit records are accessible using Audit. Multiple options may be selected (e.g. On Failure and On Success) and include:

Never—Do not create an audit record under any circumstances.

On Failure (default)—Create an audit record when the rule set evaluates to false or one of the associated rules contains an invalid PL/SQL expression.

On Success—Create an audit record when a rule set evaluates to true.

Custom Event Options—An option for when to execute the Custom Event Method as a special event handler. A Custom Event Method could be used to provide special processing outside of the standard auditing features provided with Data Vault rule sets, such as initiating a workflow process or sending event information to an external system. Multiple options may be selected and include:

None (default)—Do not execute any Custom Event Method.

On Failure—Execute the Custom Event Method when the rule set evaluates to False or one of the associated rules contains an invalid PL/SQL expression.

On Success—Execute the Custom Event Method when a rule set evaluates to True.

Custom Event Method—A PL/SQL expression that is executed based on the Custom Event Option(s).

Figure 27:
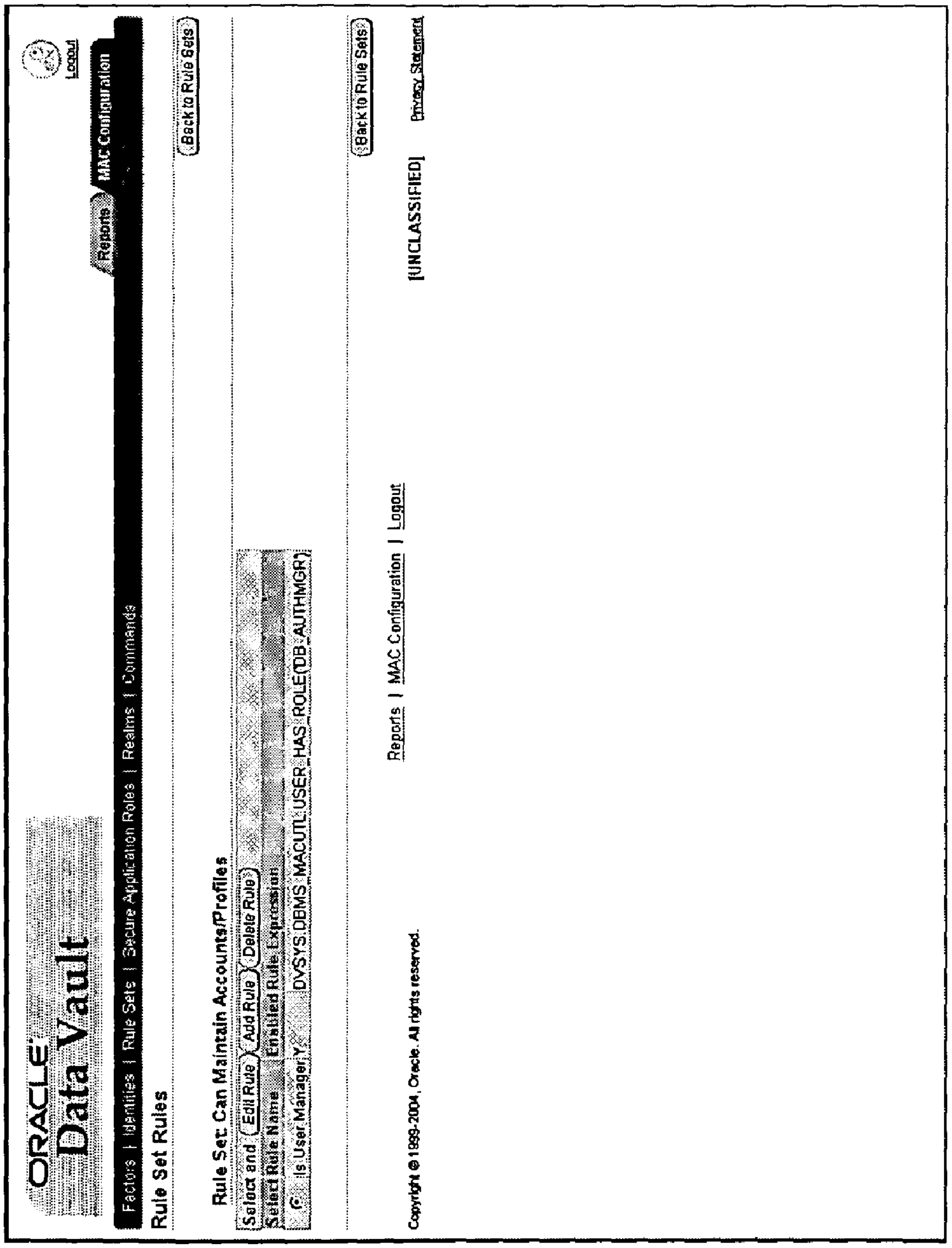
FIG. 27 is an illustration of an exemplary Maintain Rule Set Rules page.

A rule set should be associated with one or more rules. The rule set evaluation depends on the evaluation of its rules using the evaluation option (i.e. All True, Any True). A page such as that shown in FIG. 27 may be used to view the currently associated rules, create a new rule or associate existing rules with a rule set.

The Maintain Rules page displays currently assigned rules along with the options to:

Edit Rule—Edit the existing rules' name or PL/SQL expression and/or associate existing rules to a rule set.

Add Rule—Create and immediately associate a new rule to the rule set. Existing rules may also be associated to a rule set using this page.

Delete Rule—Delete a rule set/rule association.

Figure 28:
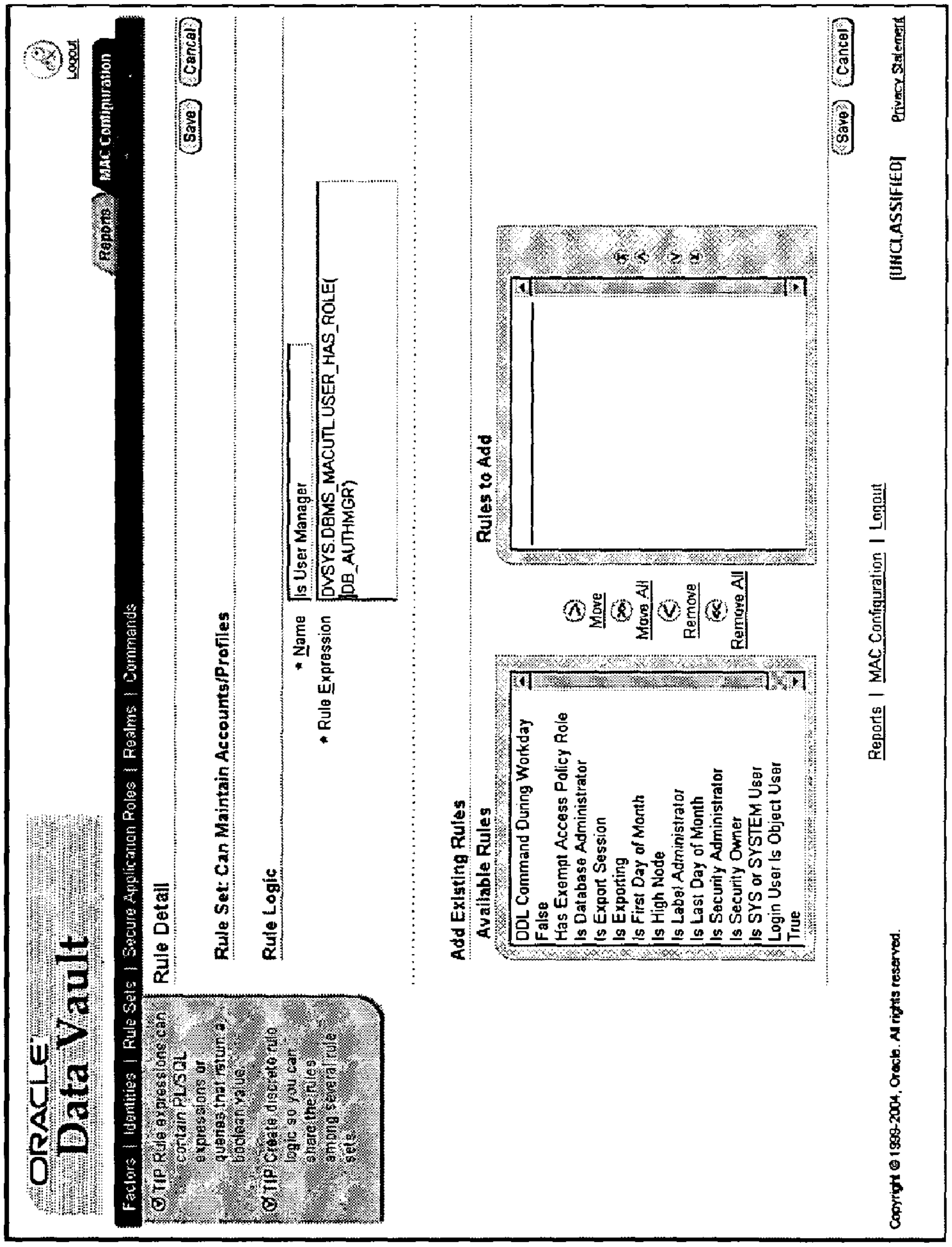
FIG. 28 is an illustration of an exemplary Rule page.

A page such as that shown in FIG. 28 may be used to edit and/or add rules.

Figure 29:
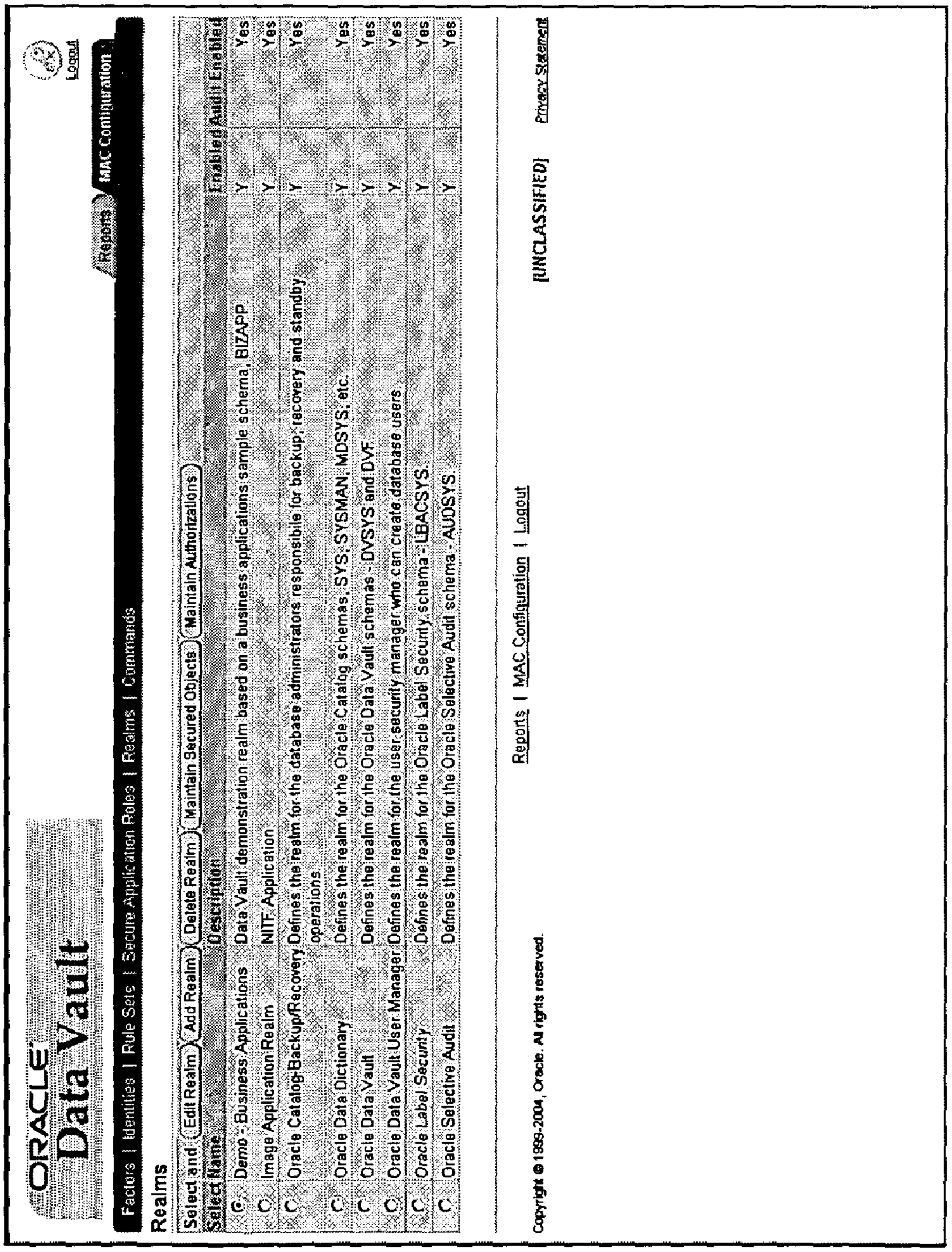
FIG. 29 is an illustration of an exemplary Data Vault Realm Menu page.

In order to configure a Data Vault realm, page such as that shown in FIG. 29 may be used. With a traditional database, the SYS and SYSTEM database accounts, or a database accounts with the DBA role, have the system privileges required to perform most DDL commands against any schema in the database. This condition is normally true regardless of whether or not these accounts really should have this type of powerful control. With regulatory compliance procedures increasing in importance in recent years, organizations want to designate specific database accounts that can maintain schemas related to accounting and another set of database accounts that can schemas related to human resources. Another condition that exists with a traditional database is the fact that a database role does not currently include the concept of a role owner. The SYS and SYSTEM database accounts, or a database accounts with the DBA role, can grant and revoke any role defined in the database to any database account.

Data Vault realms provide an initial capability to classify the schemas in a database into functional groups in order to provide finer grain access control of the ability to use system level privileges against these groups of schemas. Data Vault also provides the ability to associate database roles to a realm. Once the realm is defined, you can designate the database accounts and roles that should have privilege to maintain the objects (tables, views, etc.) in the associated schemas and database roles (secured objects) that are controlled by the realm.

Database accounts and/or roles are assigned authorization privileges to a realm as either realm owners or realm participants. A realm owner and a realm participant can use his/her system privileges when accessing realm secured objects. Additionally, a realm owner can grant/revoke realm secured database roles.

System privileges are sweeping database privileges such as CREATE ANY TABLE and DELETE ANY TABLE that typically apply across schemas and bypass the need for direct privileges. A database account's and role's system privileges can be found in data dictionary tables such as: dba_sys_privs, user_sys_privs, and role sys_privs.

To maintain realms, a page such as that shown in FIG. 29 may be used. Options for managing realms include:

Edit Realm—Change a realm's attributes.

Add Realm—Create a new realm.

Delete Realm—Delete an existing realm.

Maintain Secured Objects—Associate schema objects and database roles with a realm for protecting object access/creation and role grants/revokes from database accounts with system privileges, which do not have realm authorizations.

Maintain Authorizations—Assign database accounts and/or roles to be authorized as a realm owner or realm participant.

Figure 30:
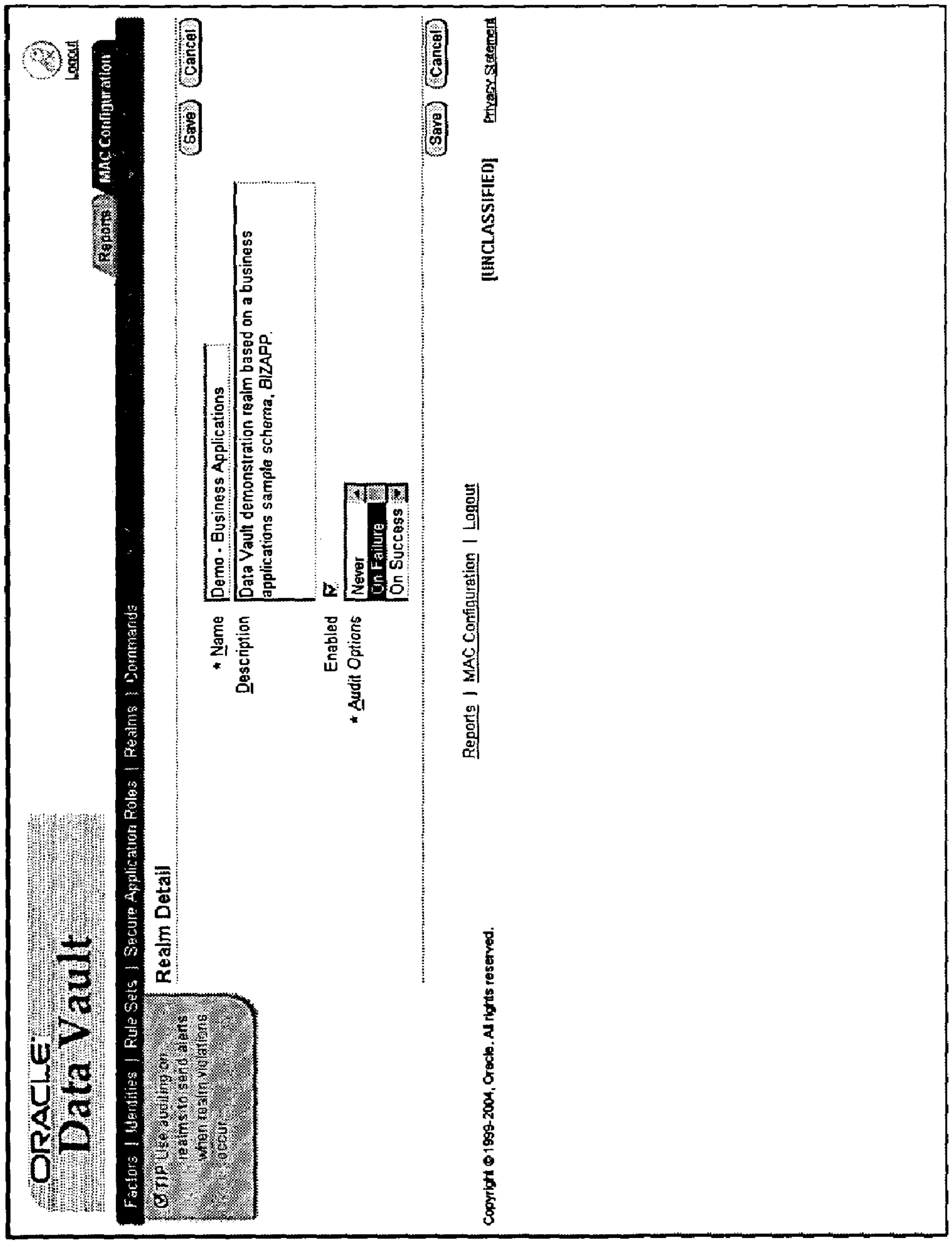
FIG. 30 is an illustration of an exemplary Realm Detail page.
Figure 31:
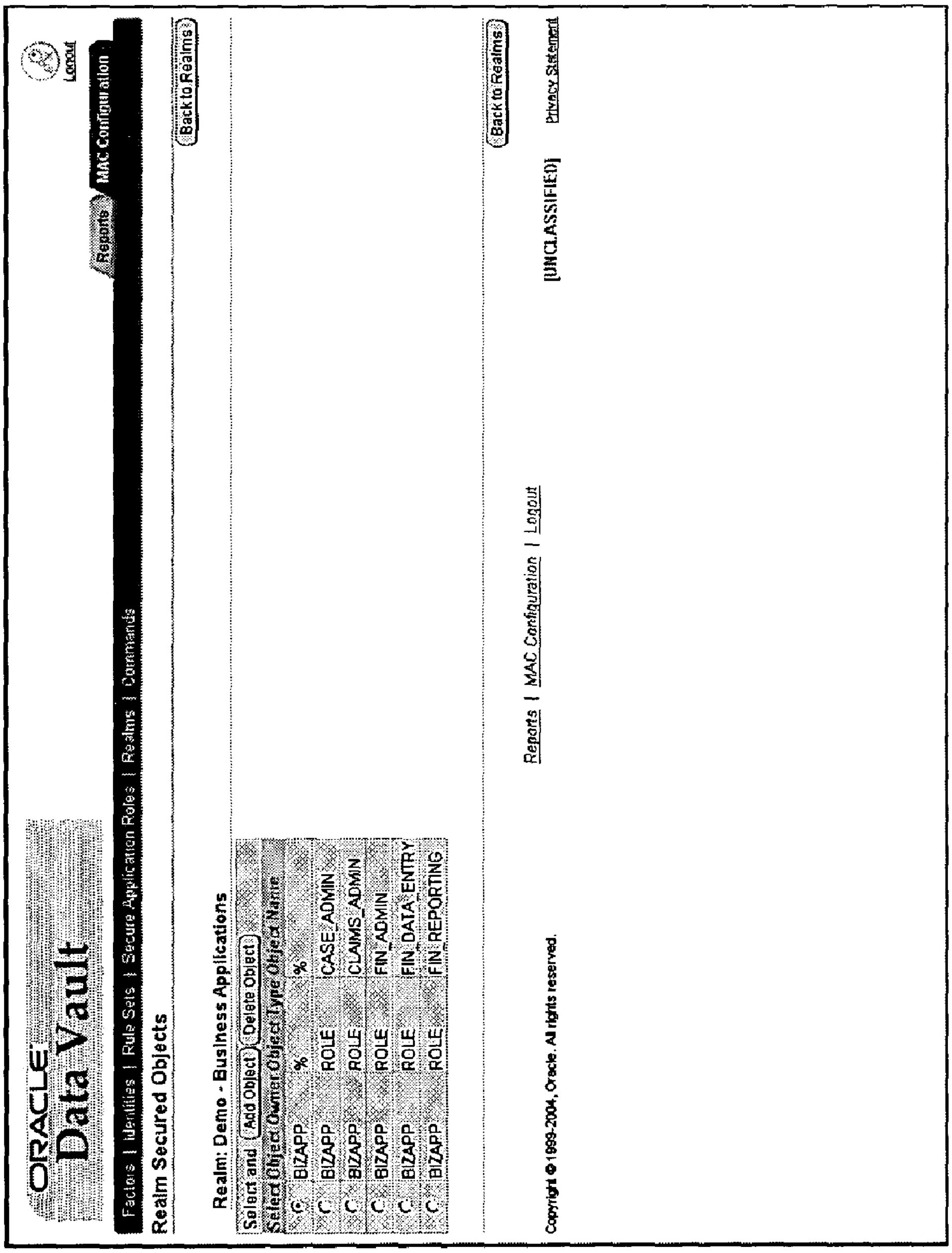
FIG. 31 is an illustration of an exemplary Realm Secured Objects Menu page.

To edit a realm, a page such as that shown in FIG. 30 may be used. A realm's attributes include:

Name—Realm name.

Description—Description of realm.

Enabled—Determines if the realm is enabled or disabled during runtime. Realm is enabled (checked) by default.

Audit Options—An option for when to create custom Data Vault audit records, which are made accessible via Audit. Multiple options may be selected (e.g. On Failure and On Success) and include:

Never—Do not create an audit record.

On Failure (default)—Create an audit record when a realm violation occurs. This type of auditing handles the condition where the object being accessed/manipulated exists in the realm, but the database account performing the operation on the object is not authorized in any manner (non-existent entry in the defined authorizations of the realm).

On Success—Create an audit record when an authorized realm owner or participant uses his/her system privileges to successfully access/manipulate objects in a realm.

The secured objects define the "territory" which a realm covers and protects. The realm territory is a set of schemas/objects and roles. To define the realm secured objects, a page such as that shown in FIG. 32 may be used. The Maintain Secured Objects page displays currently assigned secured objects along with the options to:

Add Object—Create a new realm-object association.

Delete Object—Delete one of the existing realm-object associations by clicking the radio button next to the object and click on the Delete Object button.

Figure 32:
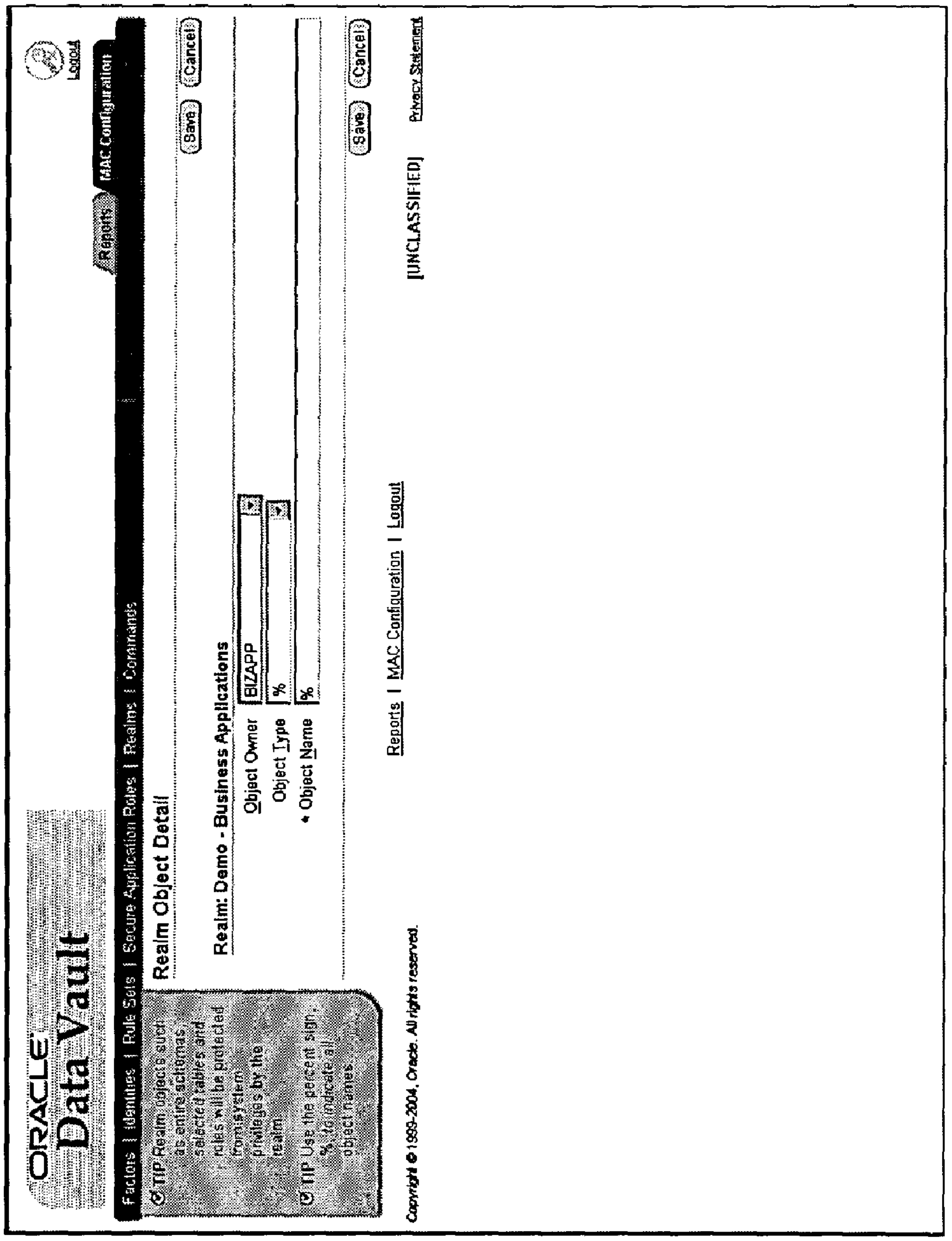
FIG. 32 is an illustration of an exemplary Realm Secured Object page.

In order to create a new realm-object association, a page such as that shown in FIG. 32 may be used. When creating a realm-object association, three attributes may be required:

Object Owner—The name of the database schema owner, selected from a drop down listbox containing all schema owners in the database, listed in alphabetical order.

Object Type—The type of a database object (e.g. TABLE, INDEX, ROLE).

Object Name—The name of an object in the database.

Figure 33:
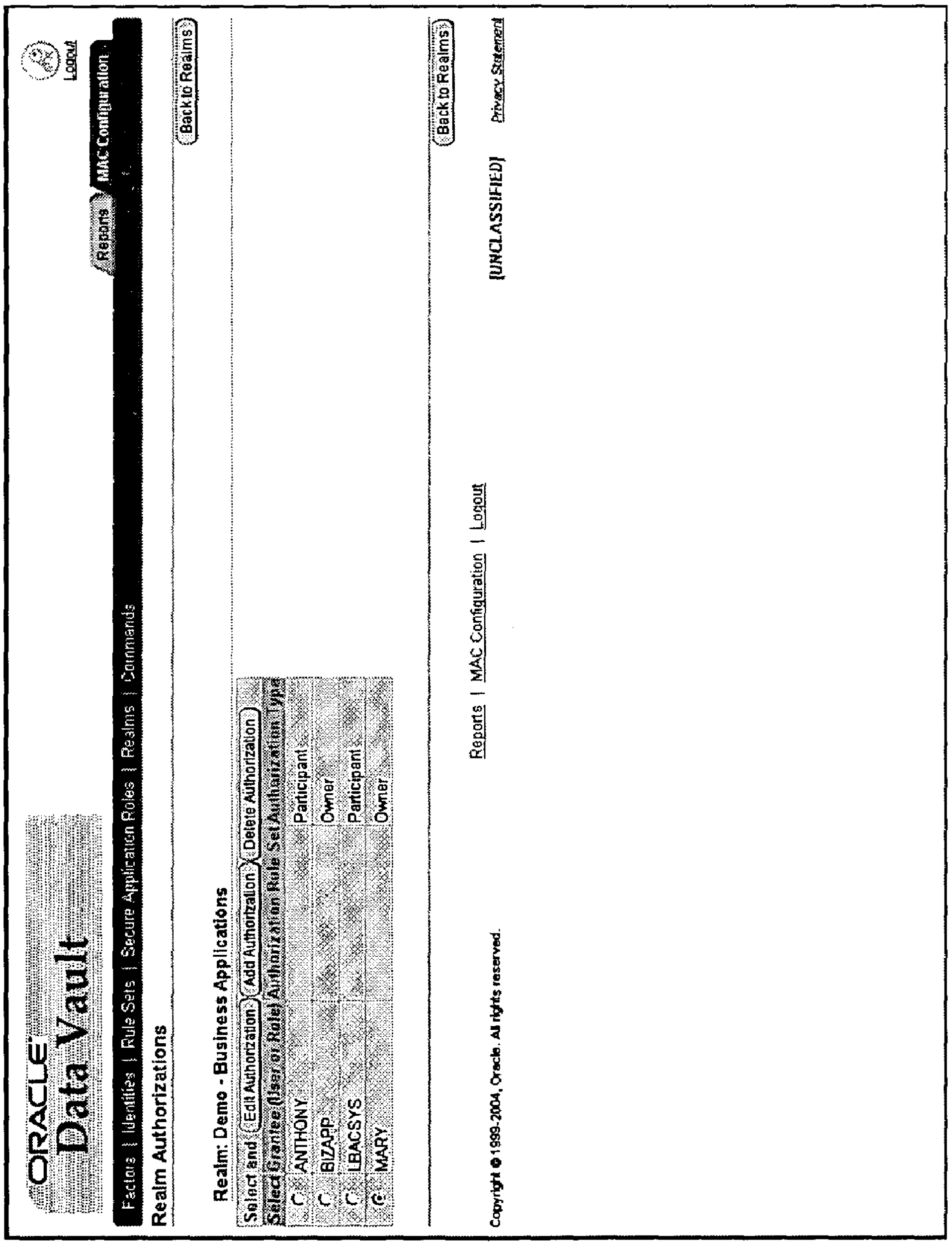
FIG. 33 is an illustration of an exemplary Realm Authorization Menu page.

Realm authorizations establish the set of database accounts that are authorized to use their system privileges when accessing/creating realm secured objects or granting/revoking realm secured roles. To define the realm authorizations, a page such as that shown in FIG. 33 may be used. The Maintain Authorizations page displays currently assigned authorizations along with the options to:

Edit Authorization—Edit existing authorization.

Add Authorization—Create a new authorization.

Delete Authorization—Delete an existing authorization.

Figure 34:
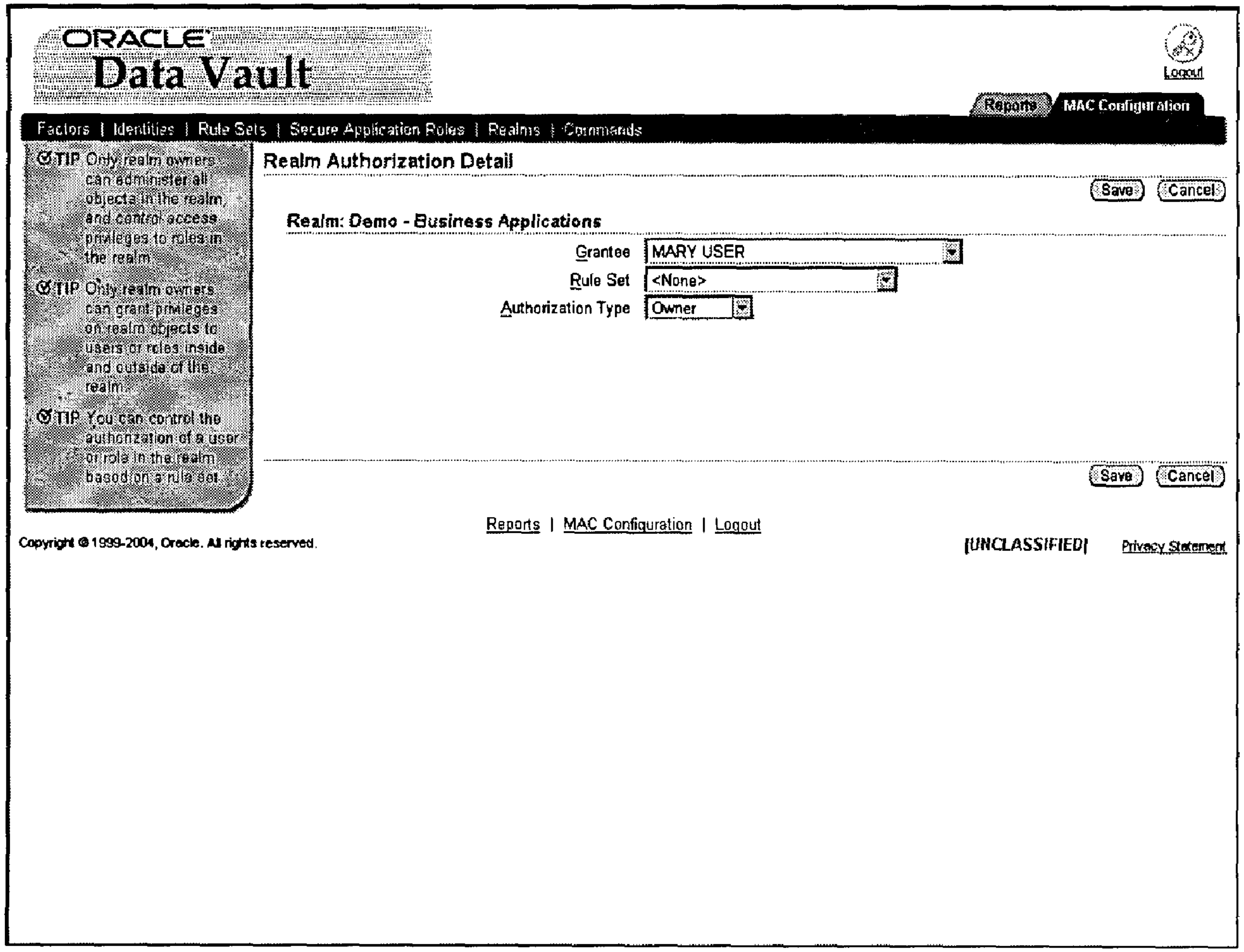
FIG. 34 is an illustration of an exemplary Realm Authorization page.

A new authorization may be created using a page such as that shown in FIG. 34. Editing and Adding authorizations manage the same attributes:

1. *Grantee—An database account or role selected from a drop down list of all available database accounts and database roles in alphabetical order.
2. Rule Set—A Data Vault rule set that defines how and when the realm authorization is enabled. No rule set (<None>) is default and implies that the realm authorization is always enabled. If the rule set evaluates to true, the database session command succeeds provided the associated database account has the necessary system or direct object privileges to perform the command. If the rule set evaluates to false, the database account's command fails due with a realm authorization violation. Any auditing and custom event handling associated with the rule set will occur as part of the realm authorization processing.
3. *Authorization Type—Participant (default) or Owner.

A realm participant is authorized to use his/her system privileges to access/manipulate/create objects protected by the realm.

A realm owner is authorized to perform all actions authorized to a realm participant. Additionally, the realm owner may grant/revoke roles protected by the realm.

From a database account perspective, the realm algorithm works like the following when a database account issues a SQL command:

1. Is a database account using a system privilege to execute the SQL command? If yes, go to step 2. If no, realms do not impact the SQL command.
2. Does the SQL command impact objects secured by a realm? If yes, go to step 3. If no, realms do not impact the SQL command.
3. Is the database account a realm owner or realm participant? If yes, go to step 4. If no, create a realm violation and do not allow the SQL command to succeed.
4. Is the database account's authorization conditional based on a rule set? If yes, go to step 5. If no, there is no realm violation. Allow the SQL command to succeed.
5. Does the rule set evaluate to true? If yes, there is no realm violation. Allow the SQL command to succeed. If no, there is a realm violation. Do not allow the SQL command to succeed.

Figure 35:
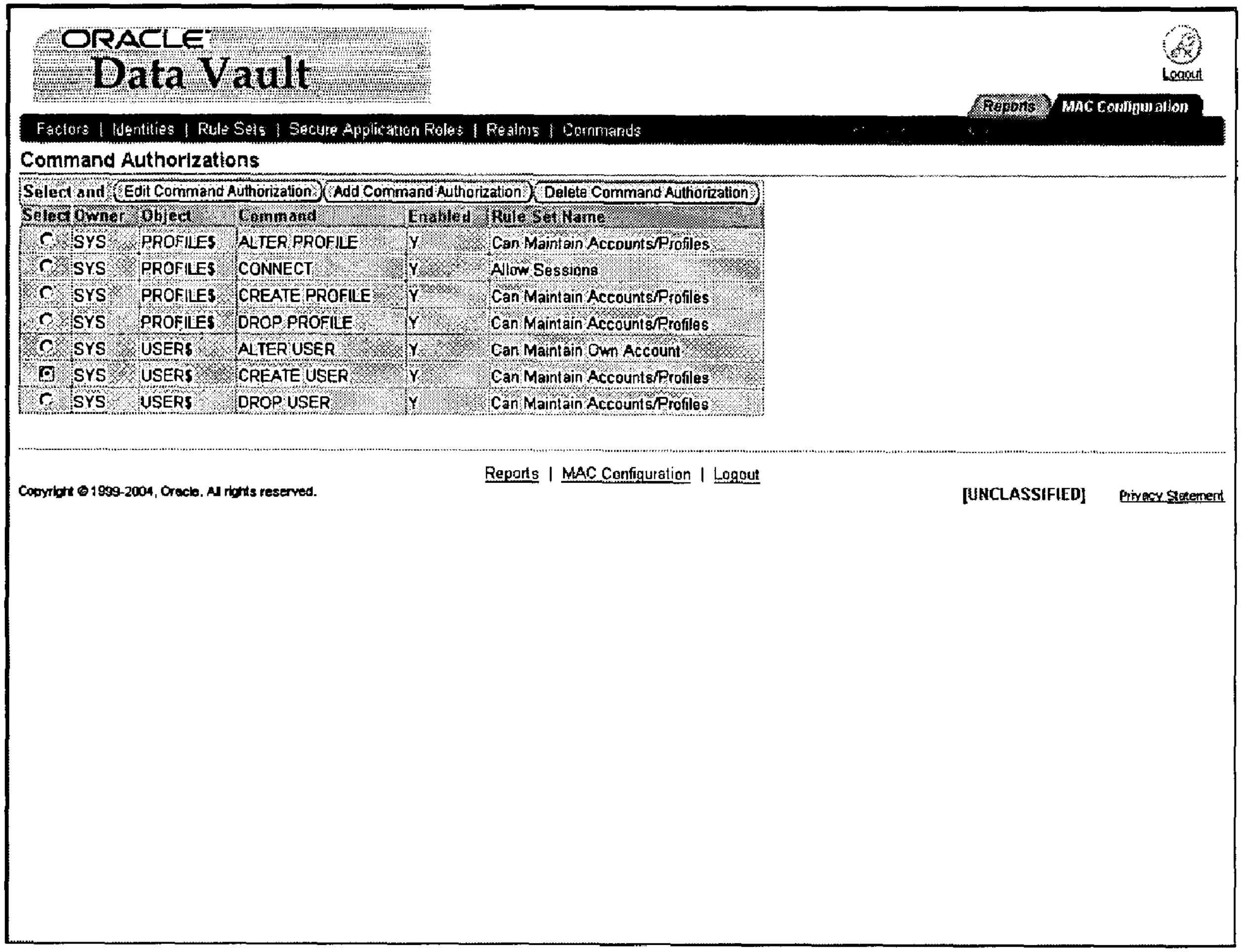
FIG. 35 is an illustration of an exemplary Data Vault Command Authorizations Menu page.

A page such as that shown in FIG. 35 may be used to configure command authorizations. Command authorizations control the ability to execute DDL commands and special database operations, and make a special determination of whether or not to allow the command to succeed based on the evaluation of a Data Vault rule set. Examples of the type of command authorization functionality that can be configured include:

Only allow DDL commands such as CREATE TABLE, DROP TABLE, and ALTER TABLE in the BIZAPP schema to be successful after business hours, but not during business hours.

Only allow database connection to be successful when non-SYS database accounts do not have specific system privileges to which they should not be authorized.

Only allow a database account with the DB_AUTHMGR role to successfully issue the CREATE USER and DROP USER command.

To maintain command authorizations, a page such as that shown in FIG. 35 may be used. Options for managing command authorizations include:

Edit Command Authorization—Change a command authorization's attributes.

Add Command Authorization—Create a new command authorization.

Delete Command Authorization—Delete an existing command authorization.

Figure 36:
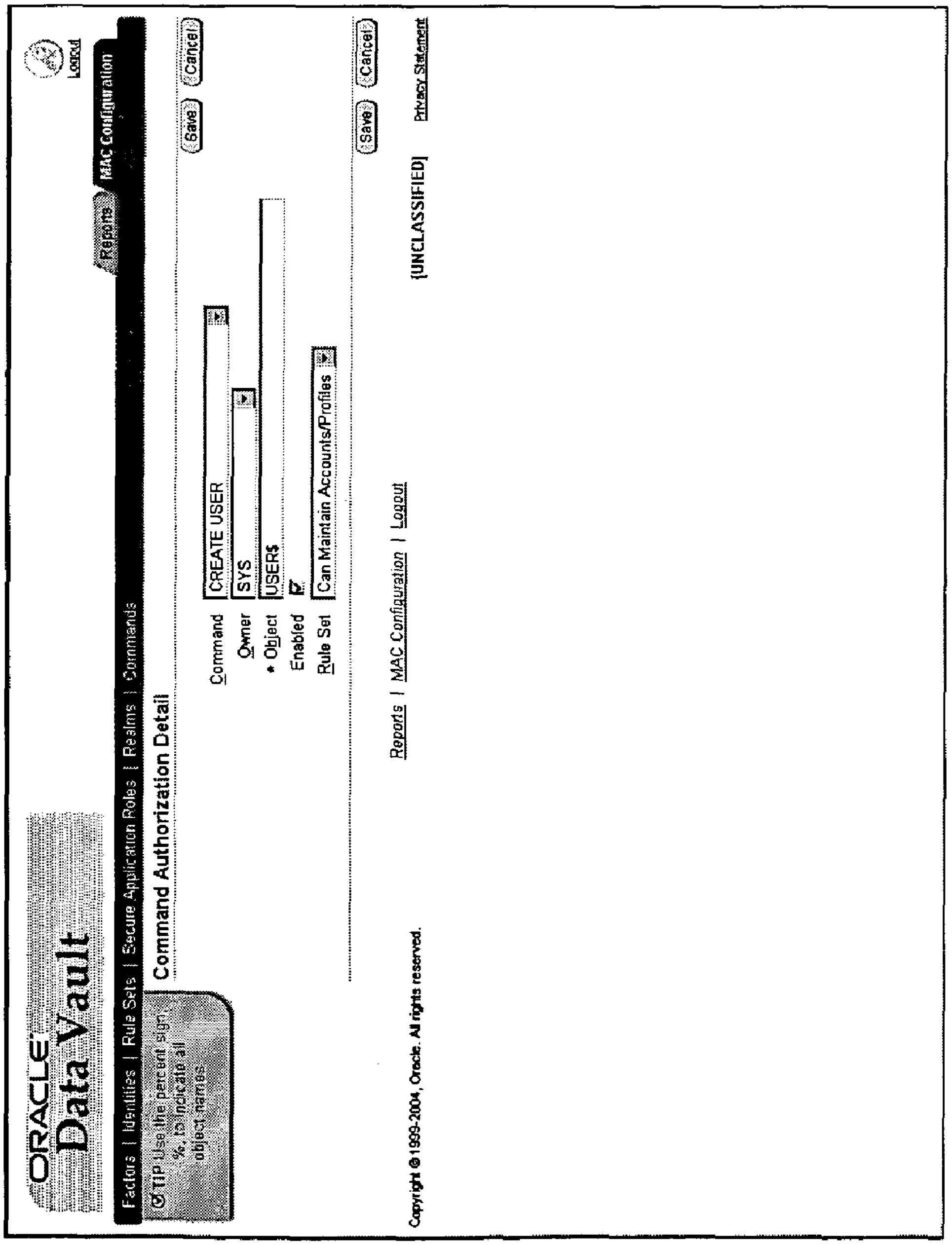
FIG. 36 is an illustration of an exemplary Command Authorization page.

To edit a command authorization, a page such as that shown in FIG. 36 may be used. A command authorization's attributes may include:

Command—Name of SQL command to be trapped, selected from drop down list. This list contains special commands such as CONNECT (authorizing any session login).

Owner—Owner of object impacted by the command. Note: Wildcards may be used (e.g. '%').

Object—Name of database object impacted by the command. Note: Wildcards may be used (e.g. '%').

Enabled—Determines if the command authorization is enabled or disabled during runtime. Command authorization is enabled (checked) by default.

Rule Set—Associated Data Vault rule set. If the rule set evaluates to true, the command succeeds. If the rule set evaluates to false, the command fails and a command rule violation is created. Any auditing and custom event handling associated with the rule set will occur as part of the command authorization processing.

Figure 37:
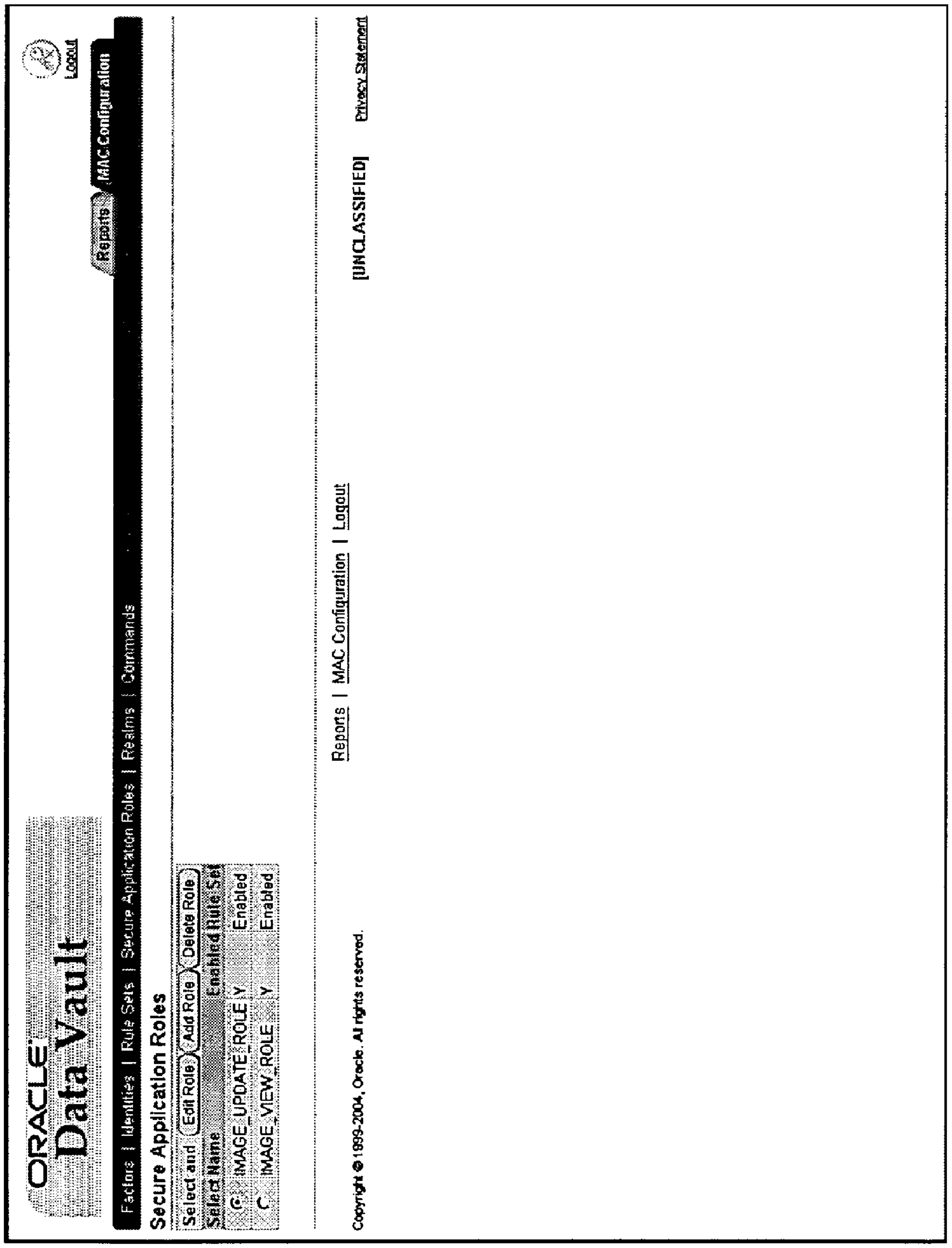
FIG. 37 is an illustration of an exemplary Data Vault Secure Application Role Menu page.

A page such as that shown in FIG. 37 may be used to configure secure application roles. A secure application role is a special role that can only be enabled using a specific PL/SQL procedure. Using Data Vault, the MAC administrator can create secure application roles that are enabled based on the outcome of a Data Vault rule set (i.e. set role if the associated rule set evaluates to true; otherwise, don't set). After the secured application roles are created in Data Vault, applications can set these roles by calling the Data Vault API:

DVSYS.DBMS_MACSEC_ROLES.SET_ROLE('<role name>')

Options for managing secure application roles include:

Edit Role—Change the secure application role's attributes.

Add Role—Create a new secure application role.

Delete Role—Delete an existing secure application role.

Figure 38:
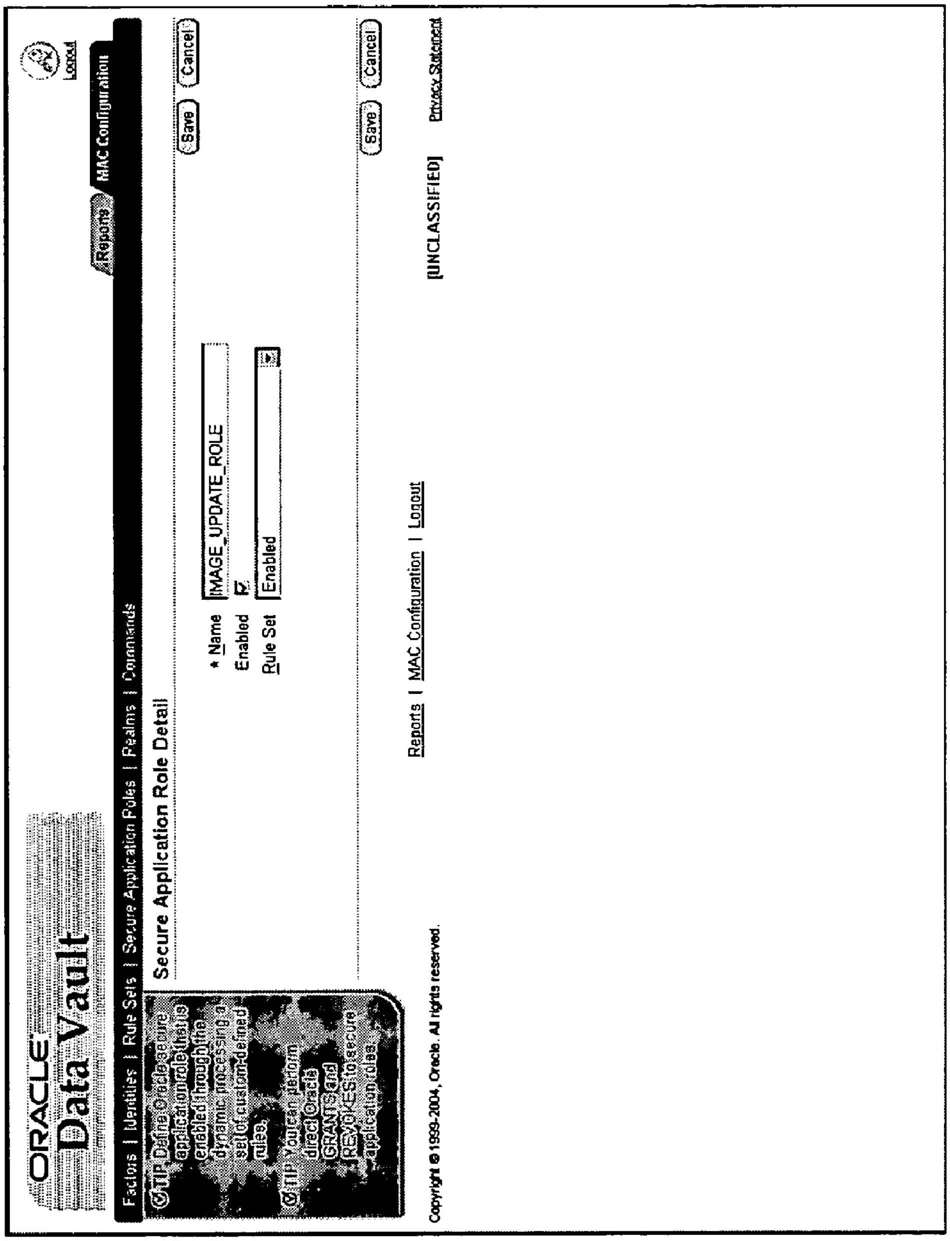
FIG. 38 is an illustration of an exemplary Secure Application Role page.

To add or edit a secure application role, a page such as that shown in FIG. 38 may be used. A secure application role's attributes may include:

Name—Name of a secure application role.

Enabled—Determines if the role can be set during runtime.

Rule Set—Associated Data Vault rule set.

Figure 39:
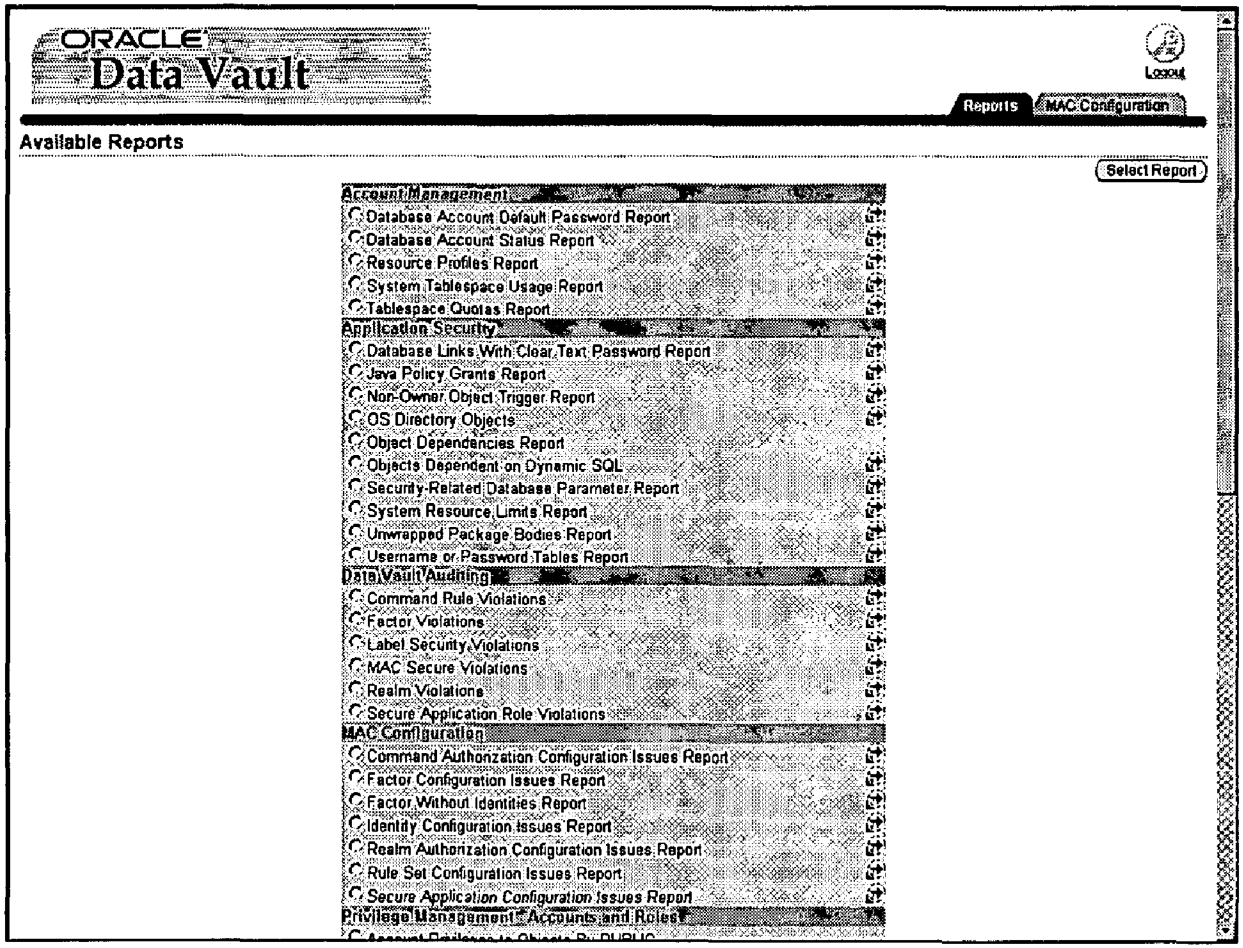
FIG. 39 is an illustration of an exemplary Data Vault Available Reports Menu page.

A large number of reports that detail security-related information in the database may be of use, as well as reports that show custom Data Vault audit event information. To run the Data Vault reports, a page such as that shown in FIG. 39. Examples of useful reports include:

Account Management

Application Security

Data Vault Auditing

MAC Configuration

Privilege Management—Accounts and Roles

Privilege Management—Summaries

Privilege Management—System

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such as floppy disc, a hard disk drive, RAM, and CD-ROM's, as well as transmission-type media, such as digital and analog communications links.

Although specific embodiments of the present invention have been described, it will be understood by those of skill in the art that there are other embodiments that are equivalent to the described embodiments. In particular, it is to be noted that descriptions of the present invention in relation to specific technologies, including, but not limited to the ORACLE® RDBMS, the ORACLE® GRID, the ORACLE® RAC, the ORACLE® Lable Security (OLS), the ORACLE® MACOLS, etc., are merely examples of particular implementations of the present invention. The present invention is not limited to such particular implementations, but rather, contemplates implementation with any systems and technologies that provide similar or equivalent functionality. Accordingly, it is to be understood that the invention is not to be limited by the specific illustrated embodiments, but only by the scope of the appended claims.

What is claimed is:

1. A database system comprising a processor operable to execute computer program instructions, a memory operable to store computer program instructions executable by the processor and data processable by the processor, data stored in the memory and processable by the processor, and computer program instructions stored in the memory and executable to process the data to implement:

a plurality of database objects, each database object having a level of security, at least some of the database objects comprising data;

a plurality of security factors, each security factor representing a characteristic of a user of the database system attempting to access data in the database system, including a physical security factor type indicating a physical, network, or database characteristic of the user, an implementation security factor type indicating a user-defined, application, or certificate information characteristic of the user, or an environmental security factor type indicating a time-based characteristic of the user;

at least one database session of the user in the database, the database session having a level of security, the user communicatively connected to the database with one of a plurality of network domains, each network domain having a level of security; and a plurality of realms, each realm comprising a set of database schemas used by an application and each realm defining a privilege of the user of the database system relative to a schema of the database system;

wherein the database system is operable to grant or deny access to the data to a user based on the security factors associated with the user, based on a privilege of the user defined by at least one realm, based on the level of security of the data, based on the level of security of the database session, and based on the level of security of the network domain, and wherein each unit of data is created by one the plurality of network domains and the database system is further operable to provide access to the unit of data to a network domain independently of which network domain created the unit of data.

2. The database system of claim 1, wherein the data is divided into a plurality of data partitions, each data partition is created by one the plurality of network domains and the database system is further operable to provide access to a data partition to a network domain independently of which network domain created the data partition.

3. The database system of claim 1, further comprising an auditing system operable to monitor database operations that are attempted to be performed on the database objects, wherein the auditing system is operable to monitor the database operations based on:

the plurality of security factors;

a plurality of rules, each rule defining a limitation on operation of the database system by the user based on at least some of the plurality of security factors and based on attributes of data to be operated on, including the level of security of the database object of the data to be operated on.

4. The database system of claim 1, wherein each security factor comprises a value of the security factor and an indicator of a level of trust in the security factor.

5. The database system of claim 4, wherein a rule is based on at least one of the value of the security factor and the level of trust of the security factor.

6. The database system of claim 1, wherein the plurality of database objects comprises at least one of an Authorized Security Value, a collection of database objects, a host name, an IP address, a router, a switch, a proxy server, a database instance, a database table, a database row, a database column, a database view, a database view row, a database view column, a database schema, a database partition, a database tablespace, and a database data file.

7. The database system of claim 6, wherein the level of security of the database session is determined based on at least one security factor.

8. The database system of claim 1, wherein the level of security of the database session is determined by assigning a level of security of a user of the database system with which the database session is associated as an initial level of security, then determining a maximum session level of security based on additional security factors.

9. A method of operating a database system comprising a processor operable to execute computer m instructions, a memo operable to store computer program instructions executable by the processor and data processable by the processor, data stored in the memory and processable by the processor, and computer program instructions stored in the memory and executable to process the data to perform the steps of:

providing a plurality of database objects, each database object having a level of security, at least some of the database objects comprising data;

providing a plurality of security factors, each security factor representing a characteristic of a user of the database system attempting to access data in the database system, including a physical security factor type indicating a physical, network, or database characteristic of the user, an implementation security factor type indicating a user-defined, application, or certificate information characteristic of the user, or an environmental security factor type indicating a time-based characteristic of the user;

accepting at least one database session of the user in the database, the database session having a level of security, the user communicatively connected to the database with one of a plurality of network domains, each network domain having a level of security;

providing a plurality of realms, each realm comprising a set of database schemas used by an application and each realm defining a privilege of the user of the database system relative to a schema of the database system;

determining whether to grant or deny access to the data to a user based on the security factors associated with the user, based on a privilege of the user defined by at least one realm, based on the level of security of the data, based on the level of security of the database session, and based on the level of security of the network domain, and wherein each unit of data is created by one the plurality of network domains and the database system is further operable to provide access to the unit of data to a network domain independently of which network domain created the unit of data.

10. The method of claim 9, wherein the data is divided into a plurality of data partitions, each data partition is created by one the plurality of network domains and the method further comprises:

providing access to a data partition to a network domain independently of which network domain created the data partition.

11. The method of claim 9, further comprising:

monitoring database operations that are attempted to be performed on the database objects, based on:

the plurality of security factors;

a plurality of rules, each rule defining a limitation on operation of the database system by the user based on at least some of the plurality of security factors and based on attributes of data to be operated on, including the level of security of the database object of the data to be operated on.

12. The method of claim 9, wherein each security factor comprises a value of the security factor and an indicator of a level of trust in the security factor.

13. The method of claim 12, wherein a rule is based on at least one of the value of the security factor and the level of trust of the security factor.

14. The method of claim 9, wherein the plurality of database objects comprises at least one of an Authorized Security Value, a collection of database objects, host name, an IP address, a router, a switch, a proxy server, a database instance, a database table, a database row, a database column, a database view, a database view row, a database view column, a database schema, a database partition, a database tablespace, and a database data file.

15. The method of claim 14, wherein the level of security of the database session is determined based on at least one security factor.

16. The method of claim 9, wherein the level of security of the database session is determined by assigning a level of security of a user of the database system with which the database session is associated as an initial level of security, then determining a maximum session level of security based on additional security factors.

17. A computer program product for operating a database system comprising:

a computer readable storage medium;

computer program instructions, recorded on the computer readable storage medium, executable by a processor, for performing the steps of providing a plurality of database objects, each database object having a level of security, at least some of the database objects comprising data;

providing a plurality of security factors, each security factor representing a characteristic of a user of the database system attempting to access data in the database system, including a physical security factor type indicating a physical, network, or database characteristic of the user, an implementation security factor type indicating a user-defined, application, or certificate information characteristic of the user, or an environmental security factor type indicating a time-based characteristic of the user;

accepting at least one database session of the user in the database, the database session having a level of security, the user communicatively connected to the database with one of a plurality of network domains, each network domain having a level of security;

providing a plurality of realms, each realm comprising a set of database schemas used by an application and each realm defining a privilege of the user of the database system relative to a schema of the database system;

determining whether to grant or deny access to the data to a user based on the security factors associated with the user, based on a privilege of the user defined by at least one realm, based on the level of security of the data, based on the level of security of the database session, and based on the level of security of the network domain, and providing access to a unit of data to a network domain independently of which network domain created the unit of data, wherein each unit of data was created by one the plurality of network domains.

18. The computer program product of claim 17, wherein the data is divided into a plurality of data partitions, each data partition is created by one the plurality of network domains and the computer program product further comprises:

providing access to a data partition to a network domain independently of which network domain created the data partition.

19. The computer program product of claim 17, further comprising:

monitoring database operations that are attempted to be performed on the database objects, based on:

the plurality of security factors;

a plurality of rules, each rule defining a limitation on operation of the database system by the user based on at least some of the plurality of security factors and based on attributes of data to be operated on, including the level of security of the database object of the data to be operated on.

20. The computer program product of claim 17, wherein each security factor comprises a value of the security factor and an indicator of a level of trust in the security factor.

21. The computer program product of claim 20, wherein a rule is based on at least one of the value of the security factor and the level of trust of the security factor.

22. The computer program product of claim 17, wherein the plurality of database objects comprises at least one of an Authorized Security Value, a collection of database objects, a host name, an IP address, a router, a switch, a proxy server, a database instance, a database table, a database row, a database column, a database view, a database view row, a database view column, a database schema, a database partition, a database tablespace, and a database data file.

23. The computer program product of claim 22, wherein the level of security of the database session is determined based on at least one security factor.

24. The computer program product of claim 17, wherein the level of security of the database session is determined by assigning a level of security of a user of the database system with which the database session is associated as an initial level of security, then determining a maximum session level of security based on additional security factors.

25. The database system of claim 1, wherein the plurality of security factors include a physical security factor type indicating a physical, network, or database characteristic of the user, an implementation security factor type indicating a user-defined, application, or certificate information characteristic of the user, and an environmental security factor type indicating a geographic or time-based characteristic of the user.

26. The database system of claim 1, wherein the plurality of security factors include a physical security factor type indicating a physical, network, and database characteristic of the user, an implementation security factor type indicating a user-defined, application, and certificate information characteristic of the user, and an environmental security factor type indicating a geographic and time-based characteristic of the user.

* * * * *